United States Patent
Vollath et al.

(10) Patent No.: US 8,704,709 B2
(45) Date of Patent: *Apr. 22, 2014

(54) GNSS SIGNAL PROCESSING METHODS AND APPARATUS WITH TRACKING INTERRUPTION

(75) Inventors: Ulrich Vollath, Superior, CO (US); Nicholas Charles Talbot, Ashburton (AU)

(73) Assignee: Trimble Navigation Limited, Sunnyvale, CA (US)

( * ) Notice: Subject to any disclaimer, the term of this patent is extended or adjusted under 35 U.S.C. 154(b) by 415 days.

This patent is subject to a terminal disclaimer.

(21) Appl. No.: 13/059,428

(22) PCT Filed: Aug. 5, 2009

(86) PCT No.: PCT/US2009/004473
§ 371 (c)(1), (2), (4) Date: Feb. 17, 2011

(87) PCT Pub. No.: WO2010/021658
PCT Pub. Date: Feb. 25, 2010

(65) Prior Publication Data
US 2011/0156949 A1 Jun. 30, 2011

Related U.S. Application Data

(60) Provisional application No. 61/189,382, filed on Aug. 19, 2008.

(51) Int. Cl.
G01S 19/44 (2010.01)

(52) U.S. Cl.
USPC .................................................. 342/357.27

(58) Field of Classification Search
USPC ........... 342/357.27, 357.3; 701/477, 479–480
IPC ............................................ G01S 19/44,19/47
See application file for complete search history.

(56) References Cited

U.S. PATENT DOCUMENTS 6,127,968 A * 10/2000 Lu ............................. 342/357.31
6,198,430 B1 3/2001 Hwang et al.

(Continued)

FOREIGN PATENT DOCUMENTS

WO 2009/058213 A2 5/2009
WO 2010/021660 A2 2/2010

OTHER PUBLICATIONS

Berthias, J.P. et al., Lessons Learned from the Use of a GPS Receiver in Less Than Optimal Conditions, paper presented at the 16th International Symposium on SpaceFlight Dymanics, Pasadena, USA, Dec. 3-6, 2006, 11 pages.

(Continued)

*Primary Examiner* — Jack W Keith
*Assistant Examiner* — Fred H Mull
(74) *Attorney, Agent, or Firm* — Bruce D Riter

(57) ABSTRACT

Methods and apparatus are provided for estimating parameters, i.e. ambiguities, derived from GNSS signals. Observations of each of received frequencies of a GNSS signal from a plurality of GNSS satellites are obtained for a plurality of instances in time (3120). The time sequence of observations is fed to a filter to estimate a state vector comprising float ambiguities, wherein each float ambiguity constitutes a non integer estimate of an integer number of wavelengths for a received frequency of a GNSS signal between a receiver of the GNSS signal and the GNSS satellite from which it is received and wherein the float ambiguities of the state vector are updated over time on the basis of the observations (3140). The occurrence of an interruption in tracking of at least one signal of a satellite is determined (3121). The float ambiguity of the state vector for the at least one signal for which an interruption in tracking occurred is maintained at the value before the interruption in tracking occurred (3122). Integer values are assigned to at least a subgroup of the estimated float values to define a plurality of integer ambiguity candidate sets (3160). A quality measure is determined for each of the candidate sets. A weighted average of the candidate sets is formed (3200). Ambiguities of the weighted average can be used in subsequent operations to aid in determining a position of the receiver or can be used to prepare data, e.g., in a network processor that can be used to augment position information of a rover.

49 Claims, 36 Drawing Sheets

(56) References Cited

U.S. PATENT DOCUMENTS

| | | | |
|---|---|---|---|
| 6,268,824 | B1 | 7/2001 | Zhodzishky et al. |
| 7,148,843 | B2 | 12/2006 | Han et al. |
| 7,312,747 | B2 | 12/2007 | Vollath et al. |
| 7,538,721 | B2 | 5/2009 | Vollath et al. |
| 8,368,590 | B2 * | 2/2013 | Vollath et al. ............ 342/357.27 |
| 2002/0030625 | A1 * | 3/2002 | Cavallaro et al. ........ 342/357.06 |
| 2005/0264445 | A1 | 12/2005 | Brabec et al. |
| 2008/0297408 | A1 | 12/2008 | Dai et al. |
| 2009/0099774 | A1 * | 4/2009 | Takac et al. ................... 701/216 |

OTHER PUBLICATIONS

Betti B., Crespi M., Sanso F., A geometric illustration of ambiguity resolution in GPS theory and a Bayesian approach, Manuscripta Geodaetica (1993) 18:317-330.

DG14 Receiver, Magellan Navigation Inc., 2006, 2 pages.

Kozlov, D. et al., Flying RTK Solution as Effective Enhancement of Conventional Float RTK, ION GNSS 20th International Technical Meeting of the Satellite Division, Sep. 25-28, 2007, Fort Worth, TX, pp. 351-356.

Magill, D.T., Optimal Adaptive Estimation of Sampled Stochastic Processes, IEEE Transactions on Automatic Control, vol. 10, No. 4, Oct. 1965, pp. 434-439.

ProMark 3 RTK, Magellan Navigation Inc., 2007, 6 pages.

Teunissen, P.J.G., GNSS Best Integer Equivariant Estimation, International Association of Geodesy Symposia, 2005, vol. 128, Symposium G04, 422-427.

Verhagen, S., The GNSS integer ambiguities: estimation and validation, Delft University of Technology, 2004, ISBN 90-804147-4-3 (also in Publications on Geodesy 58, Delft, 2005, ISBN-13: 978 90 6132 290 0, ISBN-10: 90 6132 290).

P.J.G. Teunissen, Theory of integer equivariant estimation with application to GNSS, Journal of Geodesy (2003) 77 : 402-410.

B. Remondi, Using the Global Positioning System (GPS) Phase Observable for Relative Geodesy: Modeling, Processing, and Results, Ph.D. Thesis, The University of Texas at Austin, 1984, 380 pages.

* cited by examiner

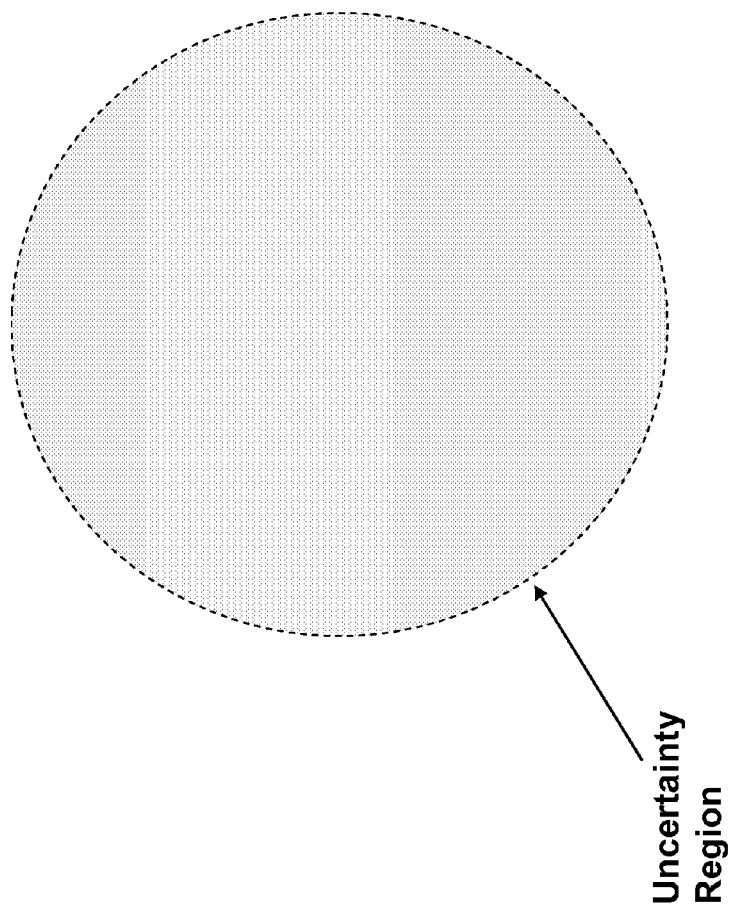

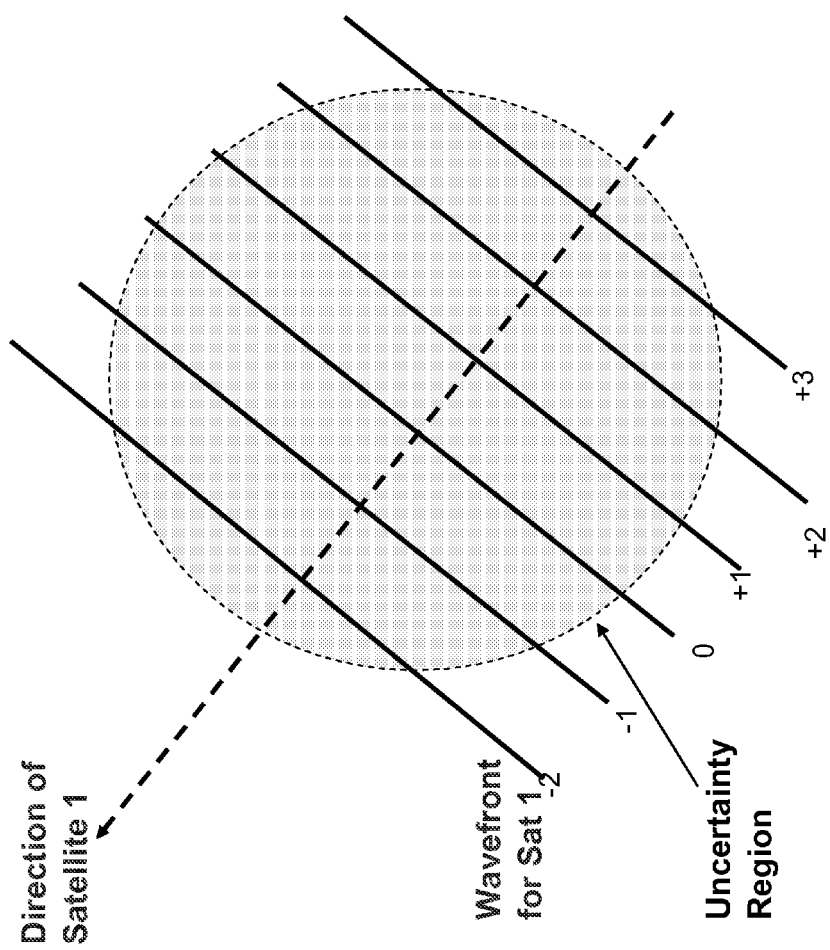

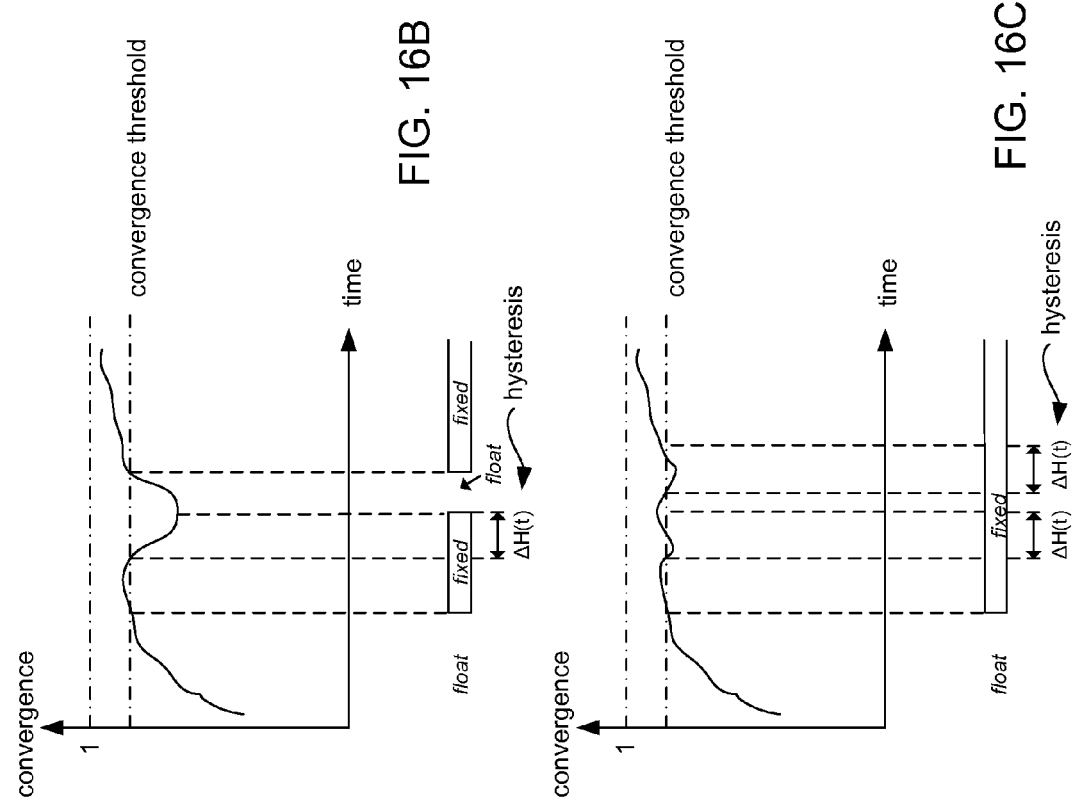
FIG. 16B
FIG. 16C
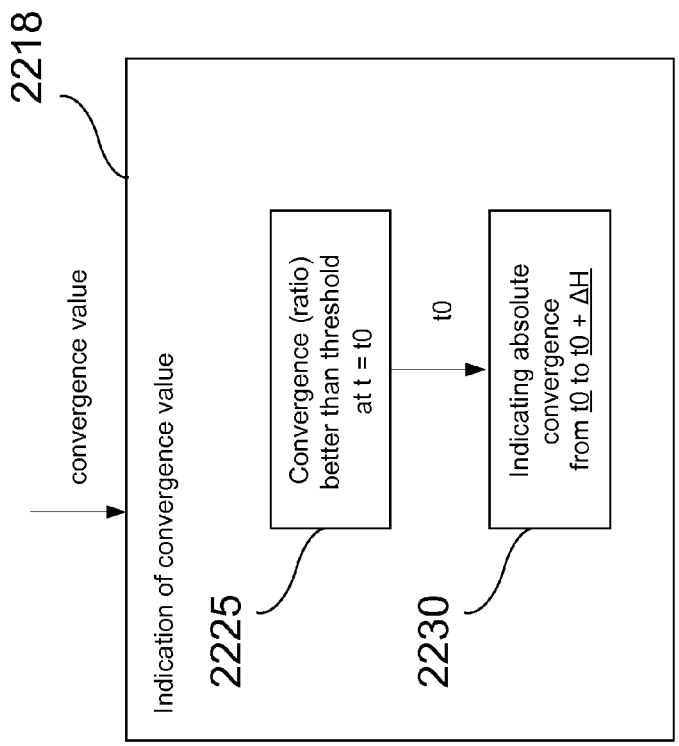
FIG. 16A

GNSS SIGNAL PROCESSING METHODS AND APPARATUS WITH TRACKING INTERRUPTION

RELATED APPLICATIONS

This application claims benefit of U.S. Provisional Application for Patent 61/189,382 filed Aug. 19, 2008, the content of which is incorporated herein by this reference.

This application Ser. No. 13/059,428 is related to the following United States national stage patent applications which also claim benefit of U.S. Provisional Application for Patent 61/189,382: Ser. Nos. 13/059,463 filed Feb. 17, 2011 (§371); 13/059,415 filed Feb. 16, 2011 (§371); 13/059,413 filed Feb. 16, 2011 (§371); and 13/059,416 filed Mar. 17, 2011 (§371).

FIELD OF THE INVENTION

The invention relates to position estimation methods and apparatuses, and especially to such methods and apparatuses based on navigational satellite system signals. The fields of application of the methods and apparatuses include, but are not limited to, navigation, map-making, land surveying, civil engineering, disaster prevention and relief, and scientific research.

BACKGROUND

1. Introduction

Global navigational satellite systems (GNSS) include Global Positioning System (GPS) (United States), GLONASS (Russia), Galileo (Europe) and COMPASS (China) (systems in use or in development). A GNSS typically uses a plurality of satellites orbiting the earth. The plurality of satellites forms a constellation of satellites. A GNSS receiver detects a code modulated on an electromagnetic signal broadcasted by a satellite. The code is also called a ranging code. Code detection includes comparing the bit sequence modulated on the broadcasted signal with a receiver-side version of the code to be detected. Based on the detection of the time of arrival of the code for each of a series of the satellites, the GNSS receiver estimates its position. Positioning includes geolocation, i.e. the positioning on the surface of the Earth.

An overview of GPS, GLONASS and Galileo is provided in sections 2.1.1, 2.1.2 and 2.1.3 of Sandra Verhagen, *The GNSS integer ambiguities: estimation and validation*, Delft University of Technology, 2004, ISBN 90-804147-4-3 (herein referred as "[1]") (which was also published in Publications on Geodesy 58, Delft, 2005, ISBN-13: 978 90 6132 290 0, ISBN-10: 90 6132 290).

Positioning using GNSS signal codes provides a limited accuracy, notably due to the distortion the code is subject to upon transmission through the atmosphere. For instance, the GPS includes the transmission of a coarse/acquisition (C/A) code at 1575.45 MHz, the so-called L1 frequency. This code is freely available to the public, in comparison to the Precise (P) code, which is reserved for military applications. The accuracy of code-based positioning using the GPS C/A code is approximately 15 meters, when taking into account both the electronic uncertainty associated with the detection of the C/A code (electronic detection of the time of arrival of the pseudorandom code) and other errors including those caused by ionospheric and tropospheric effects, ephemeris errors, satellite clock errors and multipath propagation.

An alternative to positioning based on the detection of a code is positioning based on carrier phase measurements. In this alternative approach, the carrier phase of the GNSS signal transmitted from the satellite is detected, not the code modulated on the signal transmitted from the satellite.

The approach based on carrier phase measurements has the potential to provide much greater position precision, i.e. up to centimeter-level or even millimeter-level precision, compared to the code-based approach. The reason may be intuitively understood as follows. The code, such as the GPS C/A code on the L1 band, is much longer than one cycle of the carrier on which the code is modulated. The position resolution may therefore be viewed as greater for carrier phase detection than for code detection.

However, in the process of estimating the position based on carrier phase measurements, the carrier phases are ambiguous by an unknown number of cycles (this is for instance explained in [1], section 1.1, second paragraph). The phase of a received signal can be determined, but the cycle cannot be directly determined in an unambiguous manner. This is the so-called "integer ambiguity problem", "integer ambiguity resolution problem" or "phase ambiguity resolution problem".

GNSS observation equations for code observations and for phase observations are for instance provided in [1], respectively sections 2.2.1 and 2.2.2. An introduction to the GNSS integer resolution problem is provided in [1], section 3. The idea of using carrier phase data for GNSS positioning was however already introduced in 1984 in Remondi, *Using the Global Positioning System (GPS) Phase Observable for Relative Geodesy: Modeling, Processing and Results*, Center for Space Research, The University of Texas at Austin, May, 1984 (herein referred as "[2]").

The basic principles of the GNSS integer resolution problem will be now explained with reference to FIGS. 1 to 4. Further explanations are then provided, with mathematical support and explanations of the further factors generally involved in implementing an integer resolution system for precise position estimation.

2. Basic Principles of the GNSS Integer Resolution Problem

FIG. 1 schematically illustrates a GNSS with only two satellites and one receiver. A mobile receiver is also called a rover, a stationary receiver may be called a base station (useful for differential processing, e.g., DGPS) or a reference station (useful for network processing). While an actual GNSS involves more than two satellites, in order to illustrate the basic principles of GNSS carrier-phase measurements, only two satellites are represented on FIG. 1. Each satellite broadcasts a signal (illustrated by the arrows originating from the satellites and going in the direction of the receiver). A portion of the carrier of each of the signals is schematically represented in the vicinity of the receiver. The portion of the carrier is represented in FIG. 1 in a non-modulated form for the sake of clarity. In reality, a code is modulated, e.g. bi-phase shift key (BPSK)-modulated, on the carrier.

At one point in time, the receiver can measure the phase of the carrier of the received signal. The receiver can also track the carrier phase, and lock onto it to track the additional cycles of the carrier due to the changing distance between the receiver and the satellite. The aspect of tracking the phase in time is however disregarded for now, for the sake of clarity, but will be explained later.

While the receiver can measure the phase of the carrier of the received signal, the number of cycles between the satellite and the receiver is unknown. The distance corresponding for instance to one cycle of a GPS L1 frequency carrier (1575.45 MHz) is about 19 centimeters (taking into account the propagation speed of the radio signal, i.e. the speed of light). The distance of 19 centimeters corresponds to the wavelength of the carrier. In other words, the carrier phase can be measured starting at one point in time, but the integer number of cycles from the satellite to the receiver, e.g. at the starting point in time, is unknown. Also, the difference between the number of cycles from the first satellite to the receiver and the number of cycles from the second satellite to the receiver is unknown.

The amplitude peaks of some successive cycles of a GNSS signal carrier in FIG. 1 are illustrated by the indications "−1", "0", "+1", "+2". This intuitively illustrates the integer ambiguity as to the number of cycles. The peak referred to by the indication "0" corresponds to a particular number of cycles from the receiver to the satellite. The peak referred to by the indication "+1" corresponds to one more cycle, the peak referred to by the indication "−1" corresponds to one less cycle, and so on. The estimation of the position of the receiver depends on the knowledge of the correct number of cycles from the satellite to the receiver.

A given number of cycles from the first satellite to the receiver (e.g. corresponding to the indication "+1" on the left-hand side of FIG. 1) and a given number of cycles from the second satellite to the receiver (e.g. corresponding to the indication "−1" on the right-hand side of FIG. 1) leads to one estimated position. In other words, it can be seen that the integer couple (+1, −1) leads to one estimated position in the two-dimensional illustration. Another combination of number of cycles to each of the satellites leads to another estimated position. For instance, the combination (0, +1) leads to another estimated position in the two-dimensional illustration. This will be better understood with reference to FIGS. 2a to 4.

FIG. 2a discloses a two-dimensional uncertainty region wherein the receiver is known to be, or at least is known to be very likely to be. The knowledge that the receiver is within this uncertainty circle may for instance be based on a coarse code-based position estimation. While an actual GNSS implementation involves more than a two-dimensional uncertainty region, the basic principles of carrier-phase measurements may be understood by referring to a two-dimensional space of unknowns only. It is known or assumed that the position of the receiver is within the uncertainty region limited by the represented circle, but the position within the circle is unknown yet.

FIG. 2b discloses the two-dimensional uncertainty region of FIG. 2a with, in addition, a dashed line with an arrow. The dashed line represents the direction towards one GNSS satellite, called Satellite 1. Satellite 1 broadcasts a signal containing a carrier. The parallel lines represented in the uncertainty region are the lines wherein the receiver may be located, when assuming that only the carrier of Satellite 1 is used for position estimation. Each line corresponds to a particular wave front of the signal broadcasted by Satellite 1. Adjacent wave fronts are separated by one carrier wavelength. Depending on the correct number of cycles to Satellite 1, the receiver may be viewed as being located on one of these lines. Due to the integer ambiguity, the correct position line is unknown.

FIG. 2c represents the same elements as FIG. 2b, i.e. the uncertainty region and the carrier wave fronts of the signal broadcasted by Satellite 1. In addition, FIG. 2c includes a second dashed line with an arrow schematically indicating the direction of a second GNSS satellite, i.e. Satellite 2. The lines which are perpendicular to the direction of Satellite 2 represent the carrier wave fronts of the signal broadcasted by Satellite 2. Depending on the correct number of cycles to Satellite 2, the receiver may be viewed as being located on one of these lines.

The carrier of the signal broadcasted by Satellite 2 may be used for position estimation in addition to the position information derived from the carrier associated with Satellite 1. The uncertainty can therefore be reduced. Instead of being able to only assume that the position of the receiver is somewhere within the circle (of FIG. 2a), or to only assume that the position of the receiver is on one of the straight lines represented on FIG. 2b, it can now be assumed that the position of the receiver is on one of the lines corresponding to the wave fronts of Satellite 1 and simultaneously on one of the parallel lines corresponding to Satellite 2. In other words, by using carrier phase measurements from the two satellites, it can be assumed that the position of the receiver is or is very likely to be on the intersection between a line associated with a wave front of Satellite 1 and a line associated with a wave front of Satellite 2.

It can be seen that there are 28 line intersections within the exemplary uncertainty region of FIG. 2c. These intersections correspond to 28 possible positions for the receiver. The position estimation problem within the uncertainty region is therefore reduced to the problem of finding on which one of these intersections the receiver is located.

More than two satellites are available to estimate the receiver position. The carrier of a signal from a further satellite can therefore be used in an attempt to resolve the integer ambiguity.

FIG. 2d represents the same elements as FIG. 2c, i.e. the uncertainty region and the carrier wave fronts of the signals broadcasted by Satellite 1 and by Satellite 2. In addition, FIG. 2d includes a third dashed line with an arrow indicating the direction of a third GNSS satellite, i.e. Satellite 3. Accordingly, a third set of carrier wave fronts, associated with Satellite 3, are represented.

The third set of wave fronts added on FIG. 2d and superposed on the pattern with the exemplary 28 intersections of FIG. 2c provides additional information to assist in resolving the integer ambiguity. How well a wave front associated with Satellite 3 fits with an intersection between the wave fronts associated with Satellite 1 and Satellite 2 provides an indication as to the probability that one particular intersection is the correct position. For instance, the triplet (0, 0, 0) can be intuitively regarded as providing a highly likely combination of wave fronts. The receiver is likely to be located at the intersection corresponding to the triplets (0, 0, 0) of wave fronts. This is however not the only possible intersection, also called a node.

In order to assign to each intersection of wave fronts associated with Satellite 1 and Satellite 2 (as illustrated on FIG. 2c) a probability of being the correct position, each intersection may be considered one by one. FIG. 2e illustrates a particular intersection, or node, being considered, or searched. The particular intersection, or search node location (using the label of FIG. 2e), is (+2, 0), i.e. wave front "+2" associated with Satellite 1 with wave front "0" associated with Satellite 2. How far the search node is from the closest wave front associated with Satellite 3 may intuitively be viewed as providing an indication of the probability that the search node corresponds to the correct position.

The wave front "+2" associated with Satellite 3 is the closest wave front from the search node (+2, 0). The wave front "+2" associated with Satellite 3 is however relatively far from the search node, i.e. the superposition match is not good. It results that the triplet (+2, 0, +2) is relatively unlikely to correspond to the correct position.

Each combination of a wave front associated with Satellite 1 and a wave front associated with Satellite 2 may be considered and a probability may be assigned to each one of these integer combinations, also called "ambiguities" or "integer ambiguities". This is shown in FIG. 3. The vertical arrow which is associated with each intersection, or search node, gives an indication of the probability that the search node corresponds to the correct position. Note that the probabilities shown on FIG. 3 are exemplary and do not necessarily correspond to the situation illustrated in FIGS. 2d and 2e.

FIG. 3 shows that the couple (0, 0) has a predominant probability within the uncertainty region. It is highly likely that this couple of integers corresponds to the correct integer solution from which the receiver position can be most precisely derived.

FIG. 4 shows another exemplary probability map wherein the probability associated with each intersection of wave fronts is indicated by a vertical arrow. However, in FIG. 4, two search nodes, corresponding to the couples (0, 0) and (+1, −1), have an almost equal probability. In this situation, it is highly likely that one of these two integer couples corresponds to the correct integer solution from which the receiver position can be most precisely derived.

The GNSS integer resolution problem is therefore the problem consisting in estimating with the highest possible confidence the correct set of integer values for the ambiguities, so as to provide high precision GNSS positioning. It may include scanning through possible integer combinations or search nodes (as illustrated in FIG. 2e) using statistical measures to assess which combination is the correct one.

3. Mathematical Formulation and Further Considerations 3.1 Observation Equations The linear GNSS observation equations are provided by $$y = Aa + Bb + e \quad (1)$$

wherein
- y is the GPS observation vector of order m (the vector of observables),
- a and b are the unknown parameter vectors of dimension n and p respectively,
- A and B represent the design matrices derived from the linearized observation equations of the GNSS model used, and
- e is the noise vector (the residuals).

The entries of the parameter vector a are unknown integer carrier phase ambiguities, which are expressed in units of cycles, i.e. $a \in Z^n$. The remaining parameters are the so-called baseline parameters, i.e. $b \in R^p$, including for instance atmospheric delays (see [1], sections 2.2 and 3.1). When the number of observations increases, the noise vector becomes to behave in accordance with a normal distribution.

The observation vector y may comprise both phase and code observations, on as many frequencies as available, and accumulated over all observation epochs. The problem described in above section "[2. Basic principles of the GNSS integer resolution problem]" is therefore generalized with many observations, based on one or more frequencies from a plurality of satellites for determining the position of a receiver.

The observation equations may take into account many observation data and many types of observation data. For instance, differential data obtained from a differential GPS (DGPS) system. DGPS uses one or more reference stations whose positions are precisely known. This enables to compute the effect of the ionosphere, satellite clock drifts, satellite ephemeris error at one moment in time. DGPS techniques were originally developed to compensate for the intentional clock error added when the so-called "Selective Availability (SA)" feature of the GPS was turned on. The SA feature has been permanently turned off in 2000, but DGPS techniques are still useful to compensate for effects which cause a reasonably constant delay during a certain period of time. The information can therefore be provided to the receiver, which can take it into account for improving the position estimation precision. In other words, the DGPS reference stations transmit differential corrections to be used by the GNSS receiver to improve the position estimation. These corrections may be integrated as observations into the observation equations without affecting the general principles behind the GNSS integer ambiguity resolution problem.

The system of equations (1) and the problem associated with its resolution are particular for the following reason. The equations involve real number unknowns (baseline parameters b) and integer number unknowns (integer ambiguities a). Techniques are not well-established to handle the resolution of a system of equations where some of the unknowns are known to have integer values.

In the above observation system (1), the number of unknowns is not equal to the number of observations. There are more observations than the number of unknowns, so that the system is an overdetermined system of equations. Statistical properties can be associated to each possible solution of the overdetermined system. The resolution of the system consists in finding the most likely solution to the system, including values for the integer number unknowns and real number unknowns.

One specific characteristic of carrier phase measurement based GNSS models is that, if an integer solution can be identified with a high confidence (i.e. with a probability of correct solution close to one), this provides a very precise solution (up to centimeter-level precision). However, integer ambiguity resolution carries the risk that the carrier phase ambiguities on one or more satellites and frequency bands are incorrectly fixed. Because GNSS GPS signals have a carrier of about 20 centimeters, if a carrier phase ambiguity is set to a wrong integer, this may result in position errors of decimeters or more.

3.2 Generalization in Time, and Float Solution

In above section "[2. Basic principles of the GNSS integer resolution problem]", only one snapshot in time was considered. However, the precision may be improved over time, by using a series of successive observations.

The phase of the carrier broadcasted from one satellite differs from one observation at a first point in time to another observation at a second point in time. However the carrier phases may be tracked, so that the carrier phase ambiguities themselves do not change. In other words, the receiver can lock onto the phase of one carrier.

A usual technique to solve the system of equations (1) is to first treat the unknowns a as real numbers, i.e. floating-point numbers (even though the unknowns of the vector a are known to be integer numbers). This approach is advantageous because well-known techniques such as Kalman filtering and least squares resolution may be used to derive a float solution, i.e. a set of real numbers for the unknown carrier phase ambiguities. This approach is advantageous even though it does not take into account the fact that the unknown carrier phase ambiguities, i.e. the entries of the parameter vector a in the equation system (1) above, are integer values.

The approach is also advantageous because it converges to the correct integer solution, provided that sufficient time is allowed. By adding snapshots (sets of observations at respective epochs), and by keeping observations associated with each snapshot to improve the solution (e.g. least-squares solution) a converging solution emerges.

However, a practical disadvantage of the float solution is that, while it converges, it takes time to do so. Typically, float solutions generally takes tens of minutes to converge sufficiently for centimeter-level work. While the Kalman filter may be used to obtain a float solution, and the float solution converges to a good estimate of the carrier phase ambiguities, it takes a long time to do so. There is a need to speed up this process.

The fact that the unknowns a are integer numbers may be used as constraints, for deriving combinations of integer values from the float solution, even before the float solution has converged sufficiently to the correct integer solution. This will now be explained.

3.3 Fixing the Float Solution to Integer Values: Fixed Solution

Known approaches exist to fix the ambiguities to integer values. For instance, the float solution is projected or mapped to an integer solution. See sections 2.1 and 2.2 of Teunissen, P. J. G. (2003), *GNSS Best Integer Equivariant estimation*, presented at IUGG2003, session G04, Sapporo, Japan (herein referred as "[3]").

This enables to obtain a fixed solution quicker. The reason behind fixing the float solution to an integer solution is to use the knowledge that the ambiguities in fact must be integer so that, if the correct integers are selected based on the float values of the ambiguities, the estimation of the remaining unknowns (i.e. the unknowns of vector b in equation system (1)) is improved and accelerated. The ambiguities are therefore fixed to the most probable integer solution, to reduce the number of unknowns and to thereby increase the over-determination of the system of equations.

Fixing includes setting each ambiguity to an integer value and using the combination of integer values to reduce the number of unknowns into the system of equations. However, while fixing the ambiguities speeds up the convergence process, this comes at the risk of incorrectly fixing the ambiguities, which can lead to the convergence towards a wrong solution.

It is noted that the ambiguities indicate the unknown number of cycles of the carrier between the receiver and the satellite at a particular instance in time, e.g. when initializing the system or at any other starting point in time, and thus are fixed values. The filter thus is used to estimate these fixed values based on the observations made. More precisely, by collecting more and more observations over time, the state vector of the filter, comprising inter alia the ambiguities, gradually converges to stable integer values representing the ambiguities.

To account for the changing distance from the satellite to the receiver over time usually a phase locked loop is employed in the receiver to track the carrier signal to determine the additional number of cycles to be added or deducted from the initial value that is to be estimated by the filter for the ambiguities at the starting point in time.

The Best Integer Equivariant (BIE) estimator (see section 4 "Best Integer Equivariant Estimation" of [3], or chapter 4 of [1]) is an example of estimator in which the integer-nature of the carrier phase ambiguities is used without explicitly enforcing a single correct integer ambiguity combination. The BIE approach uses a weighted average of integer ambiguity combinations to produce a solution which has a precision that is always better than or as good as the precision of its float and fixed counterparts (see [1], section 4.1, page 69).

An important computational aspect of the BIE approach is that the float ambiguity solution should be transformed into a more orthogonal space to accelerate the process used to generate integer ambiguity combinations used in the weighted summation (see [1], section 4.2.2, page 71). This transformation into a more orthogonal search space is referred to as "Z-transformation" and is explained in more details for instance in [1], pages 33-36; section 3.1.4 or in Teunissen, *The least-squares ambiguity decorrelation adjustment: a method for fast GPS integer ambiguity estimation*, Journal of Geodesy, 70: 65-82. A two-dimensional example of Z-transformation of an ambiguity search space is shown in [1], page 34, FIG. 3.6, in page 34. As mentioned in [1], page 34, lines 3-6: "Due to the high correlation between the individual ambiguities, the search space in the case of GNSS is extremely elongated, so that the search for the integer solution may take very long. Therefore, the search space is first transformed to a more spherical shape by means of a decorrelation of the original float ambiguities."

The Z-transformation, also called herein simply Z-transform, is different from (and should not be confused with) a Fourier transform in the frequency domain. The Z-transform is also different from (and should not be confused with) the mapping of the float values from a $R^n$ real number space to a $Z^n$ integer number space.

4. Weighting Over the Ambiguities

Methods have also been disclosed to estimate the receiver position based on all possible integer combinations.

Betti B., Crespi M., Sanso F., *A geometric illustration of ambiguity resolution in GPS theory and a Bayesian approach*, Manuscripta Geodaetica (1993) 18:317-330 (herein referred as "[4]") discloses a method wherein the ambiguities do not need to be resolved, but rather the method involves "sum[ming] over all possible ambiguities with proper weights directly derived from the likelihood function" (page 326, left-hand column, Remark 4.2).

In [4], it is also suggested to restrict the averaging to some of the combinations of integer values: "It has to be underlined that on the practical implementation of . . . in reality we have extended the summation not over the whole grid of ambiguities but just to the closer knots as the function . . . drops very quickly to zero when β attains large values" (page 327, right-hand column, lines 34-39).

5. Problem to be Solved

There is a need for improving the implementation of positioning systems based on GNSS carrier phase measurements, to obtain a precise estimation of the receiver position in quick, stable and user-friendly manner.

SUMMARY

Embodiments of the present invention aim at meeting the above-mentioned needs. In particular, embodiments of the invention aim at improving the implementation of the methods of the prior art with in mind the goals of obtaining rapidly a stable and precise solution, while improving usability.

Embodiments of the invention include methods, apparatuses, rovers, network stations, computer programs and computer-readable mediums, as defined in the claims.

BRIEF DESCRIPTION OF THE DRAWINGS

Embodiments of the present invention shall now be described, in conjunction with the appended Figures in which:

FIG. 2a schematically shows an uncertainty region wherein the position of the receiver is known to be located, for illustrating the background of the invention;

FIG. 2b schematically shows the uncertainty region of FIG. 2a wherein wave fronts associated with a first satellite, Satellite 1, are represented for illustrating, within the background of the invention, a carrier phase ambiguity;

FIG. 16a illustrates a portion of the flowchart of FIG. 15 in a particular embodiment of the method illustrated in FIG. 15;

FIGS. 16b to 16e illustrate examples of embodiments for providing an indication of convergence (e.g. "float" or "fixed") depending on the convergence of the achieved precision with respect to the formal precision;

DETAILED DESCRIPTION

Figure 1:
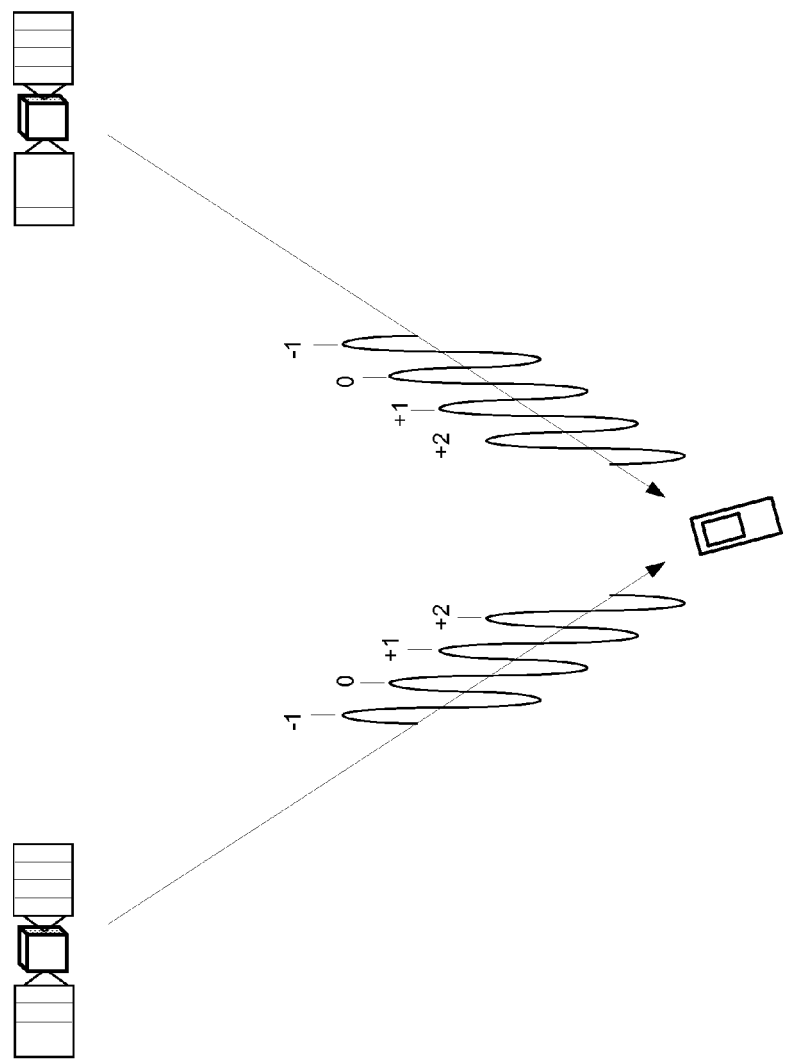
FIG. 1 schematically shows a GNSS with two satellites and one receiver, for illustrating the Background of the invention.
Figure 2C:
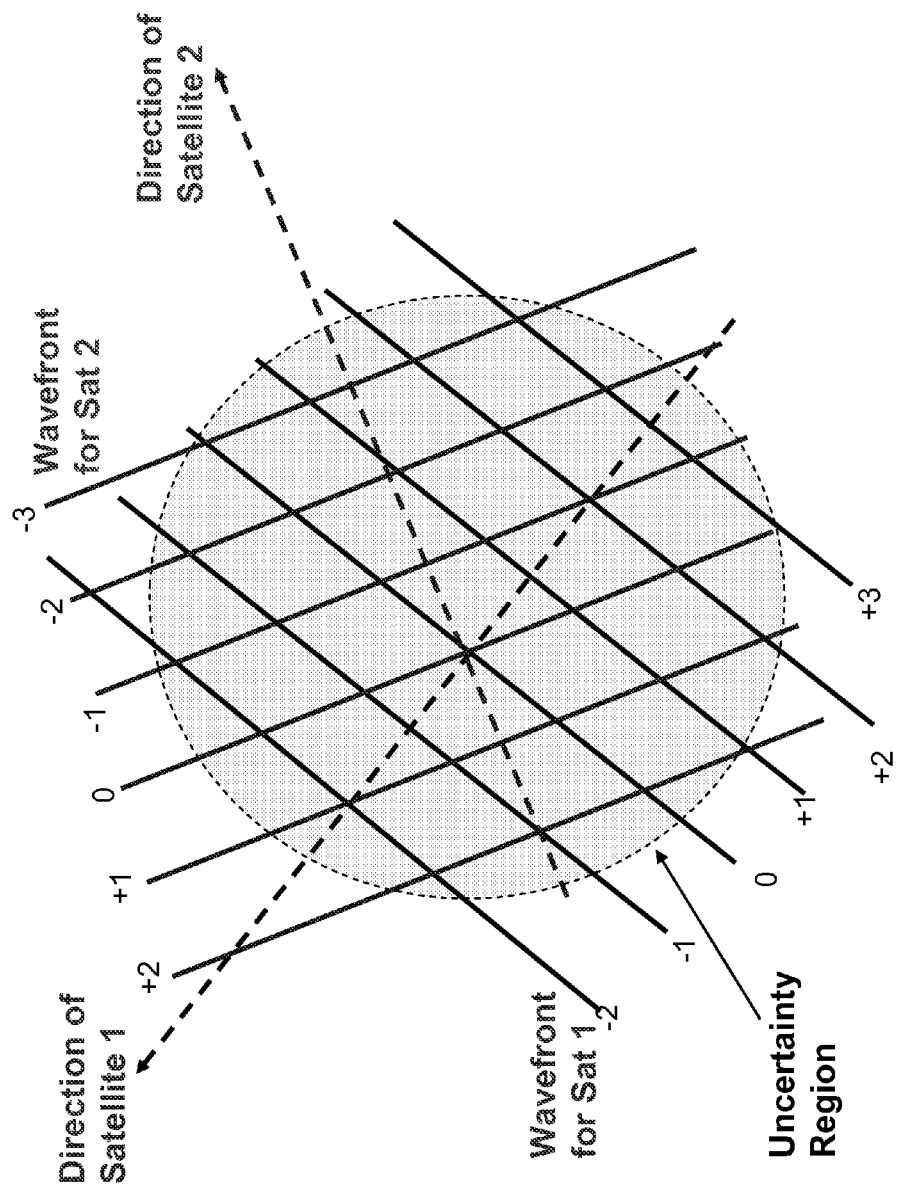
FIG. 2c schematically shows the uncertainty region of FIG. 2a and the wave fronts of FIG. 2b, wherein wave fronts associated with a second satellite, Satellite 2, are represented for illustrating, within the background of the invention, two carrier phase ambiguities.
Figure 2D:
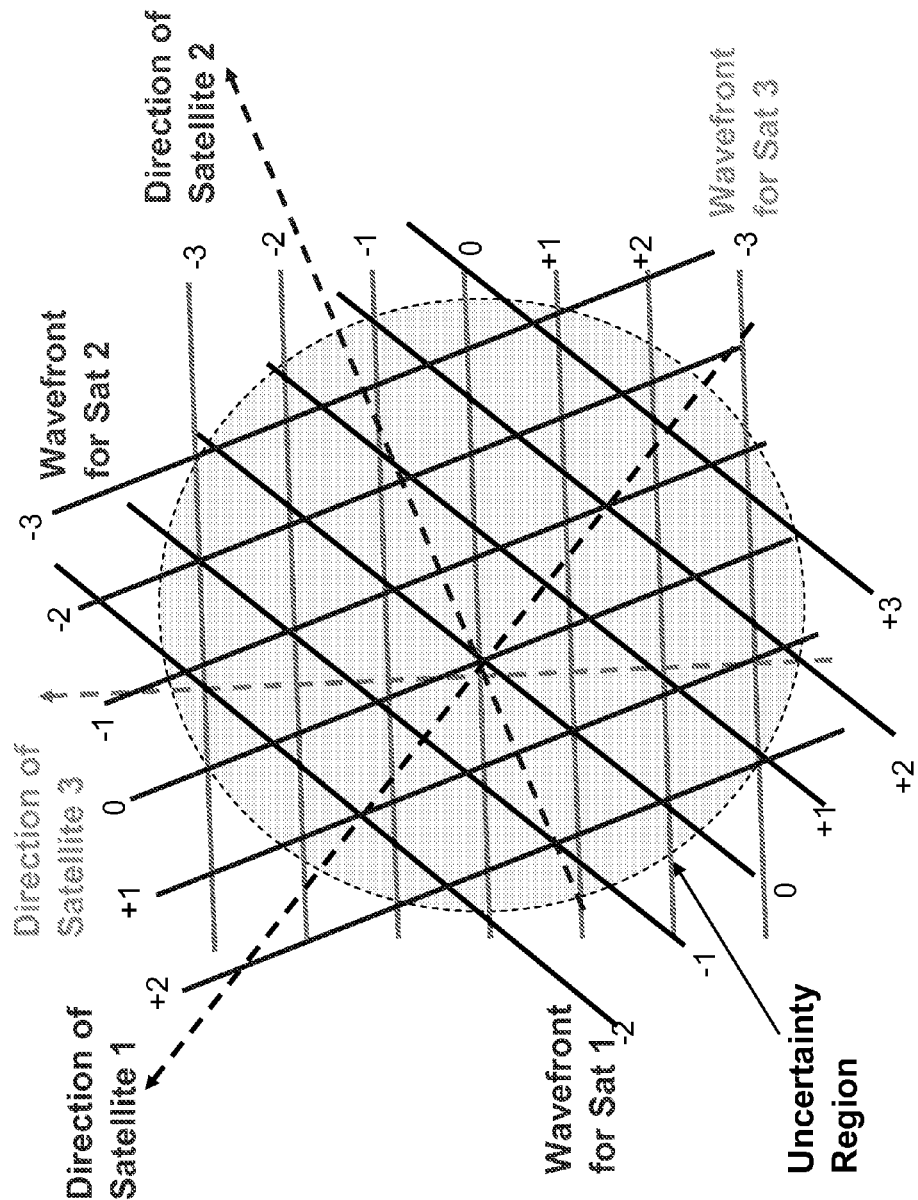
FIG. 2d schematically shows the uncertainty region of FIG. 2a and the wave fronts of FIGS. 2b and 2c, wherein wave fronts associated with a third satellite, Satellite 3, are represented for illustrating, within the background of the invention, three carrier phase ambiguities.
Figure 2E:
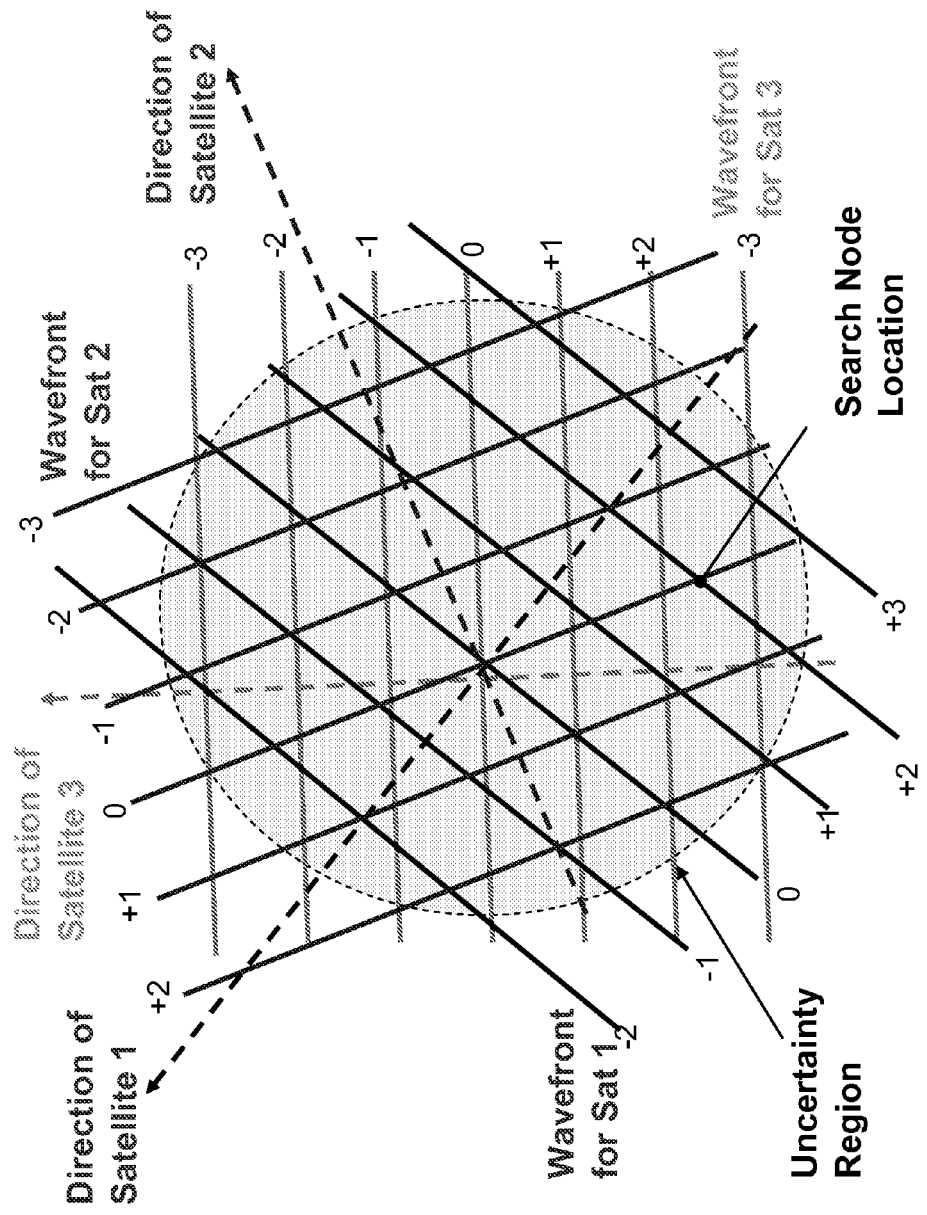
FIG. 2e is identical to FIG. 2d, except that a search node, corresponding to a combination of integer carrier phase values is schematically illustrated.
Figure 3:
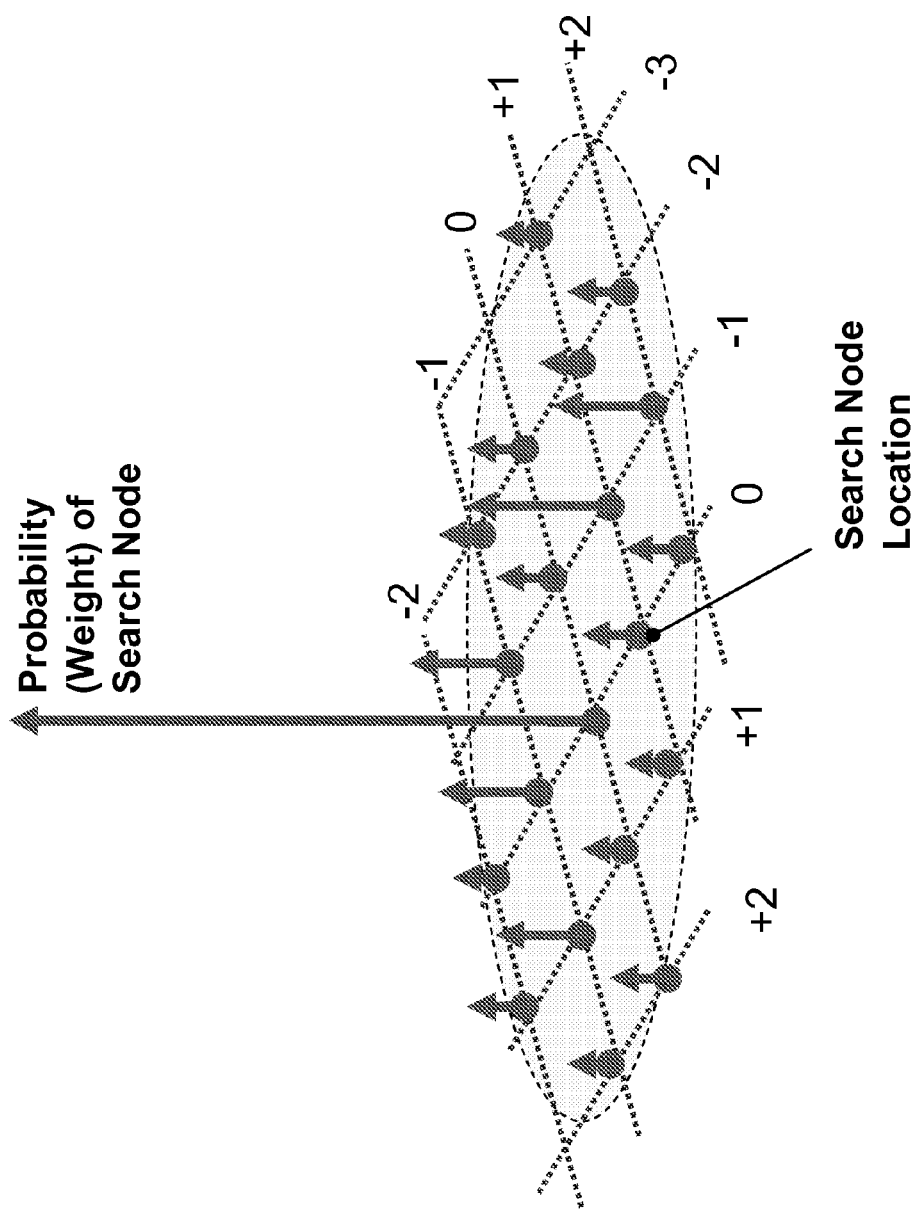
FIG. 3 schematically shows an uncertainty region wherein the position of the receiver is known to be located, the wave fronts associated with two satellites and the probability associated with each integer combinations, i.e. each set of integer values for each ambiguity, for illustrating the background of the invention.
Figure 4:
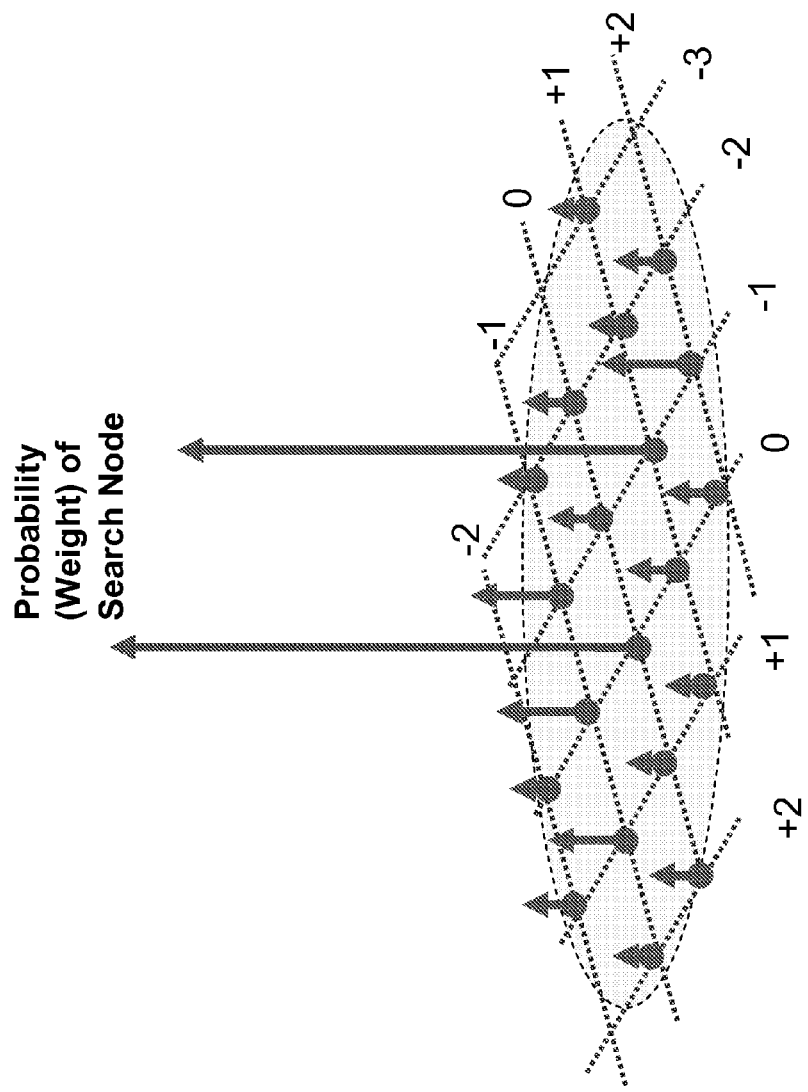
FIG. 4 is identical to FIG. 3 except that two search nodes are shown to have substantially the same probability of corresponding to the correct solution, for illustrating the background of the invention.

The present invention shall now be described in conjunction with specific embodiments. It may be noted that the specific embodiments serve to provide the skilled person with a better understanding, but are not intended to in any way restrict the scope of the invention, which is defined by appended claims. In particular, the embodiment described independently throughout the description can be combined to form further embodiments to the extent that they are not mutually exclusive.

1. Candidate Set Selection

It has been notably recognized by the inventors that efficiently selecting a number of candidates for the weighted average may improve the estimation at reduced processing requirements.

According to one embodiment, the integer solutions, i.e. integer candidate sets, used to form the weighted average are selected on the basis of a quality measure. More precisely, candidate sets can be selected that have a quality measure better than a threshold determined based on a reference quality measure of a reference candidate set.

Thus, the quality measure, e.g. statistical distance of the candidate set having the best quality measure relative to the "float solution" of the ambiguities in the state vector of the filter, determines the selection. Thus, the threshold used for the selection of candidate sets to be used in the weighted average may depend on the quality measure of the best candidate set, in other words, depends on how far, statistically, the best candidate set is from the float solution. The further the best candidate set is from the float solution, the lower the threshold can be set so that a larger number of candidate sets is selected for the weighted average as compared to a best candidate set that is, statistically, close to the float solution. This improves the reliability of the weighted average.

The advantages of this procedure include:
- there is no need to fix the integer ambiguities at one point, so that the risk of wrongly fixing the integer ambiguities is eliminated;
- the weighted average of the selected candidate sets converges more rapidly to the correct integer solution, so that there is no need to wait tens of minutes before being able to carry out centimeter-level work; and
- the precisions provided by the weighted average of the selected candidate sets are more realistic than those reported by fixing solutions consisting in fixing at one point in time some of the carrier phase ambiguities (in equation (1)) in attempt to speed up the float solution convergence.

According to one embodiment, estimating parameters, i.e. ambiguities, derived from the GNSS signals, includes obtaining observations of a GNSS signal from each of a plurality of GNSS satellites; feeding the observations to a filter having a state vector at least comprising a float ambiguity for each received frequency of the GNSS signals, each float ambiguity constituting a real number estimate associated with an integer number of wavelengths of the GNSS signal between a receiver of the GNSS signal and the GNSS satellite from which it is received, and the filter being for estimating a float value for each float ambiguity of the state vector; assigning integer values to at least a subgroup of the estimated float values to define a plurality of integer ambiguity candidate sets; selecting a first number of candidate sets having a quality measure better than a first threshold, wherein the first threshold is determined based on a reference quality measure of a reference candidate set; and obtaining a weighted average of the selected candidate sets, each candidate set weighted in the weighted average based on its quality measure.

The ambiguities in subsequent operations can be used to determine a position of the receiver or can be used to prepare data at a network side (e.g., in a network processor) that can be used to augment position information of a rover.

Figure 5A:
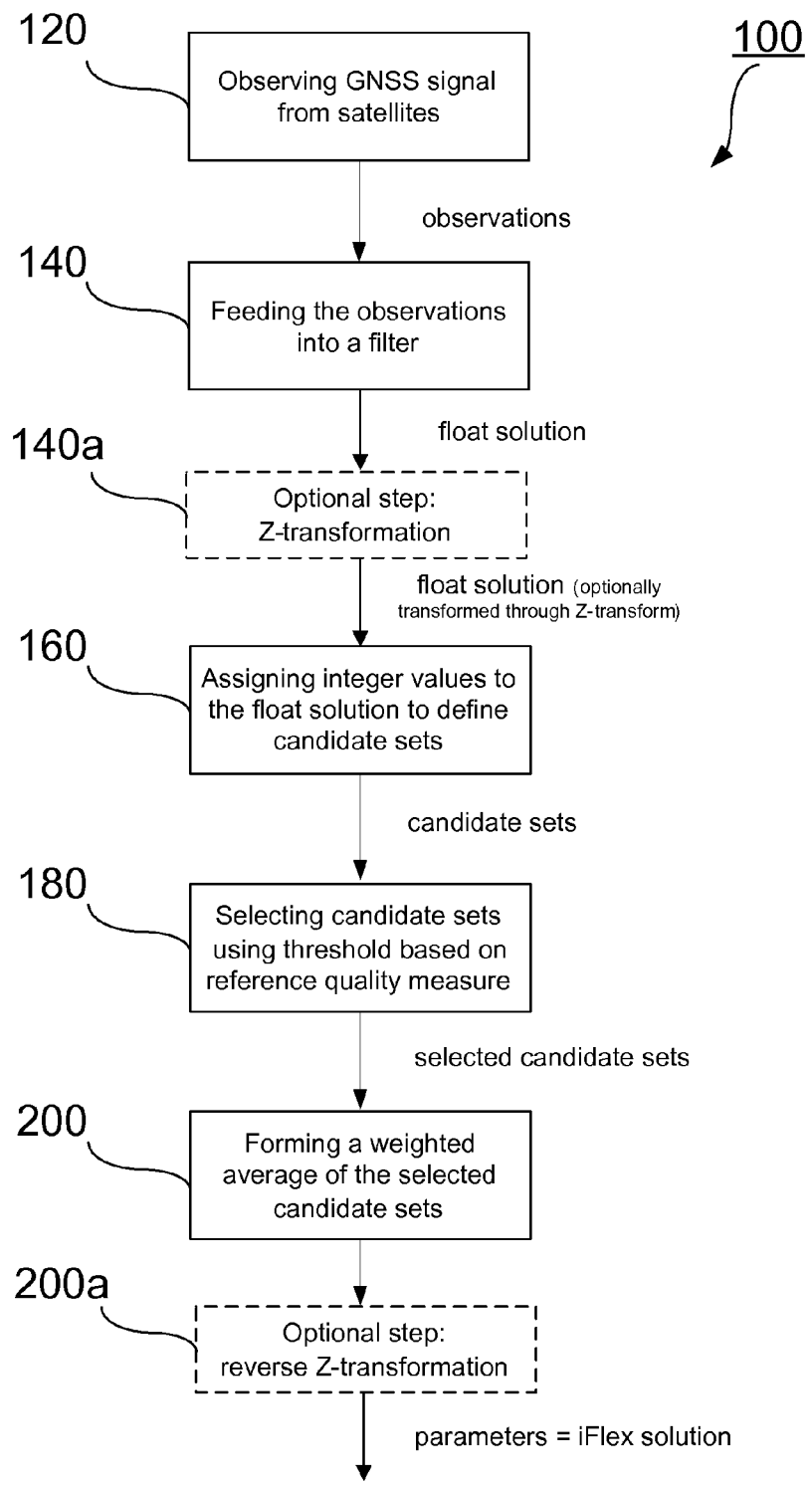
FIG. 5a is a flow chart illustrating one embodiment of a method of the invention.

FIG. 5a is a flow chart illustrating one embodiment of a method of the invention. The method 100 illustrated by the flowchart of FIG. 5a is a method for estimating parameters derived from GNSS signals useful to determine a position.

The parameters to be estimated are the unknown parameters of the unknown parameter vector described in relation to equation (1) (see background section). That is, the parameters include the unknown integer carrier phase ambiguities, forming the vector a, and the real number baseline parameters, forming the vector b.

There is one unknown integer carrier phase ambiguity, i.e. one unknown integer number of cycles, per observed carrier (i.e. per observed frequency, or more generally per frequency for which observations are obtained) per satellite. If each satellite transmits three carriers, i.e. for instance a 1575.42 MHz carrier (GPS L1 frequency band), a 1227.60 MHz carrier (GPS L2 frequency band), and a 1176.45 MHz carrier (GPS L5 frequency band), and if all three frequencies are observed (or more generally if observations are obtained for all three frequencies), if the signals from 10 GNSS satellites are observed (or more generally if observations are obtained for 10 GNSS satellites), there are 30 unknown integer carrier phase ambiguities. In other words, the dimension of the vector a is 30.

It is possible to observe (or more generally to obtain observations for) only one frequency per satellite, or to observe (or more generally to obtain observations for) two or more frequencies per satellite, depending on the receiver and the satellites. However, it is beneficial to observe (or more generally to obtain observations) and use as many frequencies as available, since this increases the over-determined character of the system.

There are as many baseline parameters as provided by the GNSS model which is used. The dimension of the vector b depends on the GNSS model used. A typical GNSS model includes but is not limited to parameters for position (x, y, z), time (t), and atmospheric influences such as ionosphere and troposphere.

The GNSS signals include signals from GNSS satellites. This may include the simultaneous use of signals from satellites belonging to different GNSS infrastructure, i.e. for instance signals from both GPS and GLONASS satellites.

The method, the parameters to be estimated and the GNSS signals are useful for determining the position of a GNSS receiver.

The method includes a step of, or procedure for, obtaining observations (step 120) of the GNSS signals from the satellites. This includes receiving, i.e. acquiring, the signals and determining, or measuring, at one point in time the carrier phase of the GNSS signals coming from the GNSS satellites. This also includes tracking the carrier phase in time. This may also include determining the time of arrival of a code coming from a GNSS satellite on one frequency. This may also include retrieving observations which have been previously measured and stored for later processing (post processing). The step of, or procedure for, obtaining 120 observations generates or retrieves, i.e. outputs, a series of observations constituting the vector y of equation (1). The observations are obtained not only at one point in time, but are measured sequentially (though they may be retrieved from storage for batch rather than sequential processing).

In step or procedure 140, the observations are fed into a filter, such as a Kalman filter, which uses the observations to estimate the value of unknown parameters. The filter has a state vector containing a value for each one of the unknown parameters. The observations are fed into the filter and the state vector is updated accordingly. For near real-time (sometimes called real-time) processing the observations are typically processed sequentially by epoch, while for post processing the observations of multiple epochs may be processed together.

The state vector at least includes a real number estimate for each one of the unknown integer carrier phase ambiguities. Each of these real number estimates of integer carrier phase ambiguities is called herein a "float ambiguity".

There is one float ambiguity per satellite for each received frequency of the GNSS signals. The float ambiguity for a received frequency of a GNSS signal is a real number estimate associated with an integer number of wavelengths, or cycles, of the GNSS signal between a receiver of the GNSS signal and the GNSS satellite from which it is broadcasted. A float ambiguity may be a real number estimate of the integer number of wavelengths or cycles of the GNSS signal between the receiver and the GNSS satellite.

A float ambiguity may also be a real number estimate of the integer difference between a first integer number of cycles of the GNSS signal between the receiver and a first GNSS satellite and a second integer number of cycles of the GNSS signal between the receiver and a second GNSS satellite (single-differenced ambiguity). A float ambiguity may also be a real number estimate of the integer difference between a first integer number of cycles of the GNSS signal between a first receiver and a GNSS satellite and a second integer number of cycles of the GNSS signal between a second receiver and the same GNSS satellite (single-differenced ambiguity).

A float ambiguity may also be a real number estimate of the integer difference of differences (double-differenced ambiguity); that is a first single-differenced ambiguity is formed e.g. as the difference between a first integer number of cycles of the GNSS signal between a first receiver and a first GNSS satellite and a second integer number of cycles of the GNSS signal between a second receiver and the first GNSS satellite; a second single-differenced ambiguity is formed e.g. as the difference between a third integer number of cycles of the GNSS signal between the first receiver and a second GNSS satellite and a fourth integer number of cycles of the GNSS signal between the second receiver and the second satellite; and a double-differenced ambiguity is formed as the difference between the first single-differenced ambiguity and the second single-differenced ambiguity.)

Whether undifferenced, single-differenced, or double-differenced, this is why the float ambiguity for a received frequency is defined as a real number estimate associated with an integer number of wavelengths or cycles.

The filter estimates a float value for each float ambiguity of the state vector. The output of the filter is a float solution, which includes a float value for each float ambiguity of the state vector.

The filtering process can be readily implemented in terms of a Kalman filter, sequential least squares estimator, robust estimation, or other comparable data processing schemes. Kalman filtering techniques are well established in the field of GNSS data processing and are able to generally handle state descriptions where one or more parameter has time-variant properties. A description of Kalman filtering applied to GPS data processing can be found in "Introduction to Random Signals and Applied Kalman Filtering", Brown, R. G, & Hwang, P. Y. C., John Wiley & Sons, $3^{rd}$ Ed, ISBN: 0-471-12839-2.

The float solution is obtained by allowing the integer carrier phase ambiguities to take real values. The constraint that the carrier phase ambiguities are integer numbers is then applied. That is, an integer value is assigned to each of the float values forming the float solution. In step or procedure 160, integer values are assigned to each of the estimated float values to define a plurality of integer ambiguity candidate sets. Since there is more than one way to assign integer values to the float values of the float solution, step 160 leads to defining a plurality of integer ambiguity candidate sets, i.e. a plurality of combination of integer values corresponding to a certain extent to the float solution.

For instance, let us imagine that the float solution comprises seven float values, because seven frequencies are observed (or, more generally, observations are obtained for seven frequencies). The float solution at one point in time may for instance be constituted by (2.11,3.58,−0.52,−2.35,1.01,0.98,1.50)

In this example, the float value "2.11" is a real-number estimated difference between the number of cycles from a first GNSS satellite on a first frequency to the receiver, estimated as a real number by the filter of step 140, and the number of cycles from the first satellite on the first frequency to the receiver, as estimated by a rough estimation method (for instance determined by code-based GNSS positioning).

The so-called rough estimation method may for instance provide the boundary of an uncertainty region as illustrated in FIGS. 2a to 2e, wherein the centre of the uncertainty region (which may be a circle) is considered to be the number of cycles as estimated by the rough estimation method. If the estimated difference is the float value "2.11", it means that the float solution includes for the first ambiguity a number of cycles differing by 2.11 cycles from the centre of the uncertainty region.

The float value "2.11" is therefore a real number estimate associated with the integer number of cycles from the first satellite on the first frequency to the receiver.

There are many possibilities to form sets of integers from the float solution. In other words, projecting the float solution from $R^n$, a n-dimensional space with real coordinates, into $Z^n$, a n-dimensional space with integer coordinates, may result in many different integer vectors, or integer candidate sets.

One simple way to project the float solution into the integer space is to round each ambiguity, i.e. each float value of the float solution, to its closest integer value. This gives a first ambiguity candidate set:

(2,4,−1,−2,1,1,1)

if the last float value "1.50" is rounded down to "1". If the float value "1.50" is instead rounded up to "2", a second ambiguity candidate set is provided:

(2,4,−1,−2,1,1,2)

The second float value "3.58" and the third float value "−0.52" may also be rounded to "3" and "0" respectively (with still in mind the goal of minimizing the residuals e of equation system (1)). This gives an additional series of six candidate sets:

(2,3,−1,−2,1,1,1)

(2,4,0,−2,1,1,1)

(2,3,0,−2,1,1,1)

(2,3,−1,−2,1,1,2)

(2,4,0,−2,1,1,2)

(2,3,0,−2,1,1,2).

The optional step 140a of performing a Z-transformation, as illustrated in FIG. 5a, will be discussed below.

Step 160 consists in forming, or defining, these candidate sets of integer values, by assigning integer values to the float values. The candidate sets of integers are called integer ambiguity candidate sets.

The step 160 of forming the integer ambiguity candidate sets includes defining a plurality of candidate sets. How many candidate sets to define may be determined based on one of several criteria.

In one embodiment, all candidate sets falling within an uncertainty region of the type shown in FIGS. 2a to 2e are formed by the assigning step 160. This embodiment has the advantage that, if it is known with a very high probability that the correct combination of integers falls within the uncertainty region, it is also known with an equally high probability that one amongst the considered candidate sets is the correct one. The number of candidate sets may however become large. For instance, if the uncertainty region includes six possible integer values for each ambiguity (a situation which corresponds approximately to the one shown in FIGS. 2a to 2e), and if there are seven ambiguities in each integer ambiguity candidate set (FIGS. 2d and 2e only show three ambiguities), there are $6^7$ (six raised to the power of seven) candidate sets, which gives 279936 candidate sets.

Other embodiments of the method and step 160 in particular will be described with reference to FIGS. 6a and 6b.

The above-described example involves seven ambiguities in each integer ambiguity candidate set. This is however only an example and there may be more than or fewer than seven ambiguities and corresponding float values.

Still referring to FIG. 5a, the step 180 of selecting candidate sets includes identifying one reference candidate set amongst the candidate sets defined in step 160, calculating a reference quality measure of the reference candidate set, wherein the reference quality measure represents how close the candidate set is from the float solution, defining an inclusion threshold, herein referred to as first threshold, based on the reference quality measure, and selecting, amongst the candidate sets defined in step 160, those which have a quality measure better than the first threshold.

The selected candidate sets constitute the output of step 180. The first threshold is determined based on how close the reference candidate set is from the float solution. This enables the process to be tailored to how good the best candidate set is, which has been recognized as being a measure of the degree of convergence of the estimation process.

Step 200 includes forming a weighted average of all the candidate sets selected in step 180, wherein the weight associated with each candidate set is determined based on the quality measure, or probability of correctness, of the candidate set. The likelier a candidate set is to be correct, the larger is its weight in the weighted average. This weighted average forms a new float solution, called herein the iFlex solution. The iFlex solution is a weighted combination of some of the possible integer ambiguity outcomes, not all of them (within the uncertainty region). The iFlex solution has been found to converge more rapidly to the correct solution in a reasonable amount of computation time as compared with the convergence time of the float solution.

The optional step 200a of performing a reverse Z-transformation, as illustrated in FIG. 5a, will be discussed below.

The quality measure reflects how well one particular integer ambiguity candidate fits the observations. Hence the quality measure is proportional to the size of the observation residuals.

A suitable quality measure $\Psi_{\bar{a}_k}$ can be computed via the following matrix inner product:

$$\Psi_{\bar{a}_k} = (\hat{a} - \bar{a}_k)^T Q_{\hat{a}}^{-1} (\hat{a} - \bar{a}_k) \quad (2)$$

where $\hat{a}$ is the vector of float ambiguity values; $\bar{a}_k$ is the corresponding vector of integer ambiguity values for candidate set k; $Q_{\hat{a}}^{-1}$ is the inverse of the float ambiguity covariance matrix. The scalar expression above can be referred to as a residual error norm.

For instance, if the above-mentioned exemplary eight candidate sets are selected during step 180, and the quality measure is calculated for each of them based on the above-mentioned float solution (2.11, 3.58, −0.52, −2.35, 1.01, 0.98, 1.50), a weight is then computed for each candidate set based on the quality measure, and the weighted average is calculated based on the candidate sets and weights. Table 1 represents an example of selected candidate sets and associated quality measures.

The quality measure values illustrated in Table 1 are computed according to the expression for $\Psi_{\bar{a}_k}$ above. Assuming that the measurements are normally distributed, the corresponding candidate weights $\omega(\bar{a}_k)$ can be computed according to the following expression:

$$\omega(\bar{a}_k) = \frac{\exp\left\{-\frac{1}{2}\Psi_{\bar{a}_k}\right\}}{\sum_{\bar{a}_k \in Z^n} \exp\left\{-\frac{1}{2}\Psi_{\bar{a}_k}\right\}} \quad (3)$$

TABLE 1

(example).

| Candidate Set index (k) | Selected candidate sets | Quality measure | Weight $\omega(\bar{a}_k)$ |
|---|---|---|---|
| 1 | (2, 4, −1, −2, 1, 1, 1) | 0.219 | 0.9678 |
| 2 | (2, 4, −1, −2, 1, 1, 2) | 8.719 | 0.0138 |
| 3 | (2, 3, −1, −2, 1, 1, 1) | 9.819 | 0.0079 |
| 4 | (2, 4, 0, −2, 1, 1, 1) | 11.102 | 0.0042 |
| 5 | (2, 3, 0, −2, 1, 1, 1) | 11.559 | 0.0033 |
| 6 | (2, 3, −1, −2, 1, 1, 2) | 13.299 | 0.0014 |
| 7 | (2, 4, 0, −2, 1, 1, 2) | 13.859 | 0.0011 |
| 8 | (2, 3, 0, −2, 1, 1, 2) | 15.598 | 0.0004 |

The weighted average of the integer ambiguity candidates ($\vec{a}_{iFlex}$) is computed via the following expression:

$$\vec{a}_{iFlex} = \hat{a} + \sum_{\bar{a}_k \in Z^n} (\hat{a} - \bar{a}_k)\omega(\bar{a}_k) \quad (4)$$

Based on the values given in Table 1, the iFlex ambiguity estimates are as follows:

(2.0000, 3.9869, −0.9910, −2.0000, 1.0000, 1.0000, 1.0167)

A suitable quality measure to be used to form the weights in the weighted average has been described above. The quality measure may however be based on various weighting functions. Notably, a normal (distribution of the type $$\left(\text{distribution of the type } e^{-\frac{1}{2}\sum\left(\frac{x-\mu}{\sigma}\right)^2}\right),$$

a Laplace $$\left(\text{distribution of the type } e^{-\alpha\sum\left|\frac{x-\mu}{\sigma}\right|}\right)$$

or a minmax (distribution of the type $e^{-max|x-\mu|}$) probability distribution may be used to compute the probability of correctness of the candidate sets and thus the weights.

In one embodiment (notably illustrated by the optional step 140a in FIG. 5a), after step 140 but before step 160, the float solution is transformed to a more orthogonal space, for instance using a Z-transform as disclosed at the end of section 3.3 of the background section. From a computational standpoint, the Z-transform approach enables to efficiently cover the integer search space. Although the iFlex technique may be carried out without the Z-transform, it is advantageous to use the Z-transform for a practical implementation. Other decorrelation techniques may be used. If a Z-transformation is carried out on the float solution, a reverse Z-transformation should also be performed, as illustrated by the optional step 200a in FIG. 5a. Although not illustrated in all Figures, such as on FIG. 8, the Z-transformation and the reverse Z-transformation also constitute optional and advantageous steps in the context of the other embodiments.

Figure 5B:
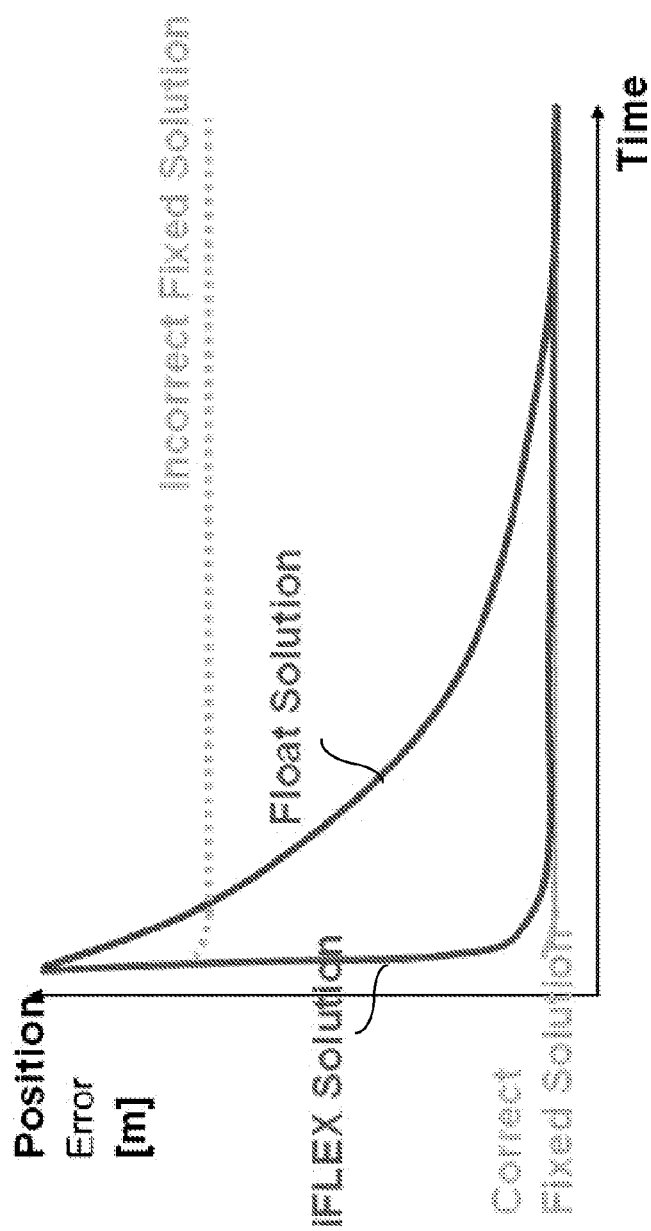
FIG. 5b illustrates exemplary benefits in terms of convergence speed of one embodiment of a method of the invention.

FIG. 5b illustrates the benefits of one embodiment of the method of the invention in terms of convergence speed and precision. The graph shows the convergence in terms of position error obtained as a function of time. Three methods may be compared by referring to the graph.

Firstly, the float solution is shown to converge to the correct integer solution, but the convergence is slow (as shown on FIG. 5b by the curve referred to by the label "Float Solution"). Secondly, a method consists in fixing some of the carrier phase ambiguities of the float solution to integer values to rapidly constrain the float solution (i.e. by fixing some of the unknowns of vector a to increase the over-determined character of the system (1)). This second method may rapidly lead to a correct fixed solution with a good precision (as shown on FIG. 5b by the curve referred to by the label "Correct Fixed Solution"). However, the second method may lead to an incorrect fixed solution showing a large position error (as shown on FIG. 5b by the curve referred to by the label "Incorrect Fixed Solution"). Finally, the iFlex solution based on the method described with reference to FIG. 5a fills the gap between the float solution (converging but slowly) and the fixing solution (converging rapidly, but with risks of errors), by providing an intermediate solution, with rapid convergence and low risk of errors.

In the method described with reference to FIG. 5a, steps 160 and 180 need not be performed successively. That is, some sub-steps of step 160 may be performed after some sub-steps of step 180. In other words, there may be an overlap when performing steps 160 and 180. This will be explained further with reference to FIGS. 6a and 6b.

Figure 6A:
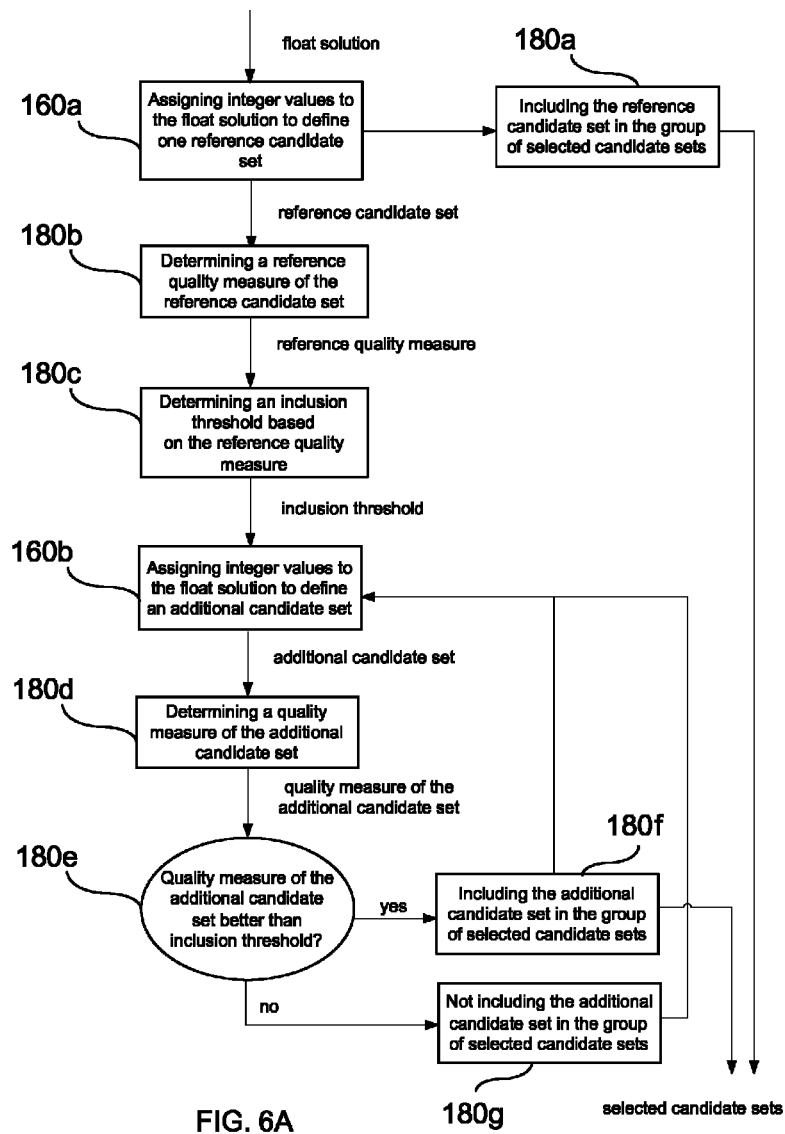
FIGS. 6a and 6b are two flowcharts, each illustrating the steps of assigning integer values to the float solution to form candidate sets and selecting candidate sets based on the first threshold, within one embodiment of a method of the invention.

FIG. 6a illustrates one embodiment of steps 160 and 180 for assigning integer values to the float solution and selecting candidate sets as an input for the weighted average formed in step 200. The steps 120, 140 and 200 of FIG. 5a are not illustrated in FIG. 6a for the sake of clarity.

In step 160a, one reference candidate set is formed by assigning integer values to the float solution. This may for instance be performed in a straightforward manner by rounding each float value of the float solution. This reference candidate set is included within the group of selected candidate sets (step 180a). At this stage, there is only one candidate set, namely the reference candidate set, in the group of selected candidate sets. In step 180b, the reference quality measure, which is the quality measure of the reference candidate set defined in step 160a, is calculated. Based on the reference quality measure, an inclusion threshold, or first threshold, is determined (step 180c). The inclusion threshold will serve to decide whether to include each one of the other candidate sets within the group of selected candidate sets.

An additional candidate set is then formed by assigning integer values to the float solution (step 160b). The additional candidate set defined in step 160b differs from the reference candidate set defined in step 160a. The differences between the additional candidate set and the reference candidate set relate to at least one ambiguity. The quality measure of the additional candidate set is calculated (step 180d) and this quality measure is compared (step 180e) to the inclusion threshold. If the quality measure of the additional candidate set is better than the inclusion threshold, the additional candidate set is included (step 180f) within the group of selected candidate sets. Otherwise, the additional candidate set is not included in the group of selected candidate sets (step 180g).

The steps 160b, 180d, 180e and 180f/180g are repeated until there are no more candidate sets to examine, or until a maximum number of selected candidate sets has been reached. The maximum number of selected candidate sets to select may be predetermined, i.e. determined in advance.

Figure 6B:
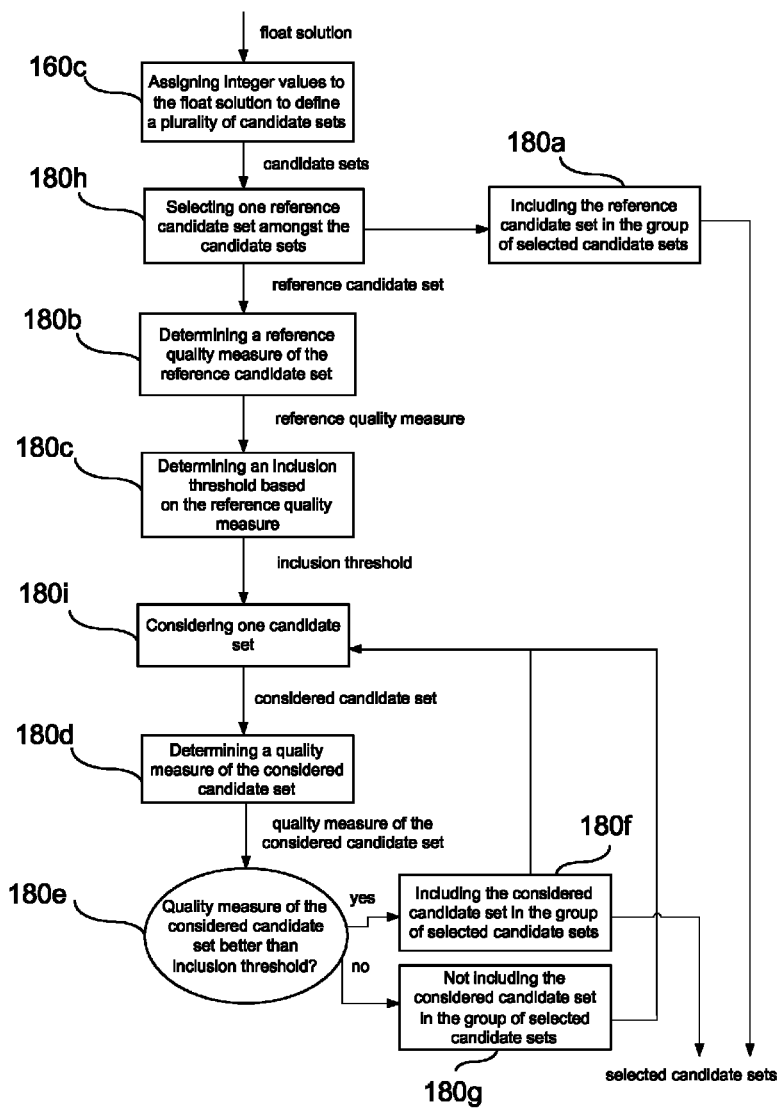

FIG. 6b illustrates another embodiment of steps 160 and 180 for assigning integer values to the float solution and for selecting candidate sets as an input for forming the weighted average in step 200. The steps 120, 140 and 200 of FIG. 5a are not illustrated in FIG. 6b for the sake of clarity.

In step 160c, a plurality of candidate sets are formed by assigning integer values to the float solution. In this step, a large number of candidate sets may be defined. The candidate sets to be selected will be selected from this plurality of candidate sets.

Step 160c may include rounding each float value of the float solution to form a first candidate set, and by forming the other candidate sets by modifying the integer values assigned to each ambiguity within a certain range (i.e. for instance within an uncertainty region, as illustrated in FIGS. 2a to 2e). In other words, step 160c may provide a large number of candidate sets determined by combination of modifications (adding ..., -2, -1, 0, 1, 2, ...) of the integer values of first candidate set.

One candidate set formed in step 160c is selected (step 180h) to constitute one reference candidate set. The selection of the reference candidate set may be carried out in the manner described with reference to steps 160a of FIG. 6a.

The reference candidate set selected in step 180h is included (step 180a) within the group of selected candidate sets. In step 180b, the reference quality measure, which is the quality measure of the reference candidate set, is calculated. Based on the reference quality measure, an inclusion threshold, or first threshold, is determined (step 180c). The inclusion threshold will serve to decide whether to include each one of the other candidate sets (the candidate sets formed in step 160c, but not selected as reference candidate set in step 180h) within the group of selected candidate sets.

A candidate set, which belongs to the candidate sets formed in step 160c and which has not been included yet in the group of selected candidate sets, is considered (step 180i).

The quality measure of the considered candidate set is calculated (step 180d) and this quality measure is compared (step 180e) to the inclusion threshold. If the quality measure of the considered candidate set is better than the inclusion threshold, the considered candidate set is included (step 180f) within the group of selected candidate sets, to form a new selected candidate set. Otherwise, the considered candidate set is not included in the group of selected candidate sets (step 180g).

The steps 180i, 180d, 180e and 180f/180g are repeated until there are no more candidate sets to consider, or until a maximum number of selected candidate sets has been reached, as explained in a similar way with reference to FIG. 6a.

Figure 7:
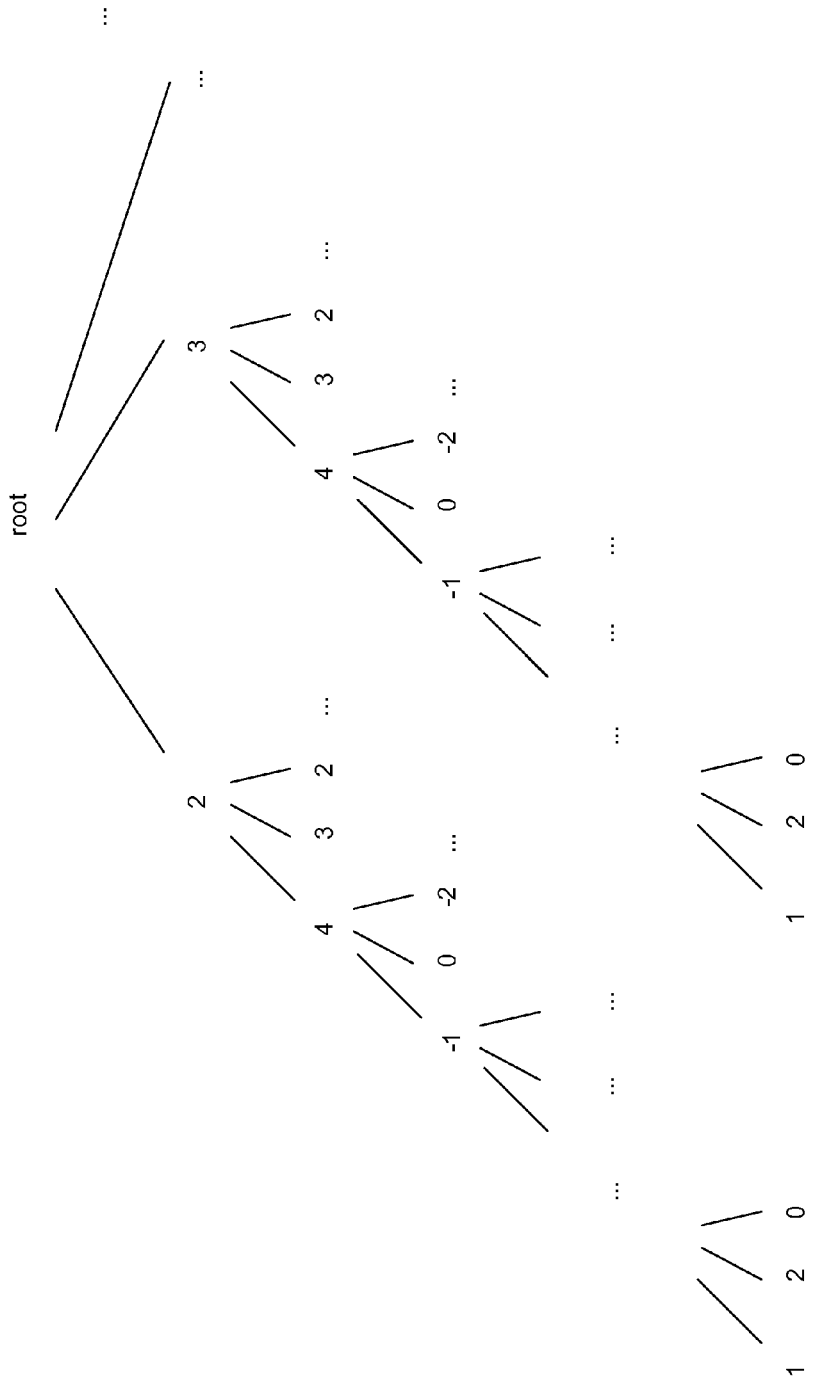
FIG. 7 illustrates the process of searching a tree of integer ambiguities to select candidate sets within one embodiment of a method of the invention.

FIG. 7 illustrates another exemplary implementation of the steps 160 and 180 of assigning integer values to the float solution to form integer candidate sets and selecting candidate sets to be used for the weighted average formed in step 200.

Referring to FIG. 7, the integer values and their modifications are organized in a tree. Each level in the tree corresponds to one ambiguity. The tree can be walked through to select the candidate sets that will form the basis of the weighted average. In one embodiment, the reference candidate set is formed by rounding each individual float value, which corresponds to taking all left-hand side branches of the tree. In the illustrated example, this gives the candidate sets (2,4,-1, ... ,1)

Then, for the selecting step 180, all integer modifications are considered within an uncertainty region, first (2,4,-1, ... ,2)

then:

(2,4,-1, ... ,0)

In the same manner, all branches which have a good expectation of being selected are analyzed. The quality measure for each of the nodes is calculated according to:

$$\Psi_{\hat{a}_k} = (\hat{a} - \hat{a}_k)^T L_{\tilde{a}}^T D_{\tilde{a}} L_{\tilde{a}} (\hat{a} - \hat{a}_k) \quad (5)$$

In which the matrix product $L_{\tilde{a}} D_{\tilde{a}} L_{\tilde{a}}^T$ is derived from the factorization of the inverse float ambiguity covariance matrix into lower unit triangular component $L_{\tilde{a}}$ and diagonal component $D_{\tilde{a}}$ via:

$$L_{\tilde{a}} D_{\tilde{a}} L_{\tilde{a}}^T = Q_{\tilde{a}}^{-1} \quad (6)$$

The quality measure can therefore be presented in the following form:

$$\Psi_{\hat{a}_k} = [(\hat{a} - \hat{a}_k)^T L_{\tilde{a}}] D_{\tilde{a}} [L_{\tilde{a}}^T (\hat{a} - \hat{a}_k)] \quad (7)$$

Because of the triangular nature of $L_{\tilde{a}}$, the quality measure values always increase as lower branches of the search tree are encountered. Therefore, if the maximum acceptable quality measure is say 1.56, any branches that start with a quality measure greater than 1.56 can be immediately pruned.

Figure 8:
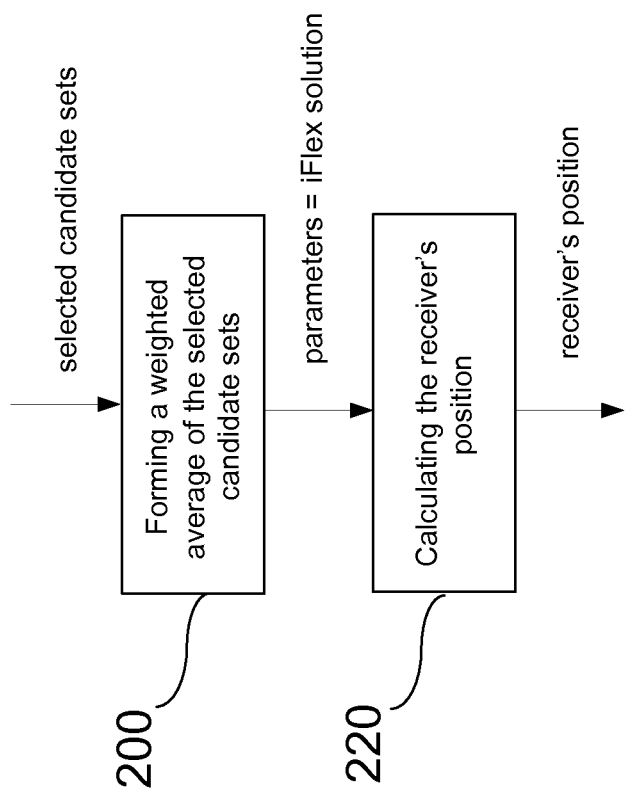
FIG. 8 is a flow chart illustrating a portion of one embodiment of a method of the invention.

FIG. 8 illustrates a flow chart of a further embodiment of the method, wherein the iFlex solution (formed in step 200) is used as a basis to estimate 220 the position of the receiver. The position of the receiver can be obtained by transforming the individual real number values of the iFlex solution into the position domain via the following matrix expression:

$$\bar{b}_{IFLEX} = \hat{b} - Q_{\hat{b}\hat{a}} Q_{\tilde{a}}^{-1} (\hat{a} - \bar{a}_{IFLEX}) \quad (8)$$

Where $Q_{\hat{b}\hat{a}}$ is the position/ambiguity correlation matrix, $\hat{b}$ the float position solution, $\hat{a}$ the vector of float ambiguity estimates, the $\bar{a}_{IFLEX}$ ambiguity estimates, and $\bar{b}_{IFLEX}$ the iFlex position estimates.

Rather than compute the iFlex solution initially in the ambiguity domain, it is possible to form the iFlex solution directly in the position domain by forming the following weighted average:

$$\bar{b}_{IFLEX} = \hat{b} + \sum_{\hat{a}_k \in Z^n} \hat{b}_k \omega(\hat{a}_k) \quad (9)$$

The weights used in (9) are the same as those used in (4) above. The term $\hat{b}_k$ contains the three-dimensional position in space corresponding to integer ambiguity candidate set $\hat{a}_k$, where:

$$\hat{b}_k = -Q_{\hat{b}\hat{a}} Q_{\tilde{a}}^{-1} (\hat{a} - \hat{a}_k) \quad (10)$$

In one embodiment, the reference candidate set is the candidate set having the best quality measure, i.e. the one which minimizes the residual error norm value according to:

$$\Psi_{\hat{a}_{BEST}} = \min_{\hat{a}_k \in Z^n} \{(\hat{a} - \hat{a}_k)^T Q_{\tilde{a}}^{-1} (\hat{a} - \hat{a}_k)\} \quad (11)$$

In one embodiment, the first threshold, i.e. the inclusion threshold (determined in step 180c of FIG. 6a-6b), is determined as at least one of
  a fraction of the reference quality measure, such as 1000 times worse the reference quality measure,
  a multiple of the reference quality measure, and
  a distance to the reference quality measure.

The inclusion threshold should be understood in the following context (for instance with additional reference to the above exemplary Table 1, and especially its last two columns). On the one hand, the goal of the inclusion threshold is to define a group of best candidate sets to be included into the weighted average. On the other hand, the larger the weights $\omega(\hat{a}_k)$ associated with a candidate set, the better the candidate set; and the smaller the exemplary chi square values $(\hat{a} - \hat{a}_k)^T Q_{\tilde{a}}^{-1} (\hat{a} - \hat{a}_k)$ (see equation (2) above) associated with a candidate set, the better the candidate set. Multiple, fraction and distance as determination for the inclusion threshold should be understood in this context, i.e. the context of aiming to include the best candidate sets into the weighted average.

Figure 9:
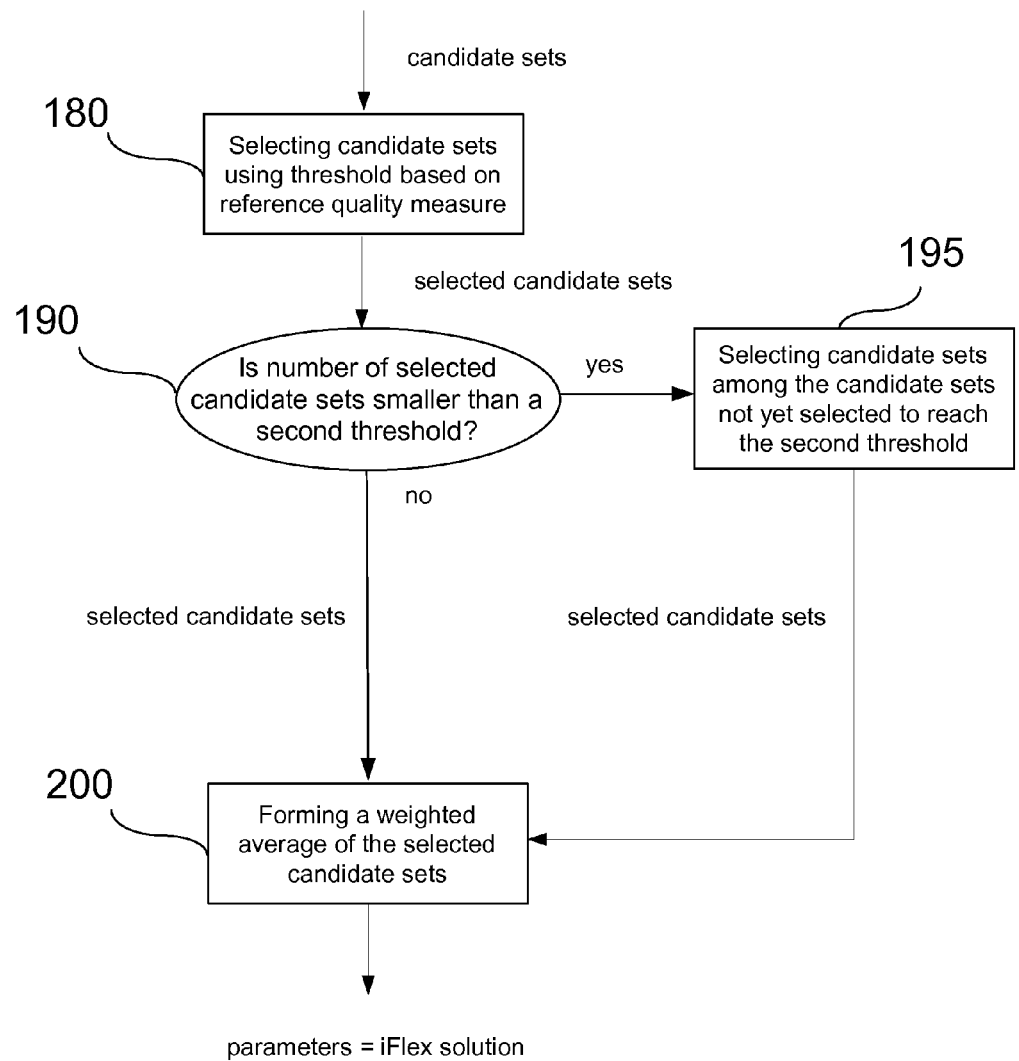
FIG. 9 is a flow chart illustrating a portion of one embodiment of a method of the invention, wherein, if the number of originally selected candidate sets is not sufficient, more candidate sets are selected.

In one embodiment, as illustrated in FIG. 9, if, as a result of the step 180 of selecting candidate sets based on the first threshold, i.e. based on the inclusion threshold referred to in FIGS. 6a to 6b for instance, the number of candidate sets is smaller than a minimum number, further processing is carried out to select more candidate sets. The minimum number of candidate sets is herein referred to as a second threshold. The second threshold is a threshold in terms of number of candidate sets, while the first threshold is a threshold in terms of quality measure of a candidate set.

If, as a result of the selection of step 180 based on the first threshold, the number of selected candidate sets (referred to herein as "first number" of selected candidate sets) is determined to be smaller than a second threshold (step 190), a step 195 of selecting further candidate sets is provided. In step 195, a second number of candidate sets are selected on the basis of the quality measure of the candidate sets in decreasing order starting with the non-selected candidate set having the best quality measure (this may be carried out by further walking the tree as shown in FIG. 7). The second number is equal to the difference between the first number of selected candidate sets (selected in step 180) and a second threshold defining a minimum number of candidate sets to be included in the weighted average.

This embodiment ensures that a minimum number of sets are included in the weighted average (formed in step 200 in FIG. 9), on which the iFlex solution is based. It has been recognized that selecting too few candidate sets for forming the iFlex solution may cause it to fail to converge. This is notably because, if too few candidate sets are selected, the iFlex solution may possibly not include a representative sample of candidate sets needed to estimate the uncertainty in the solution.

In one embodiment, the second threshold is comprised between 5 and 30. In one embodiment, the second threshold is equal to 10.

Figure 10:
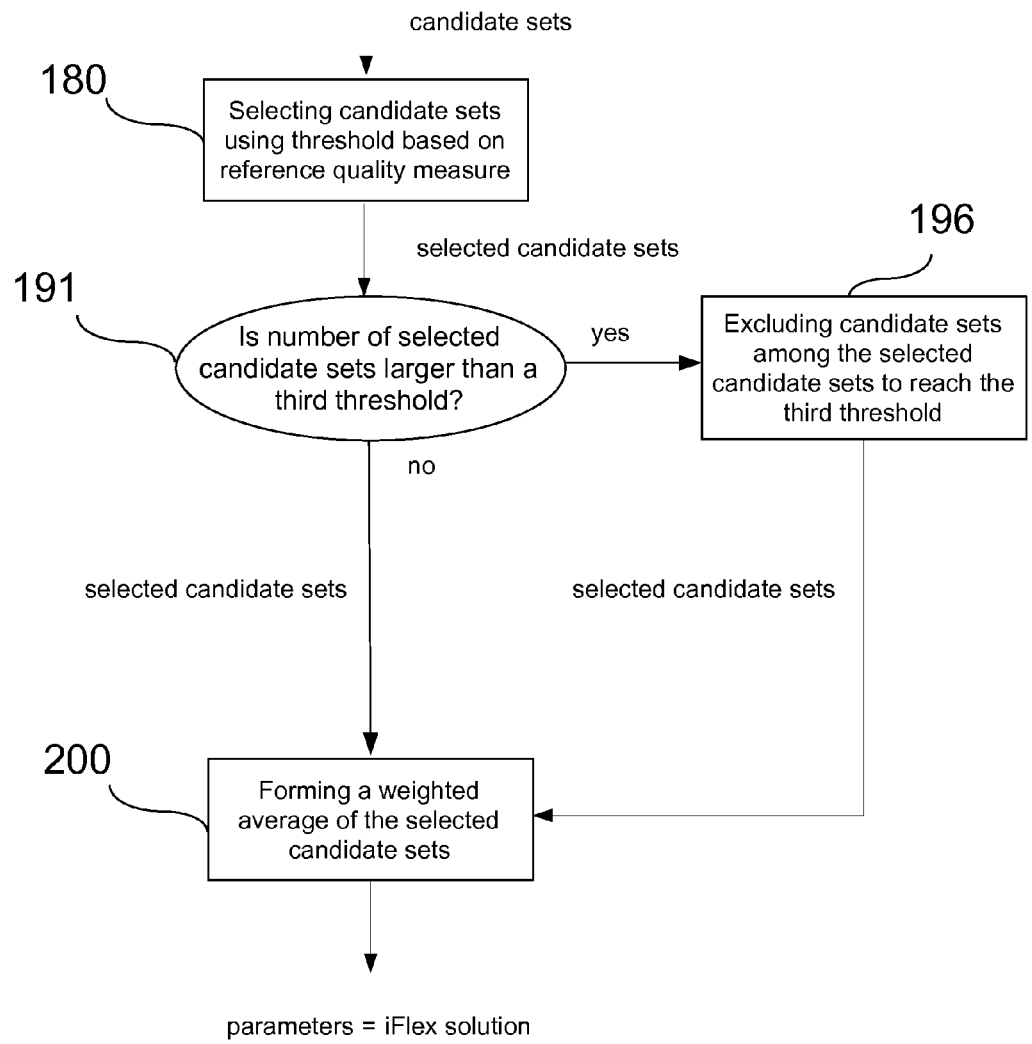
FIG. 10 is a flow chart illustrating a portion of one embodiment of a method of the invention, wherein, if the number of originally selected candidate sets is larger than necessary, some candidate sets are excluded.

In one embodiment, as illustrated in FIG. 10, if, as a result of the step 180 of selecting candidate sets based on the first threshold, i.e. based on the inclusion threshold referred to in FIGS. 6a to 6b for instance, the number of candidate sets is larger than a maximum number, further processing is carried out to remove some of the selected candidate sets from the selection obtained based on the first threshold. The maximum number of candidate sets is herein referred to as a third threshold. The third threshold is a threshold in terms of number of candidate sets, while the first threshold is a threshold in terms of quality measure of a candidate set.

If, as a result of the selection of step 180 based on the first threshold, the number of selected candidate sets (referred to herein as first number of selected candidate sets) is determined to be larger than a third threshold (step 191), a further step 196 of selecting is provided. In step 196, a third number of selected candidate sets are excluded in decreasing order starting with the selected candidate set having the lowest quality measure, wherein the third number is constituted by the difference between the first number of selected candidate sets and a third threshold defining a maximum number of candidate sets to be included in the weighted average.

It has been recognized that selecting too many candidate sets for forming the weighted average and the iFlex solution does not substantially improve the convergence of the iFlex solution. Selecting too many candidate sets also increases the computation burden to calculate the iFlex solution.

In one embodiment, the third threshold is comprised between 100 and 10000, and in one embodiment the third threshold is equal to 1000.

In one embodiment, the step 180 of selecting the candidate sets is interrupted once the third threshold is reached.

In one embodiment, the individual values of the iFlex solution are not fed back into the observation equations to fix some of the carrier phase ambiguities (constituent elements of vector a in equation (1)) to increase the over-determined character of the system of equations. In other words, no fixing of any of the ambiguities is injected back into the process of computing the float solution. At each iteration, i.e. each time a new set of observations is fed into the filter, the iFlex solution is computed anew from the generated float solution without using previous information from the iFlex solution. In contrast, the float solution is obtained from the filter (e.g. Kalman filter) which uses the past state vectors as part of the computation process.

In one embodiment, the above-described method includes using the weighted average to estimate a position of the receiver of the GNSS signals. The receiver may be a rover.

In one embodiment, in one of the above-described methods, the reference candidate set is the candidate set having the best quality measure.

In one embodiment, in one of the above-described methods, the quality measure of the candidate sets is constituted by a residual error norm value, the residual error norm value of a candidate set being a measure for a statistical distance of the candidate set to the state vector having the float ambiguities:

In one embodiment, in one of the above-described methods, the first threshold is determined as at least one of a fraction of the reference quality measure, a multiple of the reference quality measure, and a distance to the reference quality measure.

In one embodiment, any one of the above-described methods includes, if the number of selected candidate sets (referred to herein as first number of selected candidate sets) is smaller than a second threshold, selecting, for forming the weighted average, a second number of further candidate sets on the basis of the quality measures of the candidate sets in decreasing order starting with the non-selected candidate set having the best quality measure, the second number being constituted by the difference between the first number of selected candidate sets and a second threshold defining a minimum number of candidate sets to be included in the weighted average.

In one embodiment, any one of the above-described methods includes, if the number of selected candidate sets (referred to herein as first number of selected candidate sets) is larger than a third threshold, excluding a third number of selected candidate sets from forming the weighted average in decreasing order starting with the selected candidate set having the worst quality measure, wherein the third number is constituted by the difference between the first number of selected candidate sets and a third threshold defining a maximum number of candidate sets to be included in the weighted average.

In one embodiment, the selected candidate set having the worst quality measure is the integer ambiguity candidate set $\hat{a}_k$ which provides the largest residual error norm value, i.e. the largest value for $(\hat{a}-\hat{a}_k)^T Q_{\hat{a}}^{-1}(\hat{a}-\hat{a}_k)$. In one embodiment, the worst quality measure is the one which is the farthest from the best quality measure.

One aspect of the invention further includes an apparatus to estimate parameters derived from GNSS signals useful to determine a position. The apparatus includes a receiver of a GNSS signal from each of a plurality of GNSS satellites; a filter having a state vector at least comprising a float ambiguity for each received frequency of the GNSS signals, each float ambiguity constituting a real number estimate associated with an integer number of wavelengths of the GNSS signal between a receiver of the GNSS signal and the GNSS satellite from which it is received, and the filter being for estimating a float value for each float ambiguity of the state vector; and a processing element adapted, capable or configured to assign integer values to at least a subgroup of the estimated float values to define a plurality of integer ambiguity candidate sets;

select a first number of candidate sets having a quality measure better than a first threshold, wherein the first threshold is determined based on a reference quality measure of a reference candidate set; and obtain a weighted average of the selected candidate sets, each candidate set weighted in the weighted average based on its quality measure.

In one embodiment of the apparatus, the processing element is adapted, capable or configured to use the weighted average to estimate a position of the receiver of the GNSS signals.

In one embodiment of the apparatus, the reference candidate set is the candidate set having the best quality measure.

In one embodiment of the apparatus, the quality measure of the candidate sets is constituted by a residual error norm value, the residual error norm value of a candidate set being a measure for a statistical distance of the candidate set to the state vector having the float ambiguities.

In one embodiment of the apparatus, the processing element is adapted, capable or configured to determine the first threshold as at least one of a fraction of, a multiple of, and a distance to the reference quality measure.

In one embodiment of the apparatus, the processing element is adapted, capable or configured to, if the number of selected candidate sets (referred to herein as first number of selected candidate sets) is smaller than a second threshold, selecting, form the weighted average, a second number of further candidate sets on the basis of the quality measures of the candidate sets in decreasing order starting with the non-selected candidate set having the best quality measure, the second number being constituted by the difference between the first number of selected candidate sets and a second threshold defining a minimum number of candidate sets to be included in the weighted average.

In one embodiment of the apparatus, the processing element is adapted, capable or configured to, if the number of selected candidate sets (referred to herein as first number of selected candidate sets) is larger than a third threshold, exclude a third number of selected candidate sets from forming the weighted average in decreasing order starting with the selected candidate set having the worst quality measure, wherein the third number is constituted by the difference between the first number of selected candidate sets and a third threshold defining a maximum number of candidate sets to be included in the weighted average.

As explained in more details in section 6 entitled "[6. Combination of aspects and embodiments, and further considerations applicable to the above]", the receiver, the filter and the processing element of the above-described apparatuses may be separate from each other. As also explained in more details in section 6, the invention also relates to a computer program, to a computer program medium, to a computer program product and to a firmware update containing code instructions for carrying out any one of the above-described methods.

2. Scaling of Quality Measure

It has been mentioned above that the selection of candidate sets may be based on a threshold determined by the quality measure of a reference candidate set.

According to the one embodiment, the quality measure of the best candidate set is taken, in addition thereto or as an alternative, to adapt how the quality measure of the candidate sets is calculated. In this embodiment, the function providing the quality measure for a candidate set is a probability function of correctness of the combination of integers. The quality measure distribution may be adjusted to the expectation of the underlying observation errors. If the best candidate set is worse than the expectation value of the observation errors, the quality measure distribution is broadened. If the best candidate set is better than the expectation value, the quality measure distribution may also be narrowed. Only providing for broadening the quality measure distribution and not narrowing it is also possible.

This broadened or narrowed distribution of quality measures is then used to influence the weighted average.

One option is to influence the selection process of candidate sets by scaling the distribution of quality measures, where a broadened distribution leads to including more candidate sets into the weighted average and a narrowed distribution leads to including fewer candidate sets into the weighted average. Scaling the distribution in this respect refers to multiplying quality measures by a scaling factor.

Another option is to influence the forming of the weighted average from the selected candidate sets. A broadened distribution should lead to an equalizing tendency, wherein the equalizing tendency means that the influence of the contribution of candidate sets having different quality measures will tend be closer to one another so that less influence is put on the best quality measure when calculating the weighted average. In contrast, a narrowed distribution should lead to emphasizing the contribution of candidate sets having good quality measures in the weighted average so that more influence is put on the candidate set having the best quality measure when calculating the weighted average.

Both options may be combined.

According to one embodiment, a method for estimating parameters derived from GNSS signals (wherein the operations for scaling the quality measures are carried out) include obtaining observations of a GNSS signal from each of a plurality of GNSS satellites; feeding the observations to a filter having a state vector at least comprising a float ambiguity for each received frequency of the GNSS signals, each float ambiguity constituting a real number estimate associated with an integer number of wavelengths of the GNSS signal between a receiver of the GNSS signal and the GNSS satellite from which it is received, and the filter being for estimating a float value for each float ambiguity of the state vector; assigning integer values to at least a subgroup of the estimated float values to define a plurality of integer ambiguity candidate sets; determining a quality measure for each of the candidate sets; determining the best quality measure of the candidate sets; determining an expectation value of the candidate set having the best quality measure; determining an error measure as a ratio of the best quality measure to the expectation value; adapting the quality measures of the candidate sets as a function of the error measure; and obtaining a weighted average of a subgroup of the candidate sets on the basis of the adapted quality measures, wherein at least one of selecting the subgroup of the candidate sets and the weighting of each candidate set in the weighted average is based on the adapted quality measure.

The advantages of the method according to the above-mentioned aspect of the invention include the fact that the selection of the candidate sets to include into the weighted average is made in accordance with how well the statistical characteristics of the observation errors were predicted.

Figure 11A:
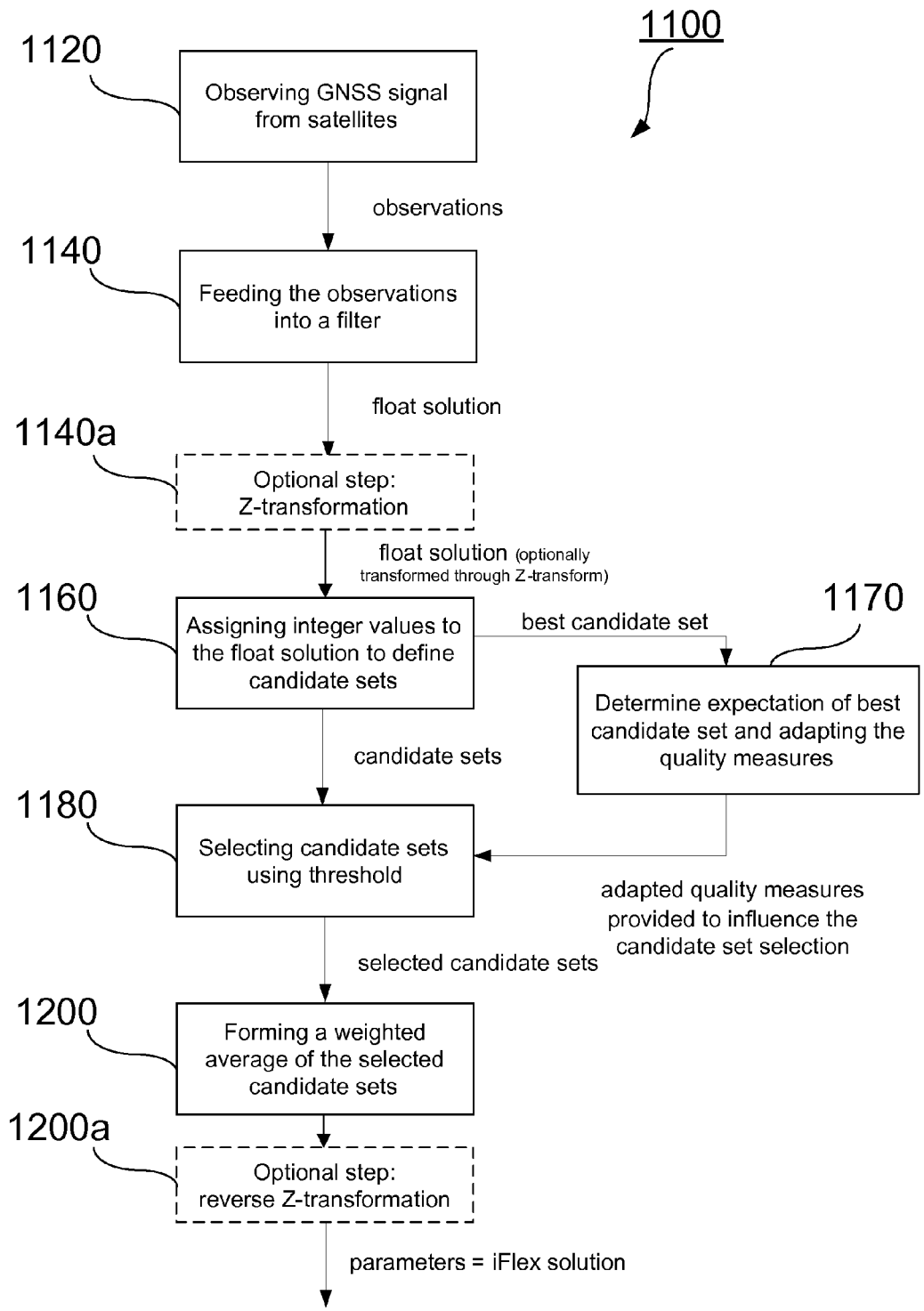
FIGS. 11a, 11b and 11c are three flow charts illustrating three embodiments of a method of the invention, wherein adapted quality measures are used to influence the formation of the weighted average.

One embodiment of the method of the invention is illustrated in FIG. 11a. The method 1100 includes a step 1120 of obtaining observations of GNSS signals from satellites, which is similar to the step 120 as described with reference to FIG. 5a. The output of the step is a series of observations, which correspond the elements of the vector y of equation system (1) (see background section). Then, the observations are fed into a filter (step 1140). This step is similar to the step 140 described with reference to FIG. 5a. The output of the step 1140 is a float solution, wherein the ambiguities are estimated as real numbers. The optional step 1140a of performing a Z-transformation, as illustrated in FIG. 11a, will be discussed below.

Integer values are then assigned to each one of the float values of the float solution to form integer candidate sets (step 1160). Step 1160 is similar to step 160 described with reference to FIG. 5a. In step 1180, some of the candidate sets defined and formed in step 1160 are selected using a threshold. In this embodiment, the threshold is not necessarily based on a reference quality measure, and may instead be a threshold corresponding to an absolute quality measure value.

In the embodiment illustrated in FIG. 11a, after the step 1160 of assigning integer values to the float solution to define candidate sets, a best candidate set is identified. The best candidate set is used in step 1170. In this step, the expectation of the best candidate set is determined, and based on the expectation of the best candidate set, the quality measure of the other candidate sets, or the function for computing the quality measure of the candidate set, is modified. Namely, if the quality measure of the best candidate set is better than expected, the quality measure function is modified so that the number of selected candidate sets is decreased. In contrast, if the quality measure of the best candidate set is worse than expected, the quality measure of the other candidate sets is modified so as to include more candidate sets in the weighted average.

As an output of step 1170, the adapted quality measures are provided to influence the selection of candidate sets.

Finally, the weighted average of selected candidate sets is formed in step 1200. The iFlex solution is obtained as an output of step 1200. The optional step 1200a of performing a reverse Z-transformation, as illustrated in FIG. 11a, is discussed below.

In one embodiment (illustrated by the optional step 1140a in FIG. 11a), after step 1140 but before step 1160, the float solution is transformed to a more orthogonal space, for instance using a Z-transform as disclosed at the end of section 3.3 of the background section. From a computational standpoint, the Z-transform approach enables to efficiently cover the integer search space. Although the iFlex technique may be carried out without the Z-transform, it is advantageous to use the Z-transform for a practical implementation. Other decorrelation techniques may be used. If a Z-transformation is carried out on the float solution, a reverse Z-transformation should also be performed, as illustrated by the optional step 1200a in FIG. 11a. Although not illustrated in all Figures, such as on FIGS. 11b and 11c, the Z-transformation and the reverse Z-transformation also constitute optional and advantageous steps in the context of the other embodiments.

Figure 11B:
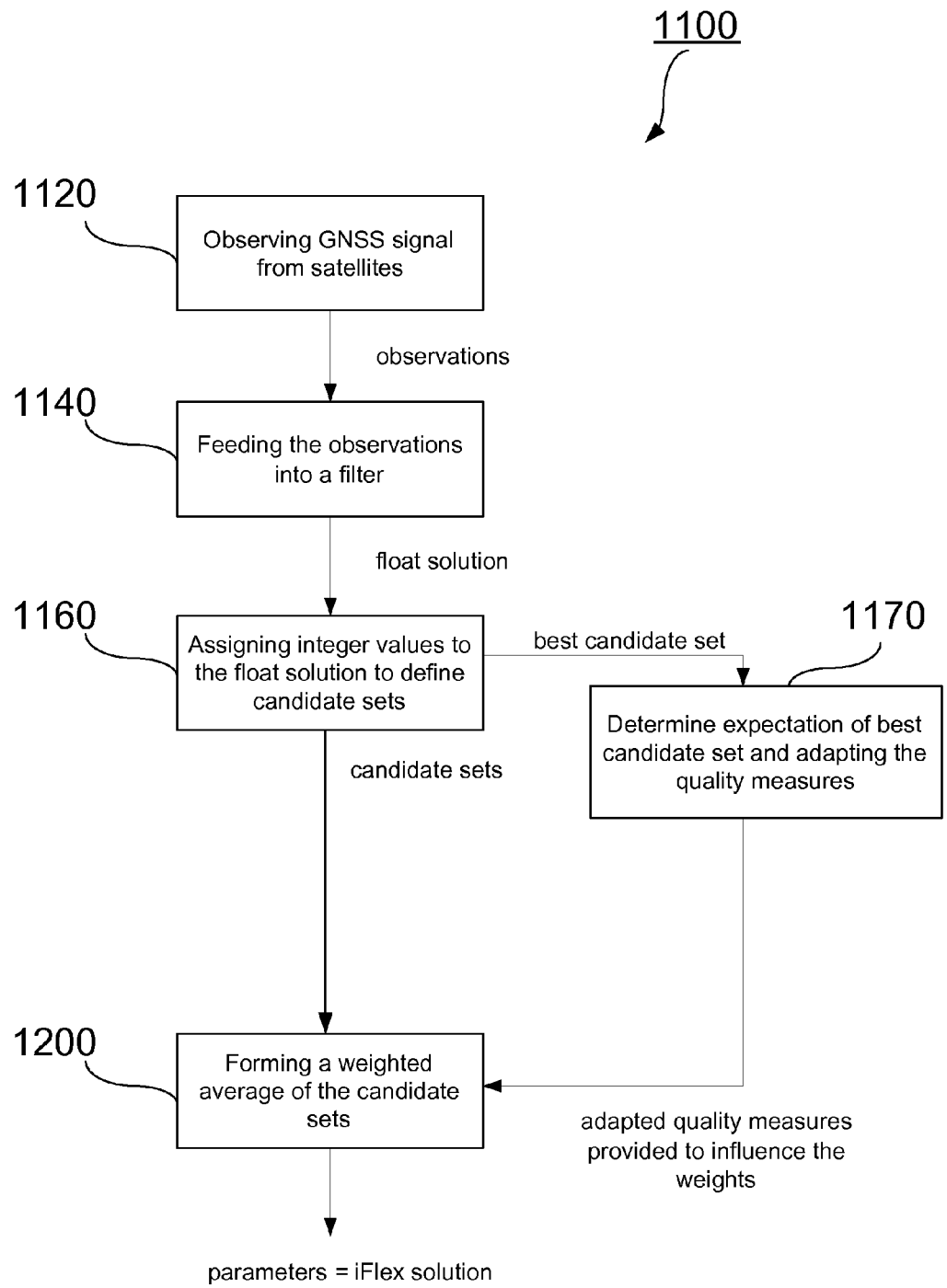

FIG. 11b illustrates another embodiment of a method 1100 of the invention. In this embodiment, the adapted quality measures are provided to influence the weights of the weighted average of candidate sets formed in step 1200. Step 1180 illustrated in FIG. 11a is not represented in FIG. 11b because in this case all the candidate sets within an uncertainty region may be taken into account for forming the weighted average as a basis of the iFlex solution.

Figure 11C:
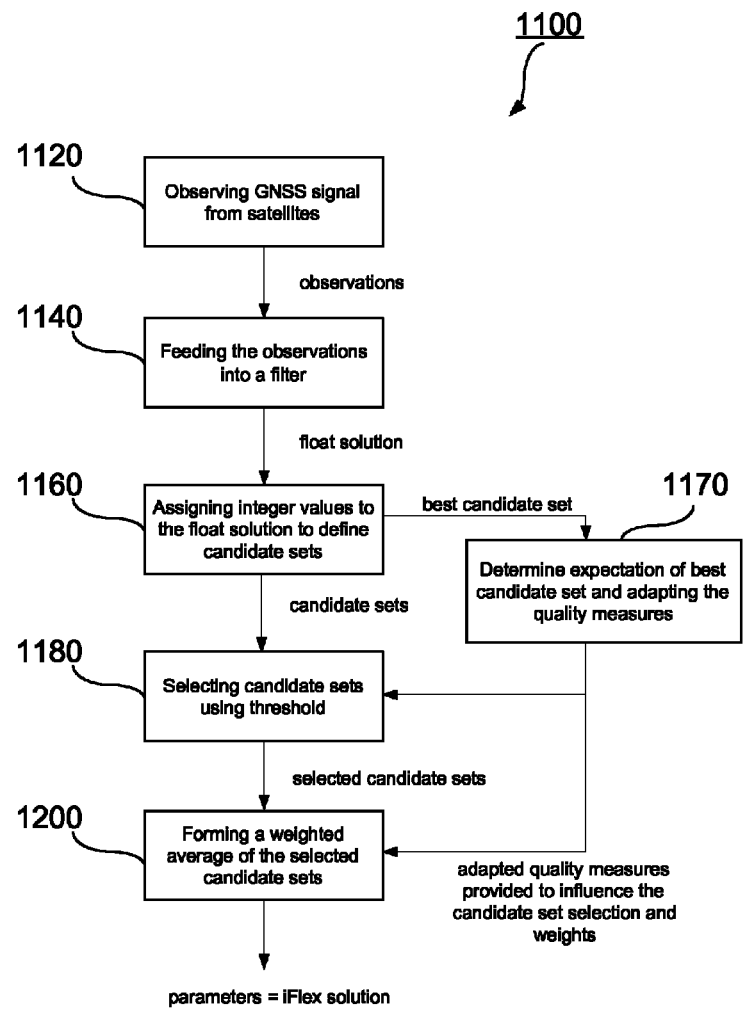

FIG. 11c illustrates a method 1100 of an embodiment of the invention, which constitutes a combination of the embodiments illustrated in FIGS. 11a and 11b. Namely, the best candidate set is used in step 1170 as follows. The expectation of the best candidate set is determined and the quality measures are adapted accordingly. The adapted quality measures are provided to influence both the candidate set selection (in step 1180) and the weights of the weighted average (formed in step 1200).

Figure 12:
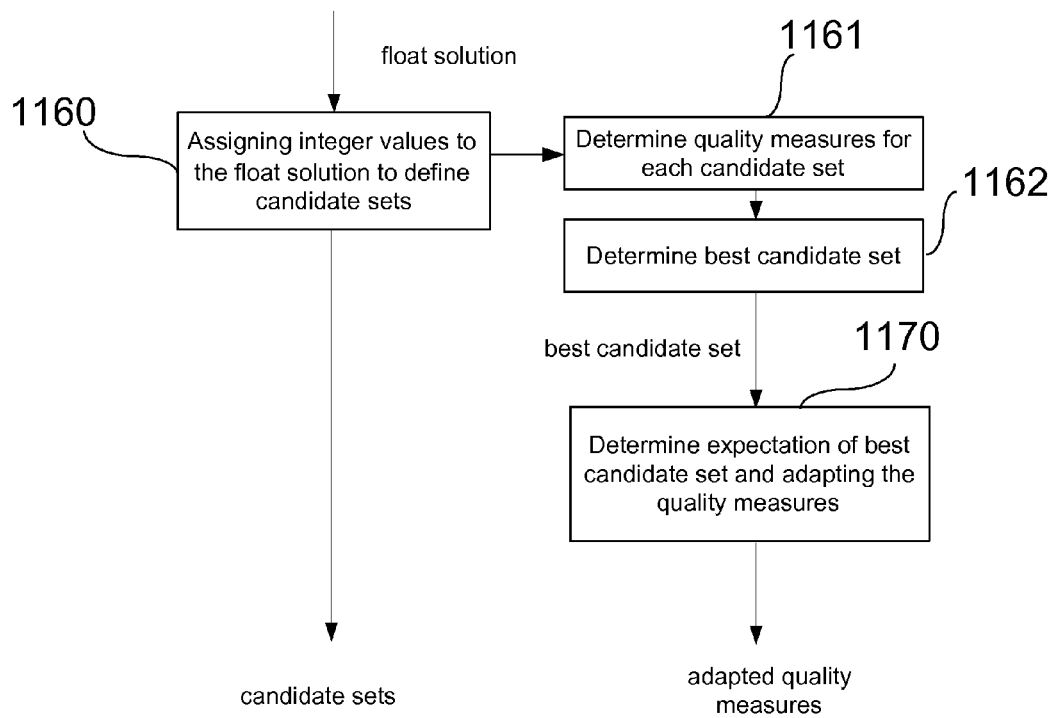
FIG. 12 illustrates a portion of the flowcharts of FIGS. 11a to 11c.

FIG. 12 illustrates more details about the transition between steps 1160 and 1170 in FIGS. 11a to 11c. After the step 1160 of assigning integer values to the float solution to define candidate sets, the quality measures of each candidate sets is determined (step 1161). The best candidate set is then identified (step 1162) and the expectation of the best candidate set is determined so as to adapt the quality measures (step 1170). The adapted quality measures, which are the output of step 1170, are used for influencing the selection of candidate sets or the weights of the weighted average, or both.

Figure 13A:
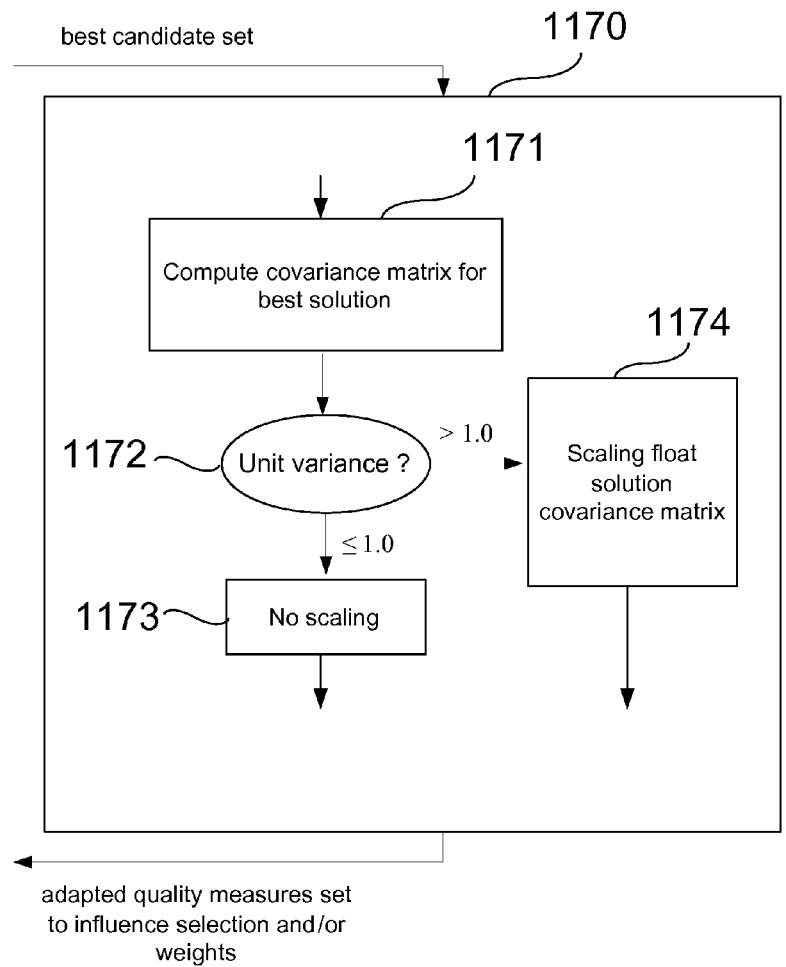
FIGS. 13a and 13b illustrate details of one of the steps, i.e. step 1170, as illustrated in FIGS. 11a to 11c.
Figure 13B:
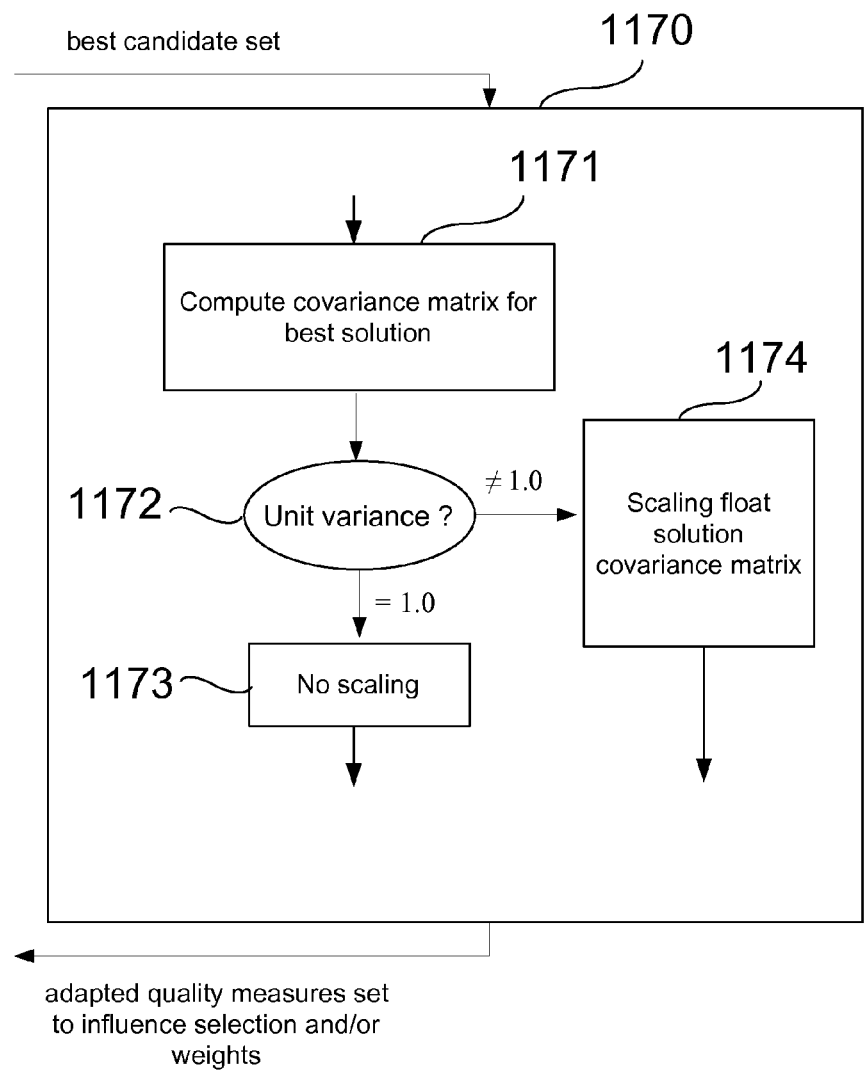

FIGS. 13a and 13b illustrate two embodiments of the step 1170 consisting in determining the expectation of the best candidate sets and adapting the quality measures accordingly.

In FIG. 13a, the covariance matrix of the best solution, i.e. of the best candidate sets, is computed (step 1171). Then, the unit variance is computed (step 1172). If the unit variance is smaller than or equal to 1.0, no scaling is performed (step 1173). Otherwise, namely if the unit variance is larger than 1.0, the covariance matrix of the float solution is scaled (step 1174). If the unit variance is larger than 1.0, this means that the statistical properties of the residual were set in a too optimistic manner. This practical implementation of adapting the quality network as a function of the expectation of the best candidate set may then be used to influence the candidate set selection and/or the weights of the weighted average to form the iFlex solution.

FIG. 13b illustrates an embodiment of the step 1170 which is similar to the one described with reference to FIG. 13a, except that the covariance matrix of the float solution is scaled (step 1174) not only when the unit variance is larger than 1.0 (meaning that an optimistic choice of the statistical properties of the residuals has been made), but also when the unit variance is smaller than 1.0 (meaning that a pessimistic choice of the statistical properties of the residuals has been made). In other words, if it is determined, in step 1172, that the unit variance is equal to 1.0, no scaling is performed (step 1173). If, in contrast, it is determined in step 1172, that the unit variance is different than 1.0, the covariance matrix of the float solution is scaled (step 1174).

A margin around the value 1.0 may be taken. For instance, step 1172 may amount to checking whether the unit variance is comprised between 1.0−epsilon and 1.0+epsilon, where epsilon is a margin having for instance a value of 0.05.

The scaling is used to adjust, or change, the statistical properties of the noise (residuals e of equation system (1)).

Figure 14:
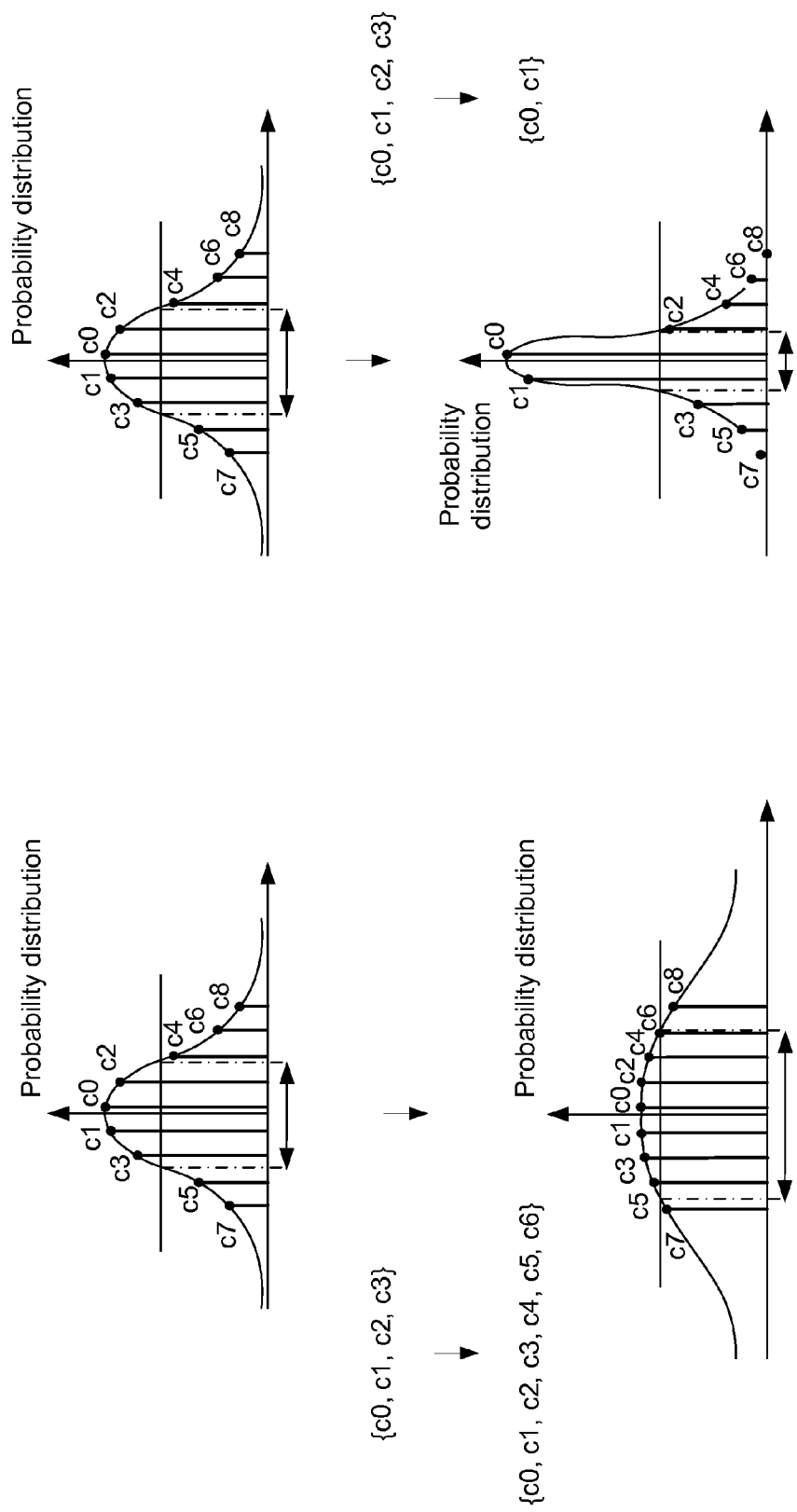
FIG. 14 illustrates the scaling of the probability distribution of residuals before selecting and/or forming the weighted average of the candidate sets.

FIG. 14 illustrates on the left-hand side the scaling of the probability distribution of the residuals in an optimistic situation (unit variance being larger than 1.0 or larger than (1.0+ epsilon)). The scaling illustrated on the right-hand side of FIG. 14 illustrates the scaling of the probability distribution of the residuals in the case of a pessimistic choice of the statistical properties of the residuals (unit variance smaller than 1.0 or smaller than (1.0−epsilon)).

A few exemplary candidate sets (denoted $c0, c1, \ldots c8$) are shown as vertical lines from the horizontal axis on the probability distribution function (PDF) graphs of FIG. 14. It can be seen that the scaling results in changes in the weights for the candidate sets (shown as different heights of the vertical lines on the PDF) as well as possibly including more candidate sets or fewer candidate sets. The left-hand side of FIG. 14 shows four candidate sets $\{c0, c1, c2, c3\}$ before scaling of the covariance matrix of the float solution (top left graph on FIG. 14), and seven candidate sets $\{c0, c1, c2, c3, c4, c5, c6\}$ after scaling of the covariance matrix (bottom left graph on FIG. 14). The right-hand side of FIG. 14 shows four candidate sets $\{c0, c1, c2, c3\}$ before scaling (top right graph on FIG. 14), and two candidate sets $\{c0, c1\}$ after scaling (bottom right graph on FIG. 14). The graphs are only examples and actual cases may include many more candidate sets.

In one embodiment, the above-described method includes adapting the quality measures of the candidate sets as a function of the error measure by adjusting the variance-covariance matrix of the float solution.

In one embodiment, the above-described method includes adjusting a variance-covariance matrix of the filter using the error measure, if the error measure is in a predetermined range.

In one embodiment, the above-described method includes adjusting a variance-covariance matrix of the filter using the error measure, if the error measure is larger than one.

One aspect of the invention further includes an apparatus to estimate parameters derived from GNSS signals useful to determine a position. The apparatus includes a receiver adapted to obtain observations of a GNSS signal from each of a plurality of GNSS satellites; a filter having a state vector at least comprising a float ambiguity for each received frequency of the GNSS signals, each float ambiguity constituting a real number estimate associated with an integer number of wavelengths of the GNSS signal between a receiver of the GNSS signal and the GNSS satellite from which it is received, and the filter being for estimating a float value for each float ambiguity of the state vector; and a processing element adapted, capable or configured to assign integer values to at least a subgroup of the estimated float values to define a plurality of integer ambiguity candidate sets;

determine a quality measure for each of the candidate sets;

determine the best quality measure of the candidate sets;

determine an expectation value of the candidate set having the best quality measure;

determine an error measure as a ratio of the best quality measure to the expectation value;

adapt the quality measures of the candidate sets as a function of the error measure; and obtain a weighted average of a subgroup of the candidate sets on the basis of the adapted quality measures, wherein at least one of selecting the subgroup of the candidate sets and the weighting of each candidate set in the weighted average is based on the adapted quality measure.

In one embodiment of the apparatus, the processing element is adapted, capable or configured to adapt the quality measures of the candidate sets as a function of the error measure by adjusting the variance-covariance matrix of the float solution.

In one embodiment of the apparatus, the processing element is adapted, capable or configured to adjust a variance-covariance matrix of the filter using the error measure, if the error measure is in a predetermined range.

In one embodiment of the apparatus, the processing element is adapted, capable or configured to adjust a variance-covariance matrix of the filter using the error measure, if the error measure is larger than one.

As explained in more details in section 6 entitled "[6. Combination of aspects and embodiments, and further considerations applicable to the above]", the receiver, the filter and the processing element of the above-described apparatuses may be separate from each other. As also explained in more details in section 6, the invention also relates to a computer program, to a computer program medium, to a computer program product and to a firmware update containing code instructions for carrying out any one of the above-described methods.

3. Indication of Convergence of Weighted Average Solution

In one embodiment, a method to estimate parameters derived from GNSS signals useful to determine a position, includes obtaining observations of a GNSS signal from each of a plurality of GNSS satellites; feeding the observations to a filter having a state vector comprising a float ambiguity for each received frequency of the GNSS signals, each float ambiguity constituting a non integer estimate of an integer number of wavelengths of the GNSS signal between a receiver of the GNSS signal and the GNSS satellite from which it is received, the filter estimating a float value for each float ambiguity of the state vector and covariance values associated with the state vector; assigning integer values to at least a subgroup of the estimated float values to define a plurality of integer ambiguity candidate sets; obtaining a weighted average of the candidate sets; determining a formal precision value based on covariance values of the filter, the formal precision value being a measure for an achievable precision; determining an achieved precision value of the weighted average; comparing the achieved precision value with the formal precision value to obtain a convergence value; and indicating a convergence of the determination of the state vector.

The advantages of this aspect of the invention notably include providing an indication to the users as to which extent the iFlex has converged to a float fixed solution.

Figure 15:
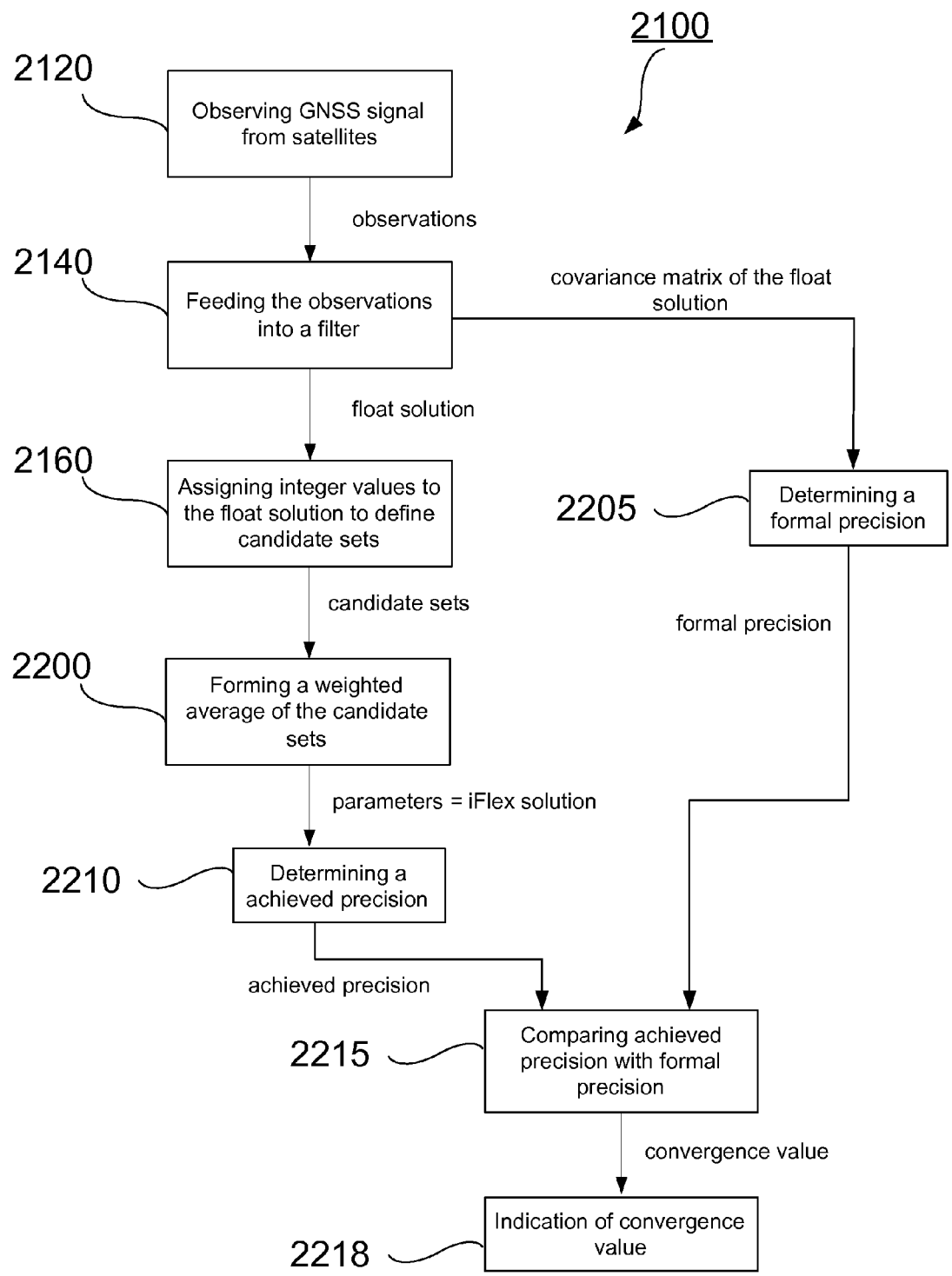
FIG. 15 is a flowchart illustrating an embodiment of a method of the invention, wherein a formal precision and an achieved precision are determined to provide an indication of the convergence of the position estimation process.

In one embodiment of the invention, illustrated in FIG. 15, a further method 2100 to estimate parameters derived from GNSS signals useful to determine a position is provided. The considerations regarding the Z-transformation, as mentioned above with respect to other embodiments, also apply to the present embodiments.

The method includes a step 2120 of obtaining observations of a GNSS signal from each of a plurality of GNSS satellites. This step is similar to the steps 120 and 1120 as described with reference to FIG. 5a and FIG. 11a to 11c.

The method further includes a step 2140 of feeding the observations to a filter having a state vector comprising a float ambiguity for each received frequency of the GNSS signals, each float ambiguity constituting a real number estimate of an integer number of wavelengths of the GNSS signal between a receiver of the GNSS signal and the GNSS satellite from which it is received, the filter estimating a float value for each float ambiguity of the state vector and covariance values associated with the state vector. This step is similar to the steps 140 and 1140 as described with reference to FIG. 5a and FIG. 11a to 11c.

The method further includes a step 2160 of assigning integer values to the estimated float values, or to at least a subgroup of the estimated float values, to define a plurality of integer ambiguity candidate sets. This step is similar to the steps 160 and 1160 as described with reference to FIG. 5a and FIG. 11a to 11c.

A weighted average of the candidate sets is then outputted to form the so-called iFlex solution (step 2200). All the integer ambiguity candidate sets of an uncertainty region as illustrated with reference to FIGS. 2a to 2e may be selected in step 2160 for forming the weighted average in step 2200. Alternatively, only a subset of the candidate sets of an uncertainty region may be selected. Namely, the candidate sets being the closest to the float solution (output of step 2140) may be selected for forming the weighted average in step 2200.

In step 2205, a formal precision value is determined based on the covariance values of a completely fixed-integer solution. That is, from the covariance matrix of the float solution obtained from step 2140, the formal precision is determined. This is done by assuming that, in the covariance matrix of the float solution, the integer values are known. This provides a "formal precision". The expression "formal precision" here relates to the precision a correct fixed solution would have, which is the equivalent to a completely converged iFlex solution.

In step 2210, an achieved precision value of the weighted average, i.e. of the iFlex solution, is determined. The achieved precision corresponds to the formal precision plus the additional uncertainty caused by the iFlex weighted sum.

The achieved precision value (obtained in step 2210) is then compared with the formal precision value (obtained in step 2205) to obtain a convergence value (step 2215).

A convergence of the determination of the state vector is then indicated (step 2218). The indication of convergence provides information to the user(s) (e.g., to the user of a rover or more generally to an observer of the processing operation at a network processing station) as to how close the iFlex solution has converged with respect to the correct fixed solution. This is because the achieved precision takes into account the error due to the iFlex solution (due to averaging the selected candidate sets) and the theoretical margin error of a fixed solution (obtained by fixing the integer values). When the error due to the iFlex solution approaches zero, the achieved precision approaches the theoretical margin error and the iFlex may be declared fixed to the user.

The formal precision may be obtained as follows. The float solution obtained in step 2140 may be characterized by the vector:

$$\begin{bmatrix} \hat{a} \\ \hat{b} \end{bmatrix} \quad (12)$$

wherein
- the diacritic symbol ˆ above parameters indicates that the parameters are derived from the float solution;
- $\hat{a}$ is the vector of dimension n comprising the carrier phase ambiguities derived from the float solution; and
- $\hat{b}$ is the vector of dimension p comprising the remaining parameters, i.e. the so-called baseline parameters, also derived from the float solution (see equation (1) in background section).

The covariance matrix associated with the float solution is $$\begin{bmatrix} Q_{\hat{a}} & Q_{\hat{a}\hat{b}} \\ Q_{\hat{b}\hat{a}} & Q_{\hat{b}} \end{bmatrix} \quad (13)$$

Once the float solution has been mapped to an integer solution, by mapping the real number estimated â of carrier phase ambiguities from $R^n$ to $Z^n$, the formal precision is obtained by the expression:

$$Q_{\hat{b}} - Q_{\hat{b}\hat{a}} Q_{\hat{a}}^{-1} Q_{\hat{b}\hat{a}}^T \quad (14)$$

wherein
- $Q_{\hat{b}}$ is the covariance matrix of the baseline parameters derived from the float solution;
- $Q_{\hat{b}\hat{a}}$ is the covariance matrix of the baseline parameters derived from the float solution and the carrier phase ambiguities derived from the float solution;
- $Q_{\hat{a}}^{-1}$ is the inverse of the covariance matrix of the carrier phase ambiguities derived from the float solution; and
- $Q_{\hat{b}\hat{a}}^T$ is the transpose of the covariance matrix $Q_{\hat{b}\hat{a}}$.

The achieved precision may be obtained as follows. The covariance matrix of the iFlex solution is calculated by the expression:

$$[Q_{\hat{b}} - Q_{\hat{b}\hat{a}} Q_{\hat{a}}^{-1} Q_{\hat{b}\hat{a}}^T] + \left[\frac{Q_{\bar{b}_{SUM}}}{\kappa_{SUM}} - \bar{b}_{IFLEX} \bar{b}_{IFLEX}^T\right] \quad (15)$$

wherein
$Q_{\bar{b}_{SUM}}$ is the covariance of the accumulated iFlex baseline parameters, which is equal to $$\sum_{\hat{a}_k \in Z^n} \hat{b}_k \hat{b}_k^T \kappa(\hat{a}_k);$$

$\kappa(\hat{a}_k)$ is the weight for integer ambiguity candidate $\hat{a}_k$
$\kappa_{SUM}$ is the sum of weights accumulated from each candidate;
$\bar{b}_{IFLEX}$ is the iFlex baseline parameters; and
$\bar{b}_{IFLEX}^T$ is the transpose of $\bar{b}_{IFLEX}$.
In other words, $$\left[\frac{Q_{\bar{b}_{SUM}}}{\kappa_{SUM}} - \bar{b}_{IFLEX} \bar{b}_{IFLEX}^T\right]$$

is the contribution to the covariance of the iFlex solution due to the weighted sum, or the additional uncertainty caused by the iFlex weighted sum, on top of the theoretical uncertainty due to the GNSS model itself.

When the trace of $$[Q_{\hat{b}} - Q_{\hat{b}\hat{a}} Q_{\hat{a}}^{-1} Q_{\hat{b}\hat{a}}^T] + \left[\frac{Q_{\bar{b}_{SUM}}}{\kappa_{SUM}} - \bar{b}_{IFLEX} \bar{b}_{IFLEX}^T\right],$$

which is the achieved precision, approaches the trace of $[Q_{\hat{b}} - Q_{\hat{b}\hat{a}} Q_{\hat{a}}^{-1} Q_{\hat{b}\hat{a}}^T]$, which is the formal precision, the iFlex position covariance matrix approaches the position covariance matrix of the integer ambiguity solution (i.e. the integer-constrained ambiguity solution). The degree of convergence may therefore be indicated by comparing the achieved precision and the formal precision.

When it is determined in the comparison step 2215 that the achieved precision is sufficiently close to the formal precision, an indication of convergence value is provided to the user, indicating that the iFlex solution has converged sufficiently as to be practically equivalent to a correct fixed solution for the user's purposes.

In one embodiment, the convergence value is obtained in step 2215 by comparing the achieved precision value with the formal precision value, wherein comparing includes computing the ratio of the achieved precision value to the formal precision value.

The ratio computed to obtain the convergence value may for instance be:

$$\frac{tr\left\{[Q_{\hat{b}} - Q_{\hat{b}\hat{a}} Q_{\hat{a}}^{-1} Q_{\hat{b}\hat{a}}^T] + \left[\frac{Q_{\bar{b}_{SUM}}}{\kappa_{SUM}} - \bar{b}_{IFLEX} \bar{b}_{IFLEX}^T\right]\right\}}{tr\left\{[Q_{\hat{b}} - Q_{\hat{b}\hat{a}} Q_{\hat{a}}^{-1} Q_{\hat{b}\hat{a}}^T]\right\}} \quad (16)$$

Wherein the "tr{ }" operator is the trace operator (the trace of a square matrix is the sum of the elements on the main diagonal, i.e. the diagonal from the upper left to the lower right).

Alternatively, the ratio computed to obtain the convergence value may for instance be:

$$\frac{\det\left\{[Q_{\hat{b}} - Q_{\hat{b}\hat{a}} Q_{\hat{a}}^{-1} Q_{\hat{b}\hat{a}}^T] + \left[\frac{Q_{\bar{b}_{SUM}}}{\kappa_{SUM}} - \bar{b}_{IFLEX} \bar{b}_{IFLEX}^T\right]\right\}}{\det\left\{[Q_{\hat{b}} - Q_{\hat{b}\hat{a}} Q_{\hat{a}}^{-1} Q_{\hat{b}\hat{a}}^T]\right\}} \quad (17)$$

wherein the det{ } operator is the matrix determinant operator.

In one embodiment, the method described with reference to FIG. 16a further includes a step of determining 2225 an instance in time when the achieved precision of the position is better than a convergence threshold; and a step of indicating 2230 a convergence of the determination of the state vector at and after the determined instance in time.

This will be better understood with reference to FIG. 16a, which is a flowchart of one embodiment of the step 2218 of providing an indication of a convergence value, as illustrated in FIG. 15. Step 2218 comprises a substep 2225 of determining that the convergence (which may be the ratio of the achieved precision value to the formal precision value, as mentioned above) is better than a convergence threshold at an instant t=t0. After said determination is made in step 2225, an absolute or fixed convergence is indicated in step 2230 from the instant t0 to the instant t0+ΔH, wherein ΔH is a duration during which the indication of fixed convergence is kept despite the convergence value being below the convergence threshold.

This mechanism provides retention of the fixed indication to the user(s). Flickering of the convergence indication between an indication "fixed" and an indication "float" is therefore avoided.

Figures 16D, 16E:
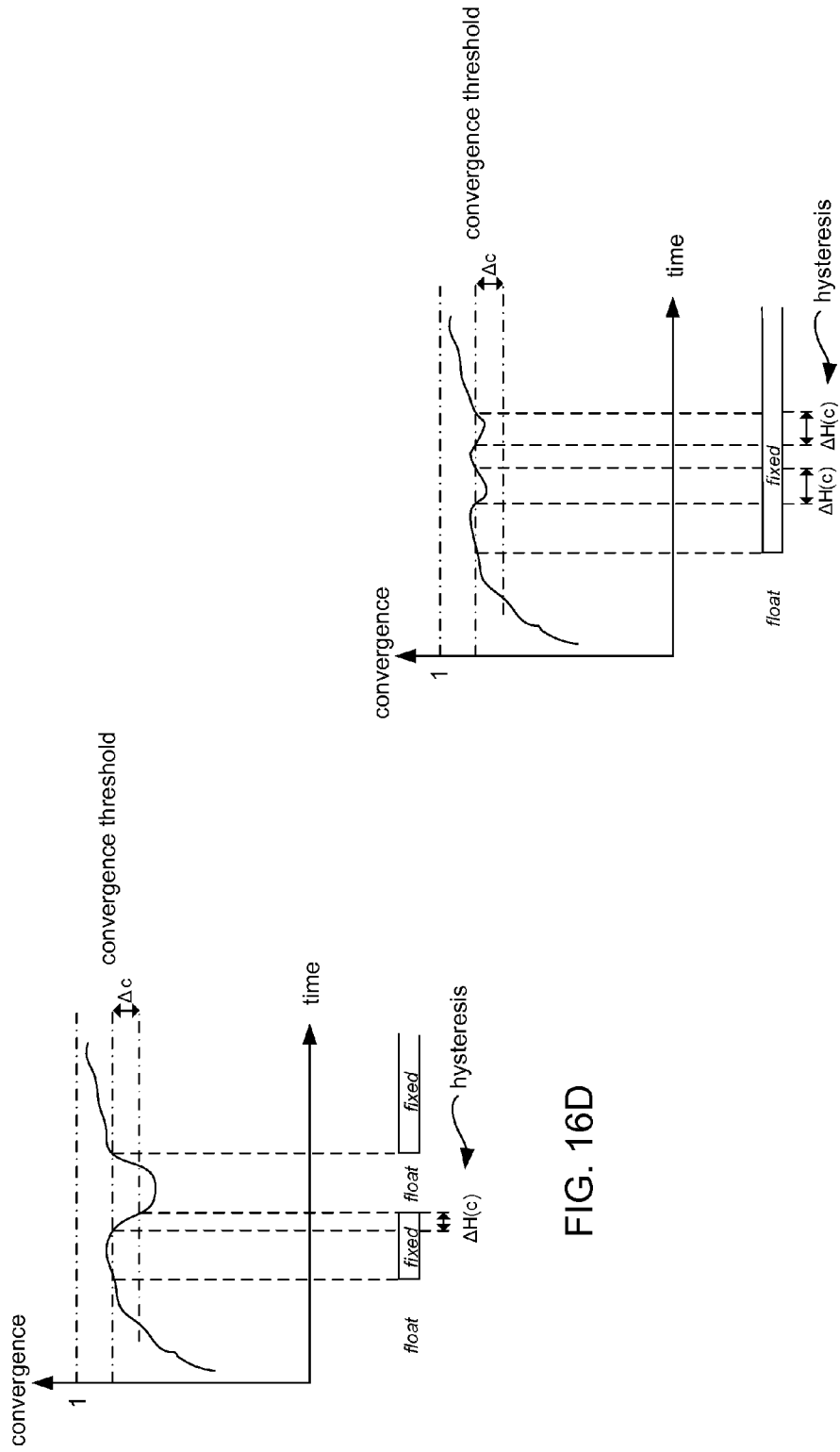

The duration ΔH may be constant (and for instance determined in advance as a configuration parameter, i.e. predetermined), as illustrated in FIGS. 16b and 16c, or may depend on the extent of deviation of the convergence value below the convergence threshold, as illustrated in FIGS. 16d and 16e.

Examples of implementation of step 2218 of providing a convergence value indication will now be described with reference to FIGS. 16b to 16e.

FIG. 16b illustrates the evolution in time of the convergence of the iFlex solution with respect to the correct fixed solution. As mentioned above, the convergence may be computed as the ratio of the achieved precision to the formal precision. A convergence value of 1 (one) would mean that the weighted average solution has converged completely to the fixed solution, and that any further improvement cannot be expected from the weighted average of selected candidate sets.

Starting on the left-hand side of the graph of FIG. 16b, the convergence value is shown to increase, while still being below the convergence threshold (having a value of 0.95 for instance). In this situation, the indication provided to the user is "float" (as illustrated on the bottom of FIG. 16b). Once the convergence value reaches the convergence threshold, the indication provided to the user on the receiver is switched from "float" to "fixed". As long as the convergence value stays above the convergence threshold, the convergence indication is "fixed". Thereafter, when the convergence value decreases below the convergence threshold, the provided convergence indication is not immediately switched to "float". During a duration ΔH(t) during which the convergence value is below the convergence threshold, the indication stays "fixed". The duration ΔH(t) is the so-called indication hysteresis.

The instant t0, described with reference to step 2225 in FIG. 16a, corresponds the point in time wherein the convergence value crosses the convergence thresholds downwards.

Once the duration ΔH(t) is exceeded, i.e. once the convergence value has been below the convergence threshold for the duration longer than ΔH(t), the convergence indication is switched from "fixed" to "float".

Finally, still as shown on FIG. 16b, when the convergence value returns above the convergence threshold, the indication is switched again from "float" to "fixed".

FIG. 16c illustrates a similar example, wherein the hysteresis duration ΔH(t) is a constant duration (such as a constant predetermined duration). In the example illustrated in FIG. 16c, after the convergence value has reached the convergence threshold for the first time, it does not return back below the convergence threshold for durations longer than ΔH(t). Therefore, the convergence indication stays "fixed" after first crossing the convergence threshold.

FIG. 16d illustrates an example wherein the hysteresis duration is not set as a constant duration, but instead the hysteresis duration is dependent on the actual deviation Δc of the convergence value below the convergence threshold. The notation ΔH(c) indicates that the hysteresis is dependent on the deviation of the convergence value from the convergence threshold (i.e. below the convergence threshold).

From the left-hand side of FIG. 16d, it can be shown that the convergence value increases up to reaching the convergence threshold. At that point, the convergence indication is switched from "float" to "fixed". Then, after staying above the convergence threshold for a while, the convergence value decreases so as to cross the convergence threshold and then decreases again below the convergence threshold, to a certain extent.

The convergence indication stays "fixed" during the hysteresis duration ΔH(c), i.e. until the convergence value has decreased by the convergence deviation Δc below the convergence threshold. At that point, the convergence indication is switched back from "fixed" to "float".

The indication "float" is kept until the convergence value crosses the convergence threshold again. At that point, the indication is switched to "fixed" again.

FIG. 16e illustrates another example wherein the hysteresis duration depends on a deviation Δc from the convergence threshold. In the example illustrated in FIG. 16e, after first reaching the convergence threshold, the convergence value does not decrease below the convergence threshold by more than the deviation Δc. Therefore, the provided convergence indication stays "fixed".

A convergence indication process having hysteresis characteristics improves stability and the system usability.

The hysteresis duration has been described above as either having a constant duration (FIGS. 16b and c) or a duration dependent on the extent of deviation from the convergence threshold (FIGS. 16d and e). In one embodiment, the hysteresis duration is dependent both on the time spent by the convergence value under the convergence threshold and on the extent of deviation from the convergence threshold.

Figure 17B:
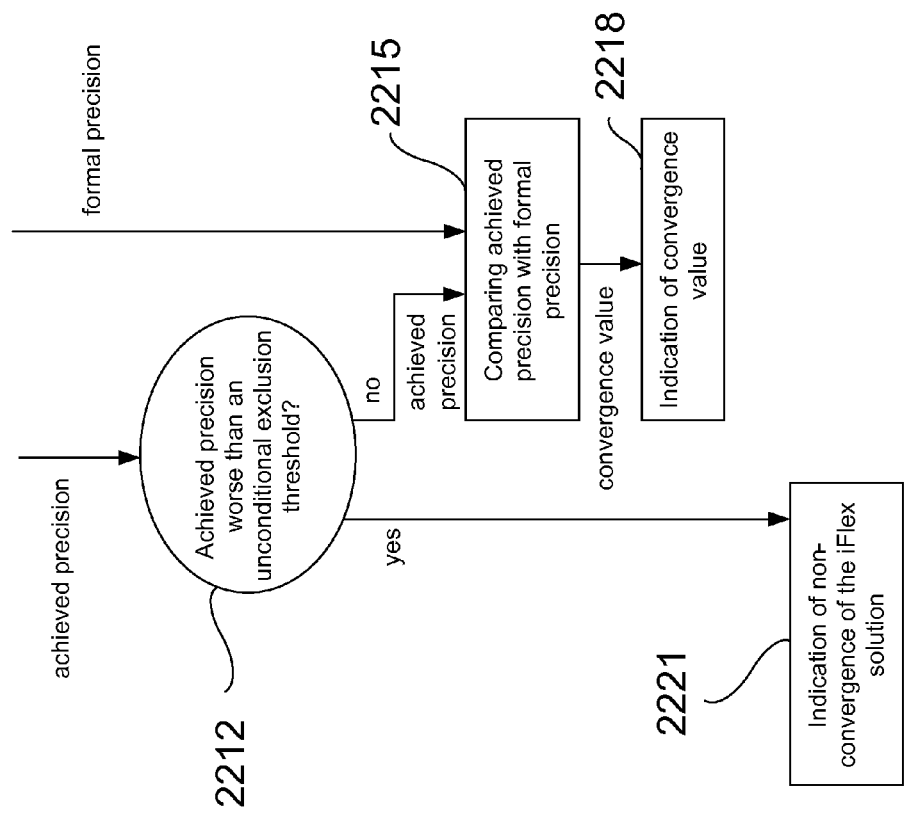
FIGS. 17a and 17b illustrate a flowchart portion of a method of one embodiment of the invention, wherein unconditional inclusion and exclusion thresholds respectively are used in the process of providing an indication of the convergence of the iFlex solution.
Figure 17A:
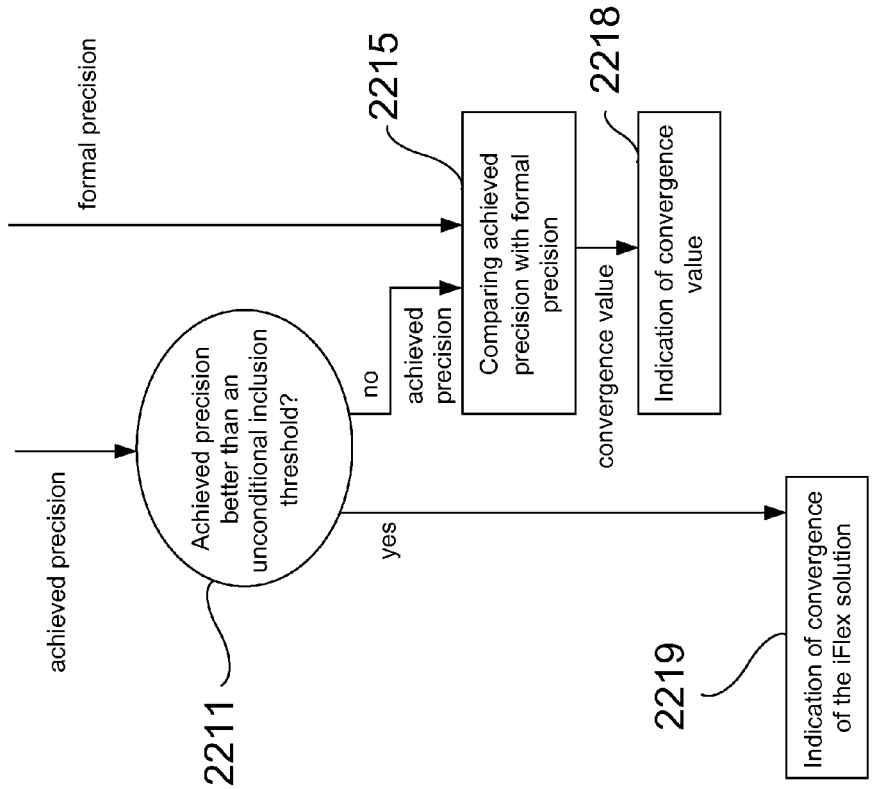

FIG. 17a illustrates one embodiment of the method described with reference to FIG. 15. In the embodiment illustrated in FIG. 17a, once the achieved precision has been determined (step 2210, not illustrated in FIG. 17a, but on FIG. 15), it is determined (step 2211) whether the achieved precision is better than an unconditional inclusion threshold. If so, it is indicated (step 2219) that the iFlex solution has converged ("fixed" indication). Otherwise, the steps 2215 and 2218 of comparing the achieved precision with the formal precision and indicating a convergence value accordingly are carried out. These steps have been described with reference to FIG. 15.

FIG. 17b illustrates one embodiment wherein, after the achieved precision has been determined (step 2210, not illustrated in FIG. 17a, but on FIG. 15), it is determined (step 2212) whether the achieved precision is worse than an unconditional exclusion threshold. If so, it is indicated (step 2221) that the iFlex solution has not converged ("float" indication). Otherwise, the steps 2215 and 2218 are carried out, as described with reference to FIG. 15.

The embodiments described with reference to FIG. 17a (use of an unconditional inclusion threshold for the achieved precision) and with reference to FIG. 17b (use of an unconditional exclusion threshold for the achieved precision) may be combined.

Figures 18A, 18B:
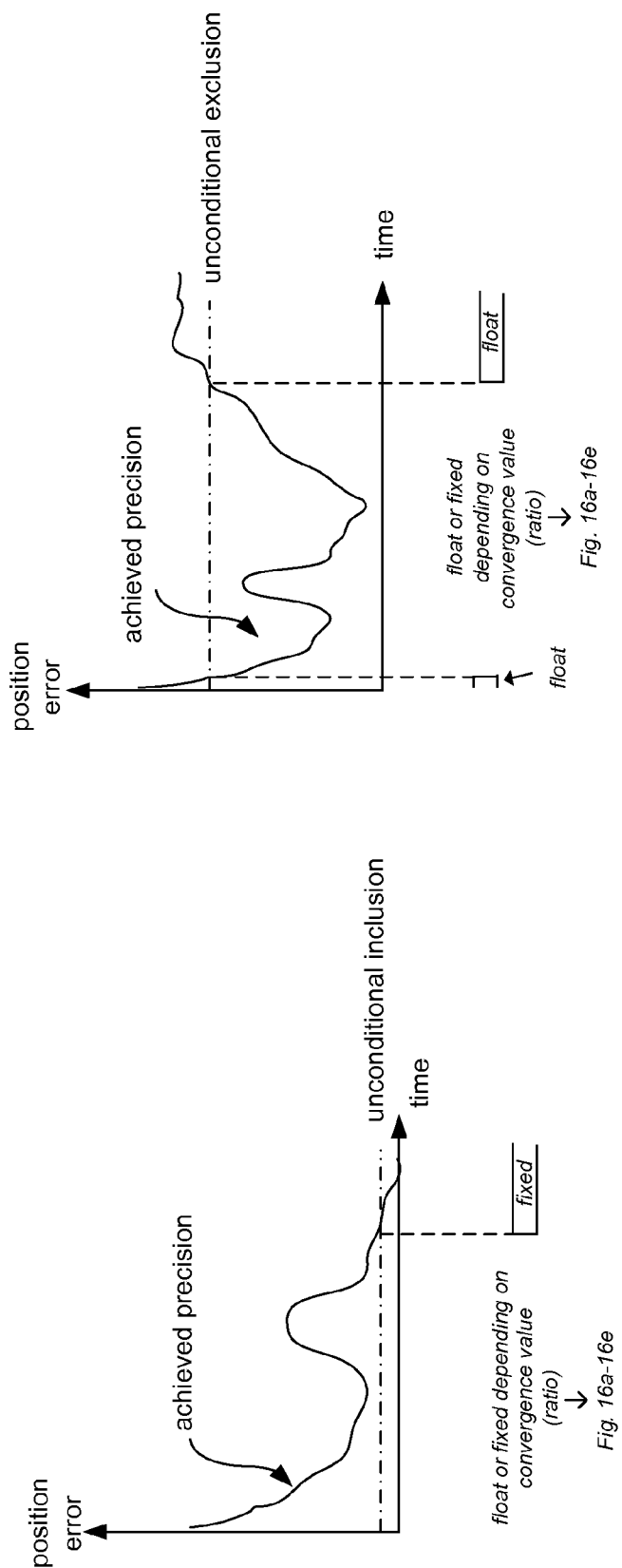
FIGS. 18a to 18d illustrate examples wherein an indication of convergence is provided based on the achieved precision in embodiments derived from those described with reference to FIGS. 17a and 17b.
Figure 18C:
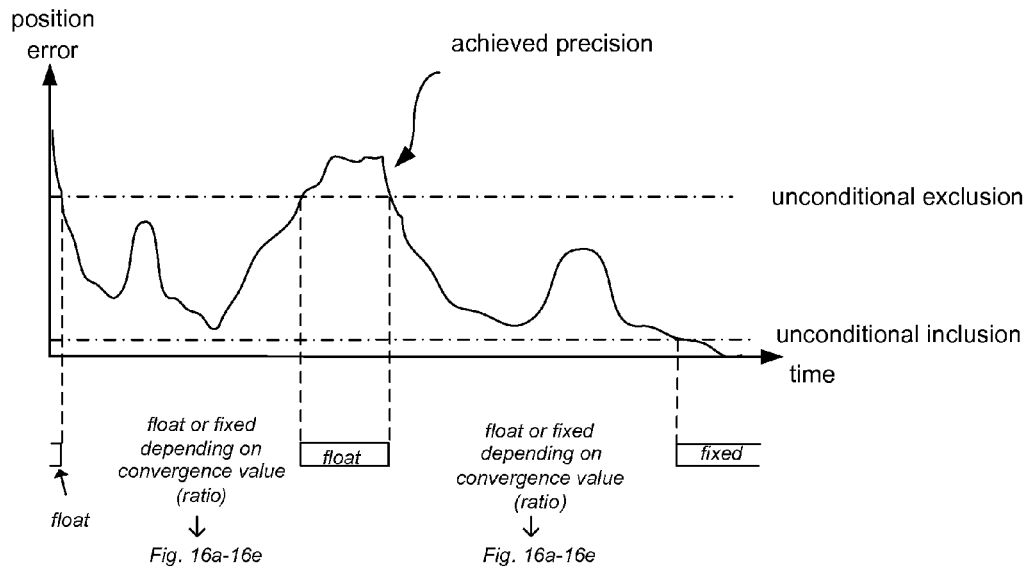
Figure 18D:
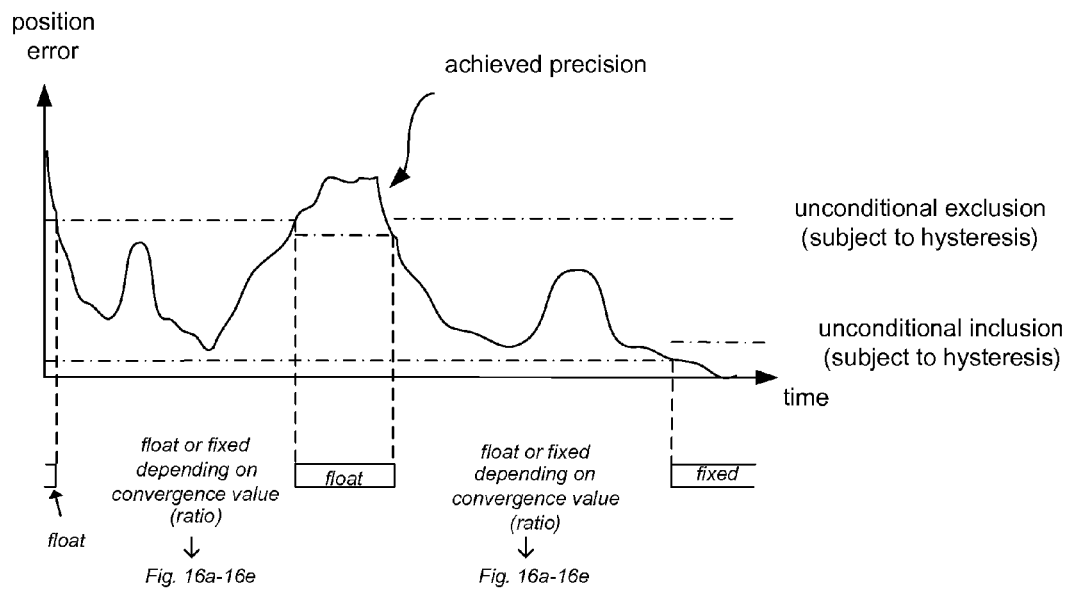

FIGS. 18a to 18d illustrate two examples of applying inclusion and exclusion thresholds to the achieved precision determined in step 2210. Namely, FIG. 18a illustrates an example of the application of the unconditional inclusion threshold, FIG. 18b illustrates an example of application of the unconditional exclusion threshold, FIG. 18c illustrates an example of combined application of the unconditional inclusion threshold and the unconditional exclusion threshold, and FIG. 18d illustrates an example of combined application of the unconditional inclusion threshold and the unconditional exclusion threshold, wherein hysteresis are applied in relation to both the unconditional inclusion and exclusion thresholds (to improve the indication stability).

FIG. 18a illustrates an example of evolution of the achieved precision. The graph shows the achieved position precision (for instance in centimeters) as a function of time (for instance in seconds). Starting from the left-hand side of the graph, as long as the achieved precision is above the unconditional inclusion threshold, the convergence indication provided to the user is determined depending on the convergence value (corresponding for instance to the ratio of the achieved precision value to the formal precision value), as explained with reference to FIGS. 16a to 16e. As soon as the achieved precision reaches the unconditional inclusion threshold, the convergence indication is "fixed", whatever the value of the formal precision.

FIG. 18b illustrates an example of application of the unconditional exclusion threshold. Starting on the left-hand side of the graph, the achieved precision is shown to improve (to decrease on the graph), while still being above the unconditional exclusion threshold. In that case (extreme left-hand side of the graph), the provided convergence indication is "float" (as shown on the bottom of FIG. 18b) whatever the value of the formal precision.

As soon as the achieved precision decreases below the unconditional exclusion threshold, the convergence indication becomes dependent on the convergence value, as explained with reference to FIGS. 16a to 16e. If, at one point in time, the achieved precision returns to a level above the unconditional exclusion threshold, the convergence indication is "float" whatever the value of the formal precision.

FIG. 18c illustrates an example of combined application of the unconditional exclusion threshold and the unconditional inclusion threshold. First, the value of the achieved position precision is above the unconditional exclusion threshold so that the indication provided to the users is "float" whatever the value of the formal precision (extreme left-hand side of the graph). When the achieved precision is comprised between the unconditional exclusion threshold and the unconditional inclusion threshold, the convergence indication becomes dependent on the convergence value, as explained with reference to FIGS. 16a to 16e. When the achieved position precision decreases below the unconditional inclusion threshold, the convergence indication is "fixed" whatever the value of the formal precision.

FIG. 18d illustrates the combined application of the unconditional inclusion threshold and the unconditional exclusion threshold to the achieved precision, wherein the two thresholds are subject to hysteresis (to improve the stability of the indications provided to the users). The example of FIG. 18d is similar to the example of FIG. 18c except that when the achieved position precision increases above the unconditional exclusion threshold, the unconditional exclusion threshold is decreased by a certain deviation (this results in the application of a hysteresis). The achieved precision then only leaves the exclusion region (wherein the convergence indication "float" is provided whatever the value of the formal position), if the achieved precision decreases below the temporarily decreased unconditional exclusion threshold. As soon as the achieved precision has decreased below the temporarily decreased unconditional exclusion threshold, the unconditional exclusion threshold is set back to its original level.

The same applies to the unconditional inclusion threshold. Namely, as soon as the achieved precision decreases below the unconditional inclusion threshold, the level of the unconditional inclusion threshold is raised by a given deviation. The indication "fixed" is provided to the users constantly and whatever the value of the formal precision until the achieved precision increases above the temporarily increased unconditional inclusion threshold. At that point in time, the unconditional inclusion threshold is set back to its original level.

In one embodiment of the method, the convergence value is obtained as a ratio of the achieved precision value to the formal precision value.

In one embodiment, the method includes determining an instance in time when the convergence value of the position is better than a convergence threshold; and indicating a convergence of the determination of the state vector at and after the determined instance in time.

In one embodiment, the method includes estimating an achieved precision of a position of the receiver determined based on the weighted ambiguities; and indicating a convergence of the determination of the state vector, if the achieved precision of the position is better than an inclusion threshold.

In one embodiment, the method includes estimating an achieved precision of a position of the receiver determined based on the weighted ambiguities; and indicating a non-convergence of the determination of the state vector, if the achieved precision of the position is worse than an exclusion threshold.

One aspect of the invention further includes an apparatus to estimate parameters derived from GNSS signals useful to determine a position, including a receiver adapted to obtain observations of a GNSS signal from each of a plurality of GNSS satellites; a filter having a state vector comprising a float ambiguity for each received frequency of the GNSS signals, each float ambiguity constituting a non integer estimate of an integer number of wavelengths of the GNSS signal between a receiver of the GNSS signal and the GNSS satellite from which it is received, the filter estimating a float value for each float ambiguity of the state vector and covariance values associated with the state vector; and a processing element adapted, capable or configured to assign integer values to at least a subgroup of the estimated float values to define a plurality of integer ambiguity candidate sets;

obtain a weighted average of the candidate sets;

determine a formal precision value based on covariance values of the filter, the formal precision value being a measure for an achievable precision;

determine an achieved precision value of the weighted average;

compare the achieved precision value with the formal precision value to obtain a convergence value; and indicate a convergence of the determination of the state vector.

In one aspect of the apparatus, the processing element is adapted, capable or configured to obtain the convergence value as a ratio of the achieved precision value to the formal precision value.

In one aspect of the apparatus, the processing element is adapted, capable or configured to determine an instance in time when the convergence value of the position is better than a convergence threshold; and indicate a convergence of the determination of the state vector at and after the determined instance in time.

In one aspect of the apparatus, wherein the processing element is adapted, capable or configured to estimate an achieved precision of a position of the receiver determined based on the weighted ambiguities; and indicate a convergence of the determination of the state vector, if the achieved precision of the position is better than an inclusion threshold.

In one aspect of the apparatus, the processing element is adapted, capable or configured to estimate an achieved precision of a position of the receiver determined based on the weighted ambiguities; and indicate a non-convergence of the determination of the state vector, if the achieved precision of the position is worse than an exclusion threshold.

As explained in more details in section 6 entitled "[6. Combination of aspects and embodiments, and further considerations applicable to the above]", the receiver, the filter and the processing element of the above-described apparatuses may be separate from each other. As also explained in more details in section 6, the invention also relates to a computer program, to a computer program medium, to a computer program product and to a firmware update containing code instructions for carrying out any one of the above-described methods.

4. Keeping Legacy Observations after Interruption of Tracking

For determining the carrier phase ambiguities, i.e. the unknown number of cycles of the observed carrier signal from each of the satellites to the receiver, a filter is used. The filter estimates the state of the dynamic system (the GNSS system). The state is represented by a state vector including the carrier phase ambiguities (undifferenced or single-differenced or double-differenced ambiguities).

The ambiguities indicate the unknown number of cycles of the carrier between the receiver and the satellite at a particular instance in time, e.g. when initializing the system, and thus are fixed values. By collecting more and more observations into the filter, the state vector of the filter gradually converges to stable values of the ambiguities.

During the evolving time, usually a phase locked loop tracks the carrier signal and determines the additional number of cycles to be added or deducted from the initial value that is to be estimated by the filter. In principle, the distance between the receiver and the satellite can then be determined at a particular instance in time on the basis of the initial unknown number of cycles of the state vector and the additionally tracked number of oscillations of the phase locked loop. The distance to multiple satellites determines the position of the receiver. Single-differenced or double-differenced ambiguities between different satellites and receivers, however, are also useful for determining a position of the receiver.

When a satellite rises or sets or otherwise is obstructed and the corresponding observations of a signal cannot or only insufficiently be made, in other words, the signal cannot be tracked, the ambiguity value corresponding to this signal of the satellite conventionally may be removed from the state vector. If the satellite reappears or if a new satellite appears, ambiguities may then be added to the state vector and updated over subsequent instances in time.

In an alternative, in one embodiment of the invention, rather than removing ambiguities for frequencies that drop out and adding ambiguities for appearing frequencies, an ambiguity value of a signal in the state vector is maintained despite the loss of tracking of the signal. It has been recognized that even if the GNSS signal cannot be tracked, the accuracy of the weighted average determined on the basis of the candidate sets may be improved.

It may even be considered to maintain the previous last tracked ambiguity value after an interruption in tracking for a certain period in time, before allowing an update of this ambiguity value in the state vector, in order to allow first collecting enough observations.

In one embodiment, a method is provided to estimate parameters derived from GNSS signals useful to determine a position, including obtaining observations of each of received frequencies of a GNSS signal from a plurality of GNSS satellites to obtain observations at a plurality of instances in time; feeding the time sequence of observations to a filter to estimate a state vector at least comprising float ambiguities, wherein each float ambiguity constitutes a non integer estimate of an integer number of wavelengths for a received frequency of a GNSS signal between a receiver of the GNSS signal and the GNSS satellite from which it is received and wherein the float ambiguities of the state vector are updated over time on the basis of the observations; determining that an interruption in tracking of at least one signal of a satellite occurred; maintaining the float ambiguity of the state vector for the at least one signal for which an interruption in tracking occurred at the value before the interruption in tracking occurred; assigning integer values to at least a subgroup of the estimated float values to define a plurality of integer ambiguity candidate sets; determining a quality measure for each of the candidate sets; and obtaining a weighted average of the candidate sets.

The advantages of this aspect of the invention notably include the fact that the precision of the float solution, and therefore also of the weighted average based therein is improved. This is because more data is taken into account in the filter, and more variables are maintained in the state vector.

Figure 19:
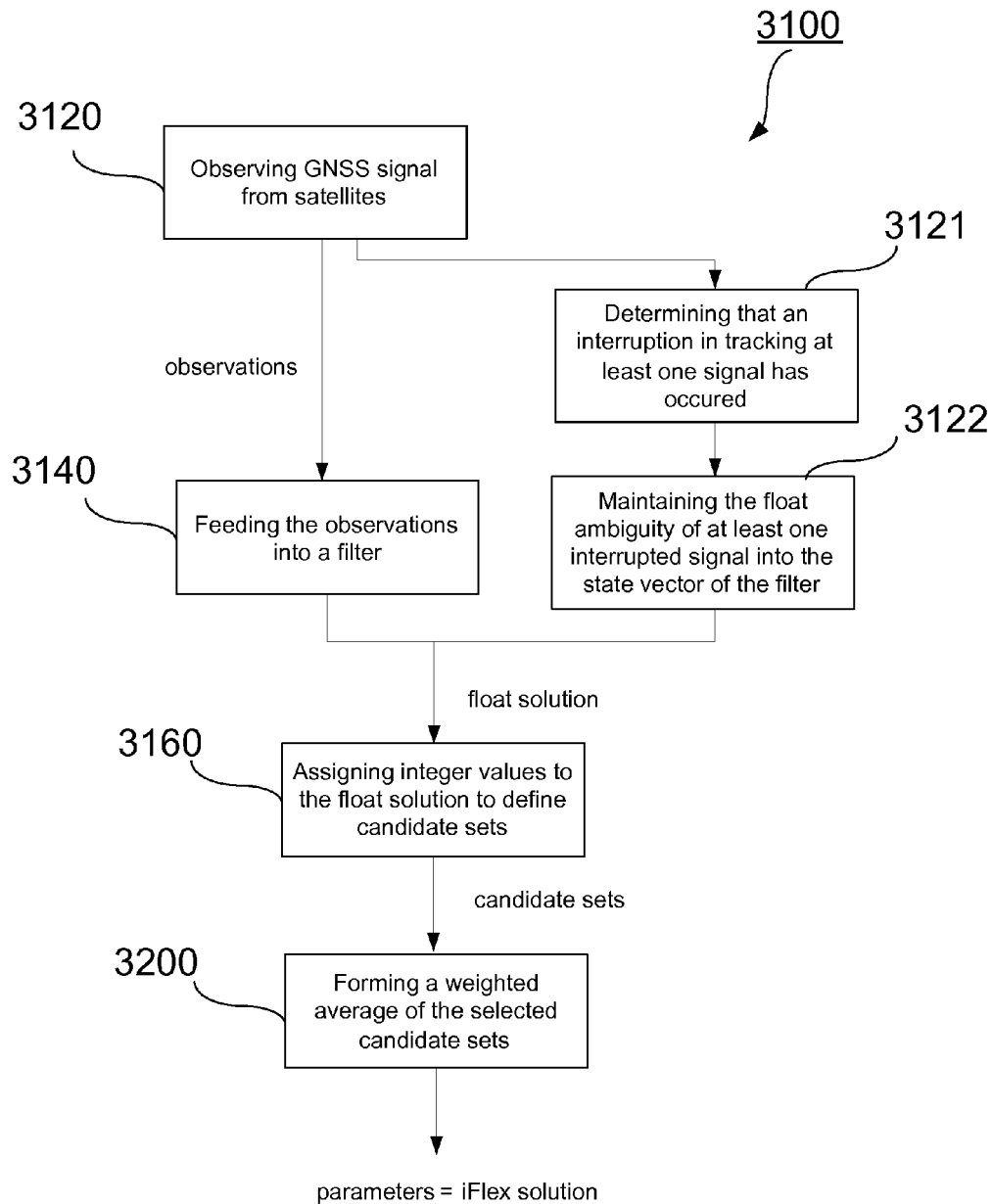
FIGS. 19 and 20 are two flowcharts illustrating two embodiments of a method of the invention, wherein satellite legacy observations are kept after interruption of the tracking of the satellite signals in view of improving the position estimation.

In one embodiment, a method is provided to estimate parameters derived from GNSS signals useful to determine the position. The considerations regarding the Z-transformation, as mentioned above with respect to other embodiments, also apply to the present embodiments. As illustrated in FIG. 19, the method 3100 includes a step 3120 of obtaining observations of each of the received frequencies of a GNSS signal from a plurality of GNSS satellites to obtain observations at the plurality of instances in time. This step corresponds to the step 120 of FIG. 5a, the step 1120 of FIG. 11a, and the step 2120 of FIG. 15, except that it is herewith specified that the observation of the frequencies of the GNSS signals are obtained at a plurality of instance in time.

The observations at the plurality of instances in time are fed in step 3140 into a filter to estimate a state vector at least comprising float ambiguities. Each float ambiguity constitutes a real number estimate of an integer number of wavelengths for a received frequency of a GNSS signal between a receiver and a satellite. The float ambiguities of the state vector are updated over time on the basis of the observations. The filter may be implemented using a recursive filter for estimating the state of a dynamic system (in the present case, the GNSS system), such a Kalman filter.

The method also comprises a step 3121 of determining that an interruption in tracking of at least one signal of a satellite has occurred. This may for instance be caused by a satellite being no longer observed or observable (for instance because it has set).

The method also includes a step 3122 consisting in maintaining the float ambiguity of the state vector for the at least one signal for which an interruption in tracking has occurred. Float ambiguity of the state vector is maintained at the value it was before the interruption in tracking.

The steps 3140 and 3122 both relate to the operation of the filter which provides a float solution, which has been already described with reference to FIG. 5a.

The method further includes a step 3160 of assigning integer values to at least a subgroup of the estimated float values to define the plurality of integer ambiguity candidate sets. Step 3160 corresponds to step 160 described above.

A quality measure for each of the integer ambiguity candidate sets is then determined, and a weighted average of the candidate sets is obtained in step 3200. The weighted average provides the iFlex solution, as described with reference to step 200 of FIG. 5a.

In one embodiment, it is determined that an interruption in tracking of at least one signal of a satellite has occurred if one observation for at least one signal is not available for at least one of the instance in time (for instance at least one of the GPS epochs).

In one embodiment, it is determined that an interruption in tracking of at least one signal of a satellite occurred, if a cycle slip has occurred. A cycle slip results from a loss of lock of the carrier phase tracking loop of one carrier transmitted from one satellite. A cycle slip causes a discontinuity in tracking of the cycles.

In one embodiment, if, after an interruption in tracking of a signal, the tracking of the signal resumes, the float ambiguity of the state vector for the signal for which an interruption in tracking has occurred is maintained at the value it had before the interruption in tracking has occurred. This float ambiguity is maintained as a first float ambiguity. In addition, a second float ambiguity is introduced into the state vector of the filter for taking into account the signal obtained after resumption of the tracking. This embodiment will be explained in more details with reference to FIG. 20.

Figure 20:
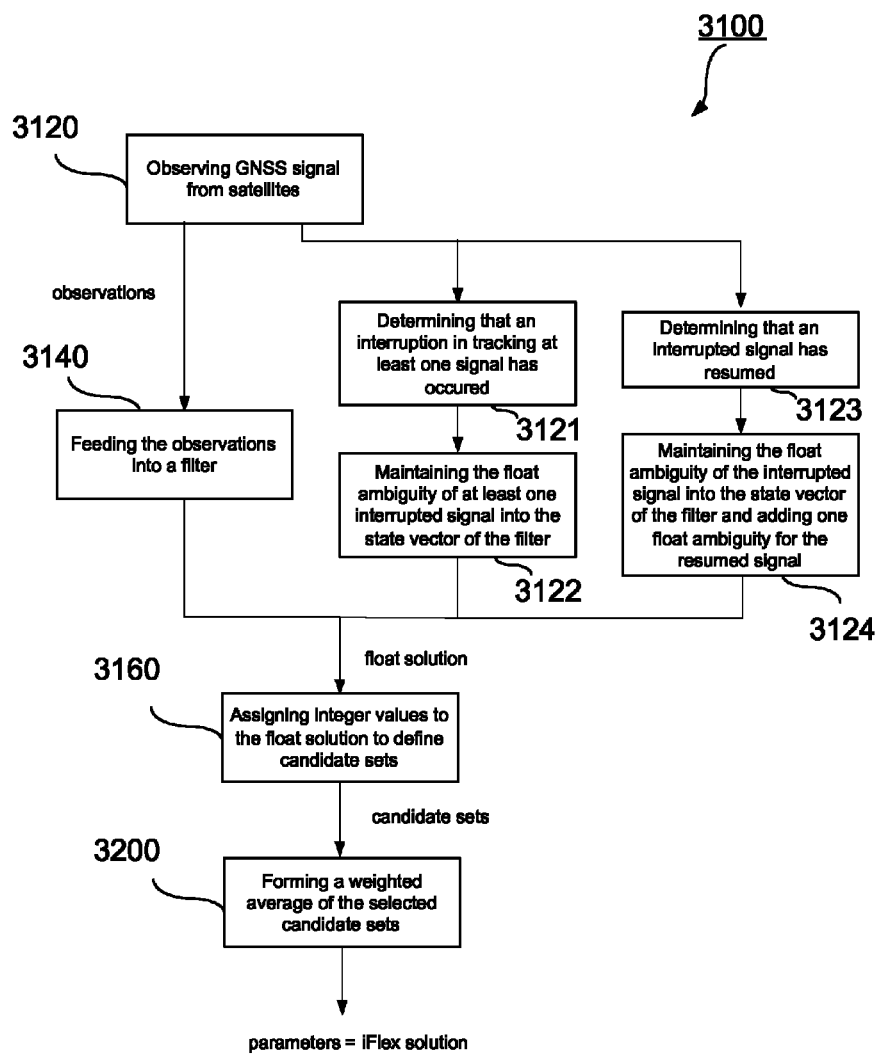

FIG. 20 includes all the steps described with reference to FIG. 19, except that two steps are added, namely a step 3123 of determining that an interrupted signal has resumed and a step 3124 of maintaining the float ambiguity of the interrupted signal into the state vector of the filter (as a first float ambiguity) and adding one float ambiguity (a second float ambiguity) for the resumed signal. This technique improves the precision of the provided float solution. Steps 3140, 3122, and 3124 relate to the operation of the filter and together output the float solution.

In one embodiment of the method, it is determined that an interruption in tracking of at least one signal of a satellite occurred if an observation for the at least one signal is not available for at least one of the instances in time.

In one embodiment of the method, it is determined that an interruption in tracking of at least one signal of a satellite occurred, if a cycle slip occurred.

In one embodiment, the method includes, if after an interruption in tracking of a signal tracking of the signal resumes, maintaining the float ambiguity of the state vector for the signal for which an interruption in tracking occurred at the value before the interruption in tracking occurred as a first float ambiguity and introducing into the state vector a second float ambiguity for the signal after resuming tracking.

One aspect of the invention further includes an apparatus to estimate parameters derived from GNSS signals useful to determine a position, including a receiver adapted to obtain observations of each of received frequencies of a GNSS signal from a plurality of GNSS satellites to obtain observations at a plurality of instances in time; a filter to estimate a state vector at least comprising float ambiguities based on the time sequence of observations, wherein each float ambiguity constitutes a non integer estimate of an integer number of wavelengths for a received frequency of a GNSS signal between a receiver of the GNSS signal and the GNSS satellite from which it is received and wherein the float ambiguities of the state vector are updated over time on the basis of the observations; and a processing element adapted, capable or configured to determine that an interruption in tracking of at least one signal of a satellite occurred;
 maintain the float ambiguity of the state vector for the at least one signal for which an interruption in tracking occurred at the value before the interruption in tracking occurred;
 assign integer values to at least a subgroup of the estimated float values to define a plurality of integer ambiguity candidate sets;
 determine a quality measure for each of the candidate sets; and
 obtain a weighted average of the candidate sets.

In one aspect of the apparatus, the processing element is adapted, capable or configured to determine that an interruption in tracking of at least one signal of a satellite occurred if an observation for the at least one signal is not available for at least one of the instances in time.

In one aspect of the apparatus, the processing element is adapted, capable or configured to determine that an interruption in tracking of at least one signal of a satellite occurred, if a cycle slip occurred.

In one aspect of the apparatus, the processing element is adapted, capable or configured to, if after an interruption in tracking of a signal tracking of the signal resumes, maintain the float ambiguity of the state vector for the signal for which an interruption in tracking occurred at the value before the interruption in tracking occurred as a first float ambiguity and introducing into the state vector a second float ambiguity for the signal after resuming tracking.

As explained in more details in section 6 entitled "[6. Combination of aspects and embodiments, and further considerations applicable to the above.]", the receiver, the filter and the processing element of the above-described apparatuses may be separate from each other. As also explained in more details in section 6, the invention also relates to a computer program, to a computer program medium, to a computer program product and to a firmware update containing code instructions for carrying out any one of the above-described methods.

5. Ambiguity Selection

The techniques described herein of forming a weighted average of integer ambiguity candidate sets ("iFlex") have proven to be more robust against compromised data than traditional RTK approaches in which the ambiguities are fixed and validated. One example is improved performance under tree canopy.

However, if there are systematic errors in the data that are not reflected in the variances reported by the floating solution (this part of which is the same for the weighted averaging processes described herein as for the traditional RTK processing) there is some chance that the solution does not converge. The consequence can be the inability to declare a solution as "fixed" for an extended time period ("no fix"), or worse, solutions reported as having a high precision contain errors larger than the errors reported by the traditional RTK processing engine ("bad fixes").

In one such case, caused by an error in the receiver tracking loops, the GLONASS carrier phase data occasionally contained ½ cycle biases on one or more satellites. This resulted in extended periods without a precise "fixed" RTK solution, though the traditional RTK system operated acceptably in those cases by applying the partial fixing technique for GLONASS described in U.S. Pat. Nos. 7,312,747 B2 and 7,538,721 B2. Generalized partial fixing techniques are described in WO 2009/058213 A2.

In general, processing of GLONASS data is more problematic than processing GPS data even when the receiver tracking loops are operating correctly: acquisition transients are more frequent for GLONASS data than for GPS data; and the broadcast orbits for GLONASS are much worse than GPS broadcast orbits. While the latter are typically accurate at the 1-2 meter level, GLONASS orbits have errors of 5-10 meters and can sometimes be much worse. This introduces errors on longer baselines. A 10 meter orbit error results in a measurement error of up to ½ ppm. This means having an additional error of 35 millimeters on a 70 km baseline, a value already critical for narrow-lane carrier phase ambiguity resolution. In GPS this error would be about 4-8 millimeters. Finally, the L2P-code for GLONASS is neither published nor guaranteed to be unchanged. Any change in the code could lead to cycle slips and acquisition errors.

Another aspect favoring a partial ambiguity resolution scheme is usage of satellite signals that are not currently available and thus not testable at this time, such as GPS L5 and Galileo signals. If a new signal as broadcast causes problems in RTK processing, partial ambiguity resolution in accordance with embodiments of the invention could avoid the need for the user to manually configure the receiver to stop using the new signals. Thus, a partial ambiguity resolution scheme is useful in forming a weighted average of integer ambiguity candidate sets.

Partial search techniques described in U.S. Pat. Nos. 7,312, 747 B2 and 7,538,721 B2 and in WO 2009/058213 A2 are based around using a full search of partial sets of fixed ambiguities in order to decide which set(s) can be resolved. Especially for forming a weighted average of integer ambiguity candidate sets (the "iFlex" technique) as described herein this approach can be very computationally intensive.

The following description presents methods and apparatus which can relatively quickly determine a partial ambiguity set that is significantly better than the full set of ambiguities, before the complete ambiguity solution is evaluated.

Some embodiments of the invention are based on the norm of the best candidate solution for each ambiguity subset analyzed. The search for the best candidate set only is very quick. Though there is no mathematical optimality in this approach, practical tests have shown that it can improve processing of problematic GNSS observation data.

In other embodiments, the best norm is used as a criterion to detect problems in the solution. Then the float solution is completely or partially reset based on the norms of the partial ambiguity sets.

Verhagen, *The GNSS integer ambiguities: estimation and validation*, Delft University of Technology, 2004, ISBN 90-804147-4-3, provides a good overview of the steps of integer ambiguity estimation. Using the notation established in Section 3 above, a general model of GNSS observations is:

$$y = Aa + Bb + e \tag{1}$$

Recapping from Section 3 that $y \in R^m$ denotes the observation vector, $a \in Z^n$ is the vector of unknown integer parameters (ambiguities), $b \in R^p$ is the vector of additional model parameters as position, clock errors, atmospheric errors, time correlated noise, etc. A and B are the m×n respective m×p design matrices (Jacobians) of the observations with respect to the integer respective additional parameters. $e \in R^m$ is the observation noise vector with the a priori variance-covariance matrix $Q = E[ee^T]$.

Normally using a least-squares adjustment, a Kalman filter or any other technique known to someone skilled in the art, the unknowns a and b are estimated simultaneously without applying the integer constraint on a.

The result is the so-called float solution of estimates and their variance-covariance matrix:

$$\begin{pmatrix} \hat{a} \\ \hat{b} \end{pmatrix} \text{ and } \begin{pmatrix} Q_{\hat{a}} & Q_{\hat{a}\hat{b}} \\ Q_{\hat{a}\hat{b}}^T & Q_{\hat{b}} \end{pmatrix} \tag{12 \& 13}$$

A least squares solution would be:

$$\begin{pmatrix} Q_{\hat{a}} & Q_{\hat{a}\hat{b}} \\ Q_{\hat{a}\hat{b}}^T & Q_{\hat{b}} \end{pmatrix} = ((A \; B)^T Q^{-1} (A \; B))^{-1} \tag{18}$$

$$\begin{pmatrix} \hat{a} \\ \hat{b} \end{pmatrix} = \begin{pmatrix} Q_{\hat{a}} & Q_{\hat{a}\hat{b}} \\ Q_{\hat{a}\hat{b}}^T & Q_{\hat{b}} \end{pmatrix} (A \; B)^T Q^{-1} y \tag{19}$$

This technique is given as an example of float parameter estimation and not limiting the application of the methods presented.

The variance-covariance matrix $Q_{\hat{a}}$ defines a norm $\|\cdot\|_{Q_{\hat{a}}}$ on $R^n$:

$$\|x\|_{Q_{\hat{a}}} = x^T Q_{\hat{a}}^{-1} x \tag{20}$$

Integer Least-Squares (ILS) is the strict mathematical integer solution to the problem of minimizing the $Q_{\hat{a}}$ norm of the difference of the float solution to integer solutions:

$$\check{a}_1 = \underset{z \in Z^n}{\operatorname{argmin}}(z - \hat{a})^T Q_{\hat{a}}^{-1}(z - \hat{a}) = \underset{z \in Z^n}{\operatorname{argmin}} \|z - \hat{a}\|_{Q_{\hat{a}}} \tag{21}$$

Well-known algorithms, for example LAMBDA [Teunissen], compute at least the "best candidate" $\check{a}_1$. In addition, usually additional next candidate $\check{a}_2$ ("second candidate"), and possible more candidates $\check{a}_3, \ldots, \check{a}_k$ in order of their $Q_{\hat{a}}$ norm are determined, in a similar way:

$$\check{a}_2 = \underset{z \in Z^n \setminus \{\check{a}\}}{\operatorname{argmin}} \|z - \hat{a}\|_{Q_{\hat{a}}} \tag{22}$$

$$\check{a}_i = \underset{z \in Z^n \setminus \{\check{a}_1, \ldots, \check{a}_{i-1}\}}{\operatorname{argmin}} \|z - \hat{a}\|_{Q_{\hat{a}}} \tag{23}$$

The values of the norm $\|z - \hat{a}\|_{Q_{\hat{a}}}$ are normally provided, too, for application of the validations tests described in the following section.

For a given best candidate $\check{a}_i$ for the integer solution, the non-integer parameters of the model can be easily adjusted to the matching least-squares solution:

$$\check{b} = \hat{b} - Q_{\hat{a}\hat{b}}^T Q_{\hat{a}}^{-1}(\hat{a} - \check{a}_i) \tag{24}$$

and $$Q_{\check{b}} = Q_{\hat{b}} - Q_{\hat{a}\hat{b}}^T Q_{\hat{a}}^{-1} Q_{\hat{a}\hat{b}} \tag{25}$$

Partial fixing refers to selecting a subset of the ambiguities determined by computing a floating solution in order to get a result (with fixed-integer ambiguities or with a weighted average of integer ambiguity candidate sets) that is better than using the complete ambiguity set.

In a more general sense, the full ambiguity set is transformed into a lower dimensional one using an integer transformation matrix, as described in WO 2009/058213 A2. In a generalized sense, partially fixing ambiguities corresponds to fixing a transformed ambiguity vector using a rectangular transformation matrix. Here, a $(n_f \times n)$ matrix G maps the ambiguity vector to the part that is going to be fixed. For example, given a floating solution with 6 ambiguities $$\hat{a} = \begin{pmatrix} \hat{a}_1 \\ \hat{a}_2 \\ \hat{a}_3 \\ \hat{a}_4 \\ \hat{a}_5 \\ \hat{a}_6 \end{pmatrix} \tag{26}$$

and fixing only the first and last two, G would be:

$$G_{\{1,2,5,6\}} = \begin{pmatrix} 1 & 0 & 0 & 0 & 0 & 0 \\ 0 & 1 & 0 & 0 & 0 & 0 \\ 0 & 0 & 0 & 0 & 1 & 0 \\ 0 & 0 & 0 & 0 & 0 & 1 \end{pmatrix} \quad (27)$$

and $$G_{\{1,2,5,6\}} \cdot \hat{a} = \begin{pmatrix} \hat{a}_1 \\ \hat{a}_2 \\ \hat{a}_5 \\ \hat{a}_6 \end{pmatrix} \quad (28)$$

If for six ambiguities, where only the wide-lane combinations are to be fixed, G would be:

$$G_{WL} = \begin{pmatrix} 1 & -1 & 0 & 0 & 0 & 0 \\ 0 & 0 & 1 & -1 & 0 & 0 \\ 0 & 0 & 0 & 0 & 1 & -1 \end{pmatrix} \quad (29)$$

and $$G_{WL} \cdot \hat{a} = \begin{pmatrix} \hat{a}_1 - \hat{a}_2 \\ \hat{a}_3 - \hat{a}_4 \\ \hat{a}_5 - \hat{a}_6 \end{pmatrix} \quad (30)$$

Note that the wide-lane combination is formed by subtracting two ambiguities (or phase measurements) observed to the same satellite at the same epoch on different frequency bands. For example, the GPS L1/L2 wide-lane combination is formed by subtracting the L2 phase from the L1 phase. The L1 and L2 phase measurements have wavelengths of ~19 and 24 cm respectively, while the corresponding wide-lane combination has an effective wavelength of ~86 cm. For the purposes of ambiguity resolution, it is advantageous to have a wavelength as long as possible, hence the motivation to consider the use of wide-lane phase/ambiguities in partial fixing.

There are many other useful linear combinations of multi-band GNSS, including:

Iono-free,
Narrow-lane,
Iono-residual,
Minimum error

Different linear combinations have particular characteristics that make them useful for some aspects of ambiguity resolution or positioning.

For the full ambiguity vector to be fixed, the G matrix would simply be the identity matrix of the proper dimension.

$$G_{Full} = \begin{pmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{pmatrix} \quad (31)$$

and $$G_{Full} \cdot \hat{a} = \hat{a} \quad (32)$$

Some embodiments of the invention employ the partial fixing techniques described in WO 2009/058213 A2 for generation of possible ambiguity subsets to be used as candidate sets in forming a weighted average. Thus, the ambiguity subsets can be created of some embodiments of the invention by removing from the GNSS data set the observations of some satellites, of a complete GNSS, of individual observations (frequencies), etc., and/or by transforming the ambiguities into integer linear combinations, for example the widelane carrier phase combination.

A partial fixing scheme PF in accordance with some embodiments of the invention comprises generating multiple nominee partial ambiguity sets characterized by their G matrix:

$$PF \subset \{G_{nom} \in R^{n_{nom} \times n} : \text{rank} G_{nom} = n_{nom}\} \quad (33)$$

To avoid confusion with the candidate ambiguities, the term "nominee partial fixing subset" is used to designate a possible subset of ambiguities to be fixed.

In accordance with some embodiments of the invention, only the best candidate is computed for each ambiguity nominee subset. In accordance with some embodiments of the invention, the quality criteria for selecting the best subset are based on the norm (chi-square) of that best candidate with respect to the (partial) variance-covariance matrix.

In accordance with some embodiments of the invention, integer least squares is applied to the part to be fixed of the float solution vector together with the corresponding variance-covariance matrix to get the best candidate solution.

For $G_{nom} \in R^{n_{nom} \times n}$ the norm of the best candidate solution for this nominee partial fixing subset is computed in the usual way:

$$\chi^2_{1,G_{nom}} = \min_{z \in Z^{n_{nom}}} (z - G_{nom} \cdot \hat{a})^T (G_{nom} \cdot Q_{\hat{a}} \cdot G^T_{nom})^{-1} (z - G_{nom} \cdot \hat{a}) \quad (34)$$

The associated best candidate ambiguity vector would be:

$$\check{a}_{1,G_{nom}} = \underset{z \in Z^{n_{nom}}}{\text{argmin}} (z - G_{nom} \cdot \hat{a})^T (G_{nom} \cdot Q_{\hat{a}} \cdot G^T_{nom})^{-1} (z - G_{nom} \cdot \hat{a}) \quad (35)$$

Partial Ambiguity Solution Technique

For a priori noise models perfectly matching the data the expectation value for the $\chi^2_{1,nom}$ is equal to the number of ambiguities $n_{nom}$. The quotient of the actual norm divided by the number of ambiguities in any ambiguity set thus provides a quality measure that can be exploited:

$$C_{G_{nom}} = \frac{\chi^2_{1,G_{nom}}}{n_{G_{nom}}} \quad (36)$$

In accordance with some embodiments of the invention, the ambiguity subset with the smallest (hence best) quality measure is selected as the subset to be used for the final ambiguity resolution step.

$$G_{best} = \underset{G_{nom} \in PF}{\text{argmin}} C_{G_{nom}} \quad (37)$$

In accordance with some embodiments of the invention, a check is made to determine whether the improvement is significant. This includes testing the improvement factor of the quality criterion $$\frac{G_{Full}}{G_{best}}$$

against a minimum factor. In accordance with some embodiments of the invention it also includes comparison with a minimal criterion for the full solution to decide if it is worthwhile to try partial fixing at all.

Sometimes, an insufficient over-determination in the floating solution can result in a very good fit of the best solution even for bad solutions. To avoid this, the quality criterion is limited in accordance with some embodiments of the invention to a minimum (of, for example, 1.0).

$$C'_{G_{nom}} = \min\left(1, \frac{\chi^2_{1,G_{nom}}}{n_{G_{nom}}}\right) \qquad (38)$$

Once the best partial fixing subset has been determined, the ambiguity determination process continues using the partial solution as without partial fixing.

For "traditional" ambiguity resolution (fixing of integer ambiguities rather than forming a weighted average of integer ambiguity candidate sets as in embodiments of the present invention), the Integer Least Squares and validation are performed using the transformed ambiguity vector and covariance matrix. The final additional model parameters (e.g. position) are computed for the best partial solution $\breve{a}_{best}$ using the formulas given above.

$$\breve{b} = \hat{b} - (G \cdot Q_{\hat{a}\hat{b}})^T \cdot (G \cdot Q_{\hat{a}} \cdot G^T)^{-1} \cdot (G \cdot \hat{a} - \breve{a}_{best}) \qquad (39)$$

and $$Q_{\breve{b}} = Q_{\hat{b}} - (G \cdot Q_{\hat{a}\hat{b}})^T \cdot (G \cdot Q\widehat{a} \cdot G^T)^{-1} \cdot (G \cdot Q_{\hat{a}\hat{b}}) \qquad (40)$$

For ambiguity estimation in which a weighted average of integer ambiguity candidate sets is formed in accordance with embodiments of the present invention, the transformed ambiguity vector and covariance matrix are used as well. Computing receiver position using the weighted average of the integer ambiguity candidate sets is carried out in accordance with some embodiments of the present invention using a modified position gain matrix $$(G \cdot Q_{\hat{a}\hat{b}})^T \cdot (G \cdot Q_{\hat{a}} \cdot G^T)^{-1}. \qquad (41)$$

Partial Reset Technique

In accordance with some embodiments of the invention, the best norm computation is used to detect and solve problems in the floating solution. If the best quality measure $$C_{G_{best}} = \frac{\chi^2_{1,G_{best}}}{n_{G_{best}}}$$

is significantly worse than the expectation value 1, a problem in the floating solution is taken into consideration. This is based on the fact that if the best solution is already worse than statistically expected, the correct solution can only be as bad or worse. In accordance with some embodiments of the invention the threshold value of the quality measure for which is problem is declared (the "problem threshold") is 10.

In accordance with some embodiments of the invention, to identify a subset of ambiguities causing the problem, again the quality measure of the best set is inspected. If the improvement factor $$\frac{G_{Full}}{G_{best}}$$

is significantly large (for example by a factor of 4), the ambiguity estimates not included in that subset are reset in the floating solution. In accordance with some embodiments of the invention, this is implemented by a large noise input for the associated ambiguity states in the float solution. This is performed for all subfilters in embodiments of the invention in which the filter used to estimated float ambiguities is implemented as a factorized carrier-ambiguity resolution filter, e.g., as described in U.S. Pat. No. 7,432,853 B2.

In accordance with some embodiments of the invention, nuisance states of the state vector such as multipath and/or ionosphere are also reset for the affected ambiguities/satellites.

In accordance with some embodiments of the invention, a complete reset of the float solution is performed if an identification of a single subset cannot be done, for example when the best improvement factor is not large enough.

In one embodiment, the filter used to compute the float solution estimates float ambiguities for only some of the frequencies that are observed (or, more generally, the frequencies for which observations are obtained) and that can be tracked. In other words, the weighted average is formed based on at least some candidate sets formed on the basis of some of the observed frequencies (or, more generally, the frequencies which observations are obtained).

In some embodiments, the iFlex solution can be computed if at least 5 satellites are tracked and corresponding ambiguities are available. It has been recognized however that, if more than ten ambiguities are used for the weighted average of the candidate sets, the weighted average and thus reliability of iFlex solution is not significantly improved.

Accordingly, instead of forming the weighted average on the basis of all ambiguities available, prior to forming the candidate sets, a subgroup of ambiguities may be selected, and only the selected group of ambiguities is used for forming the candidate sets that are taken into account for forming the weighted average. Processing capacity can be saved (weight computation etc), while not significantly reducing reliability of the iFlex solution.

Selecting a subset of float ambiguities of the state vector can be done in various ways. In an embodiment shown in FIG. 21, the filter is operated to estimate from the observations a complete set of float ambiguity values and subsequently the subset of float ambiguities is selected from among the complete set of float ambiguity values. In an embodiment shown in FIG. 22, the filter is operated to estimate from the observations a selected partial set of float ambiguity values comprising fewer than the full set of float ambiguity values, wherein the partial set of float ambiguity values comprises the subset of float ambiguities of the state vector.

In one embodiment, a method is provided to estimate parameters derived from GNSS signals useful to determine a position. The method includes obtaining observations of a GNSS signal from each of a plurality of GNSS satellites; feeding the observations to a filter having a state vector at least comprising a float ambiguity for each received frequency of the GNSS signals, each float ambiguity constituting a real number estimate associated with an integer number of wavelengths of the GNSS signal between a receiver of the GNSS signal and the GNSS satellite from which it is received, and the filter being for estimating a float value for each float ambiguity of the state vector; selecting a subset of float ambiguities of the state vector; assigning integer values to the estimated float values of the float ambiguities of the subset to define a plurality of integer ambiguity candidate sets; determining a quality measure for each of the candidate sets; and obtaining a weighted average of the candidate sets.

The advantages of this aspect of the invention notably include the decrease in computation burden. This is because fewer carrier phase ambiguities are taken into account in the filter.

Figure 21:
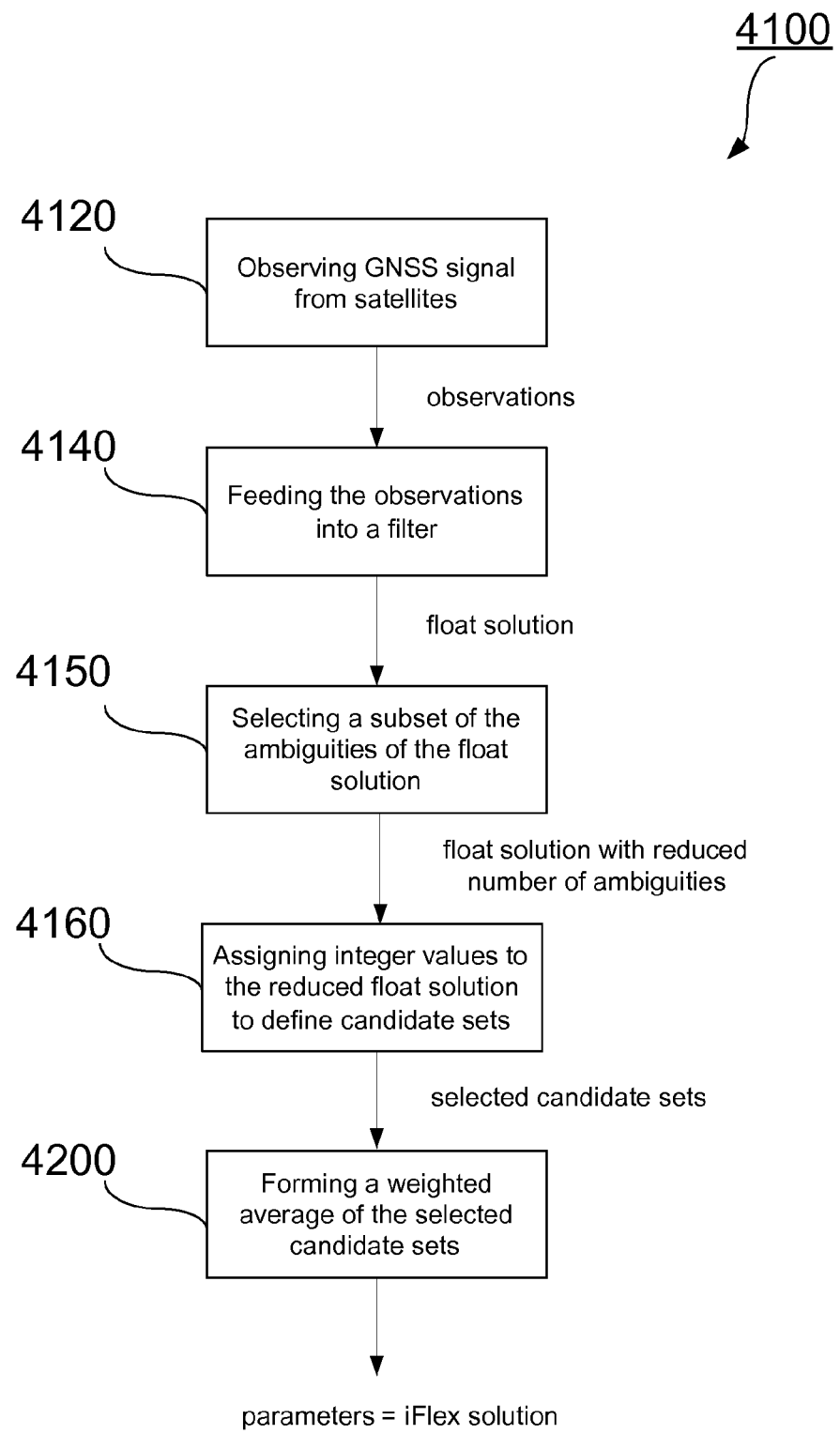
FIGS. 21 and 22 are two flowcharts illustrating two embodiments of a method of the invention, wherein a subset of the ambiguities, and not all observed ambiguities are taken into account in the filter state vector for forming the float solution.

In one embodiment, as illustrated in FIG. 21, a method 4100 is provided. The method estimates parameters derived from GNSS signals useful to determine the position. The considerations regarding the Z-transformation, as mentioned above with respect to other embodiments, also apply to the present embodiments. The method includes a step 4120 of obtaining observations of a GNSS signal from each of a plurality of GNSS satellites. This step 4120 corresponds to the step 120 of FIG. 5a, the step 1120 of FIG. 11a and the step 2120 of FIG. 11, and the description applying to these steps also applies to step 4120.

The method also includes a step 4140 of feeding the observations into a filter having a state vector at least comprising a float ambiguity for each received frequency of the GNSS signals. Each float ambiguity constitutes a real number estimate associated with an integer number of wavelengths of the GNSS signal between a receiver of the GNSS signal and the GNSS satellite from which it is received. The filter estimates a float value for each float ambiguity of the state vector.

The method further includes a step 4150 of selecting a subset of the ambiguities of the float solution, but not all float ambiguities of the float solution. In one embodiment, at least five float ambiguities are selected. In one embodiment, the minimum required number of float ambiguities are selected. The actual minimum number may depend on factors such static or kinematic calculations, three-dimensional (3D) or known height positioning, and so on. For instance, a minimum number of six float ambiguities may be determined to be required, at the expense of a lesser yield, or a minimum number of four float ambiguities at the expense of accepting that, for the lowest number of float ambiguities (e.g. four), the results may not be completely satisfactory.

Then, a step 4160 of assigning integer values to the estimated float values of the float ambiguities of the subset is provided to define the plurality of integer ambiguity candidate sets.

A quality measure for each of the candidate sets is then determined. Finally, a weighted average of the candidate sets is obtained in step 4200 to form the iFlex solution, as described with reference 200 of FIG. 5a.

Figure 22:
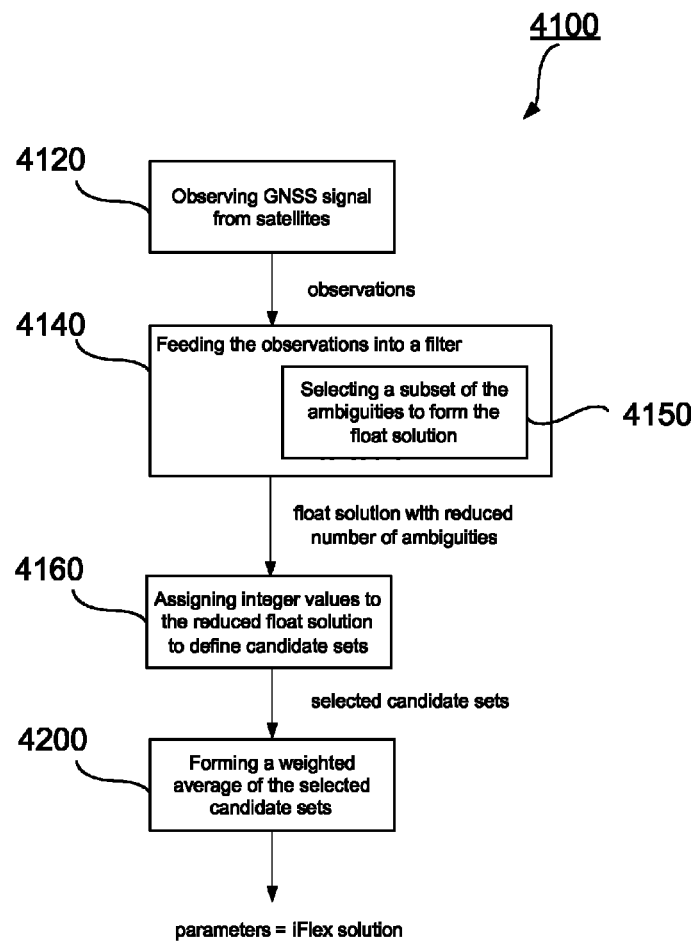

In one embodiment, illustrated in FIG. 22, of the step 4150, when feeding 4140 the observations into a filter, a subset of the ambiguities are selected 4150 to form the state vector and therefore the float solution.

These embodiments, namely the embodiments illustrated with reference to FIGS. 21 and 22, enable to reduce the computation processing burden without significantly reducing the position precision.

In one embodiment, the step of selecting 4150 includes selecting, as float ambiguities of the subset, the float ambiguities of the frequencies which have been tracked continuously for the longest period of time. Other criteria to select float ambiguities to be considered in the filter may be used, with in mind the goal of taking into account the observations being the most reliable ones.

In one embodiment of the method, the selecting includes selecting, as float ambiguities of the subset, the float ambiguities of frequencies tracked continuously for the longest period of time.

In one embodiment of the method, the selecting includes selecting at least five float ambiguities but fewer than all available float ambiguities. In other words, not all available float ambiguities are selected.

One aspect of the invention further includes an apparatus to estimate parameters derived from global navigational satellite system (GNSS) signals useful to determine a position, including a receiver adapted to obtain observations of a GNSS signal from each of a plurality of GNSS satellites; a filter having a state vector at least comprising a float ambiguity for each received frequency of the GNSS signals, each float ambiguity constituting a real number estimate associated with an integer number of wavelengths of the GNSS signal between a receiver of the GNSS signal and the GNSS satellite from which it is received, and the filter being for estimating a float value for each float ambiguity of the state vector; a processing element adapted, capable or configured to select a subset of float ambiguities of the state vector;
    assign integer values to the estimated float values of the float ambiguities of the subset to define a plurality of integer ambiguity candidate sets;
    determine a quality measure for each of the candidate sets; and
    obtain a weighted average of the candidate sets.

The apparatus can be configured to select a subset of float ambiguities in various ways. In an embodiment shown in FIG. 21, the filter configured to estimate from the observations a complete set of float ambiguity values and the apparatus is configured to subsequently select the subset of float ambiguities from among the complete set of float ambiguity values. In an embodiment shown in FIG. 22, the filter is configured to estimate from the observations a selected partial set of float ambiguity values comprising fewer than the full set of float ambiguity values, wherein the partial set of float ambiguity values comprises the subset of float ambiguities of the state vector.

In one embodiment of the apparatus, the processing element is adapted, capable or configured to select, as float ambiguities of the subset, the float ambiguities of frequencies tracked continuously for the longest period of time.

In one embodiment of the apparatus, the step of selecting a subset of float ambiguities of the state vector includes selecting at least five float ambiguities of the state vector.

As explained in more details in section 6 entitled "[6. Combination of aspects and embodiments, and further considerations applicable to the above]", the receiver, the filter and the processing element of the above-described apparatuses may be separate from each other. As also explained in more details in section 6, the invention also relates to a computer program, to a computer program medium, to a computer program product and to a firmware update containing code instructions for carrying out any one of the above-described methods.

Figure 23:
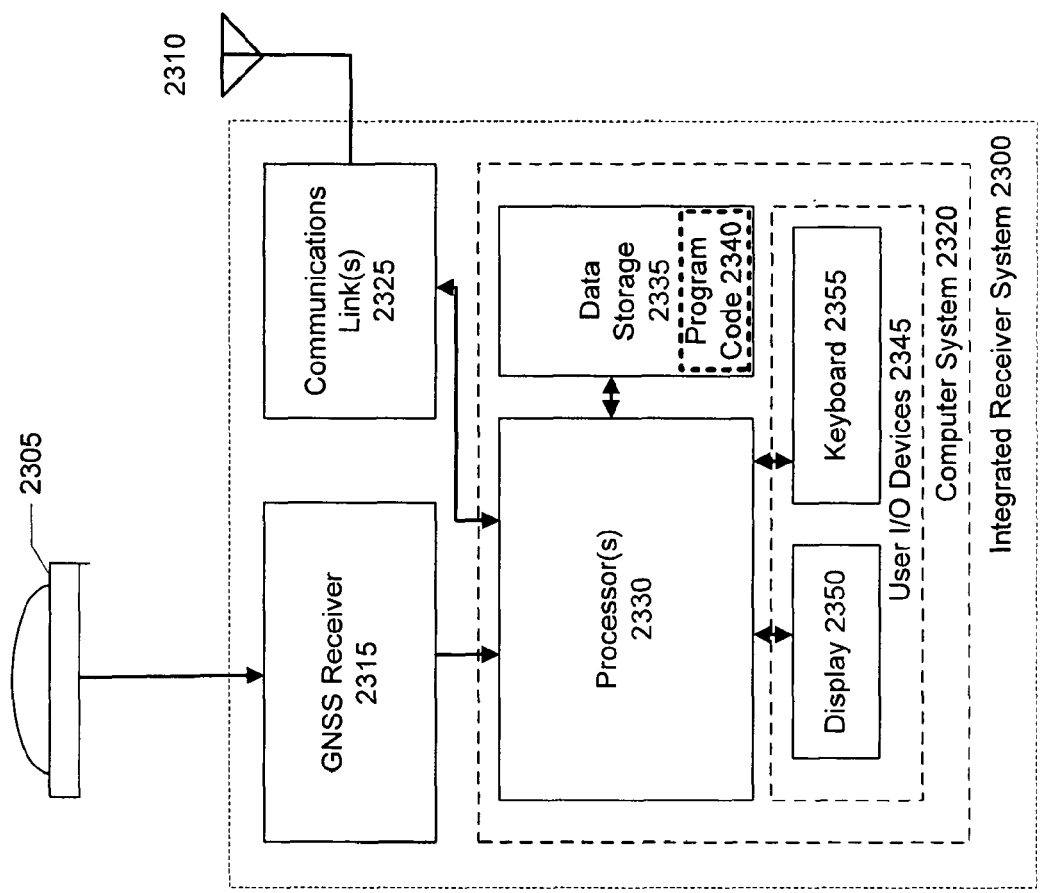
FIG. 23 is a block diagram of an integrated GNSS receiver system in accordance with some embodiments of the invention.

6. Combination of Aspects and Embodiments, and Further Considerations Applicable to the Above FIG. 23 is a schematic block diagram of a typical integrated GNSS receiver system 2300 with GNSS antenna 2305 and communications antenna 2310. Receiver system 2300 can serve as a rover or base station or reference station. Receiver system 2300 includes a GNSS receiver 2315, a computer system 2320 and one or more communications links 2325. Computer system 2320 includes one or more processors 2330, one or more data storage elements 2335, program code 2340 for controlling the processor(s) 2330, and user input/output devices 2345 which may include one or more output devices 2350 such as a display or speaker or printer and one or more devices 2355 for receiving user input such as a keyboard or touch pad or mouse or microphone. The processor(s) 2330 are adapted by the program code 2340 to carry out processing functions described herein, such as 1. candidate selection; 2. scaling of quality measure; 3. indication of convergence of weighted average solution; 4. keeping legacy observations after interruption of tracking; and/or 5. ambiguity selection.

Figure 24:
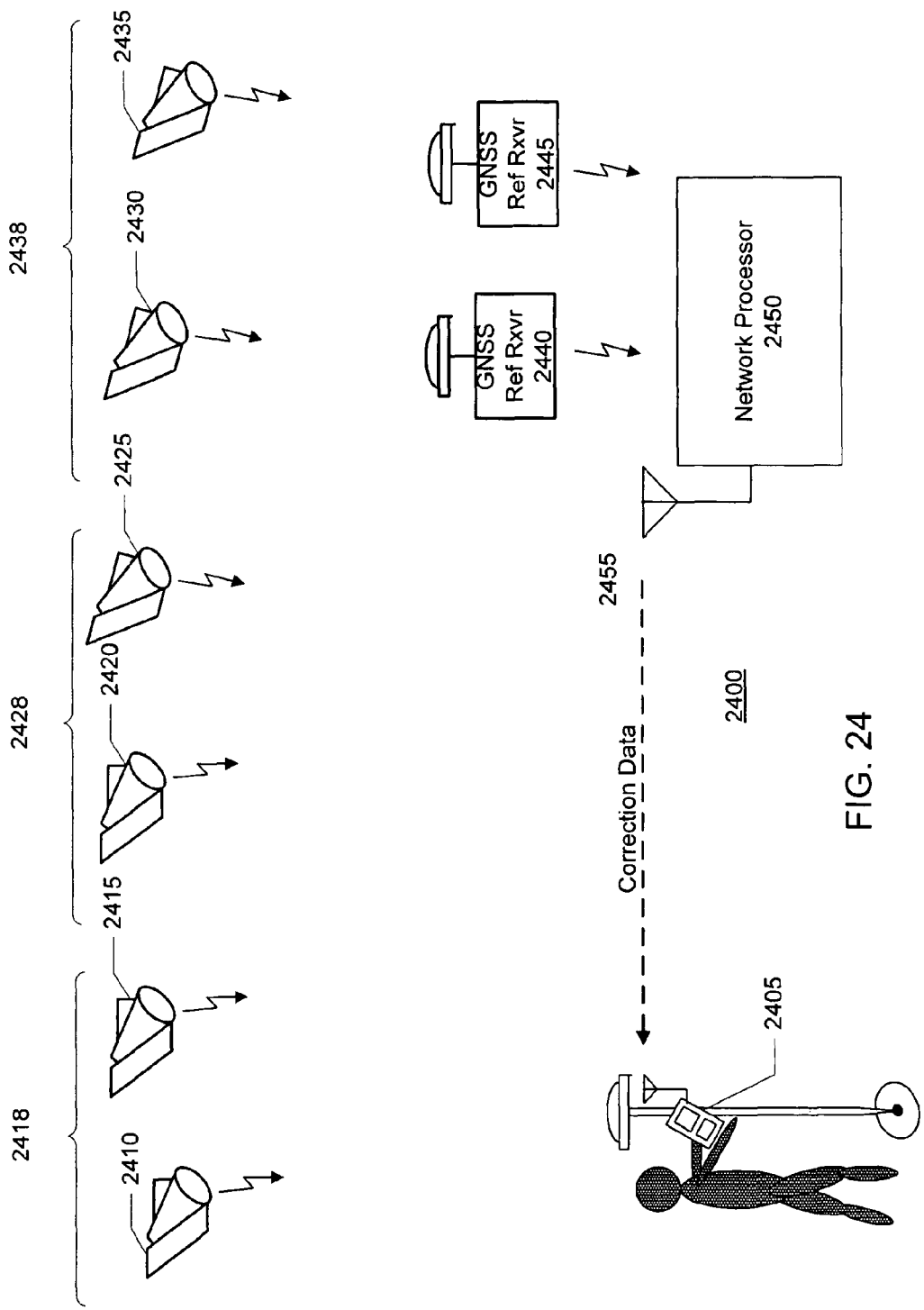
FIG. 24 schematically illustrates a network positioning scenario in accordance with some embodiments of the invention.

FIG. 24 schematically illustrates a network positioning scenario 2400 using a GNSS rover 2405 (such as integrated receiver system 2300) in accordance with some embodiments of the invention. Rover 2405 receives GNSS signals from satellites 2410 and 2415 of a first GNSS 2418, receives GNSS signals from satellites 2420 and 2425 of a second GNSS 2428, and/or receives GNSS signals from satellites 2430 and 2435 of a third GNSS 2438. Rover 2405 may receive GNSS signals from satellites of further GNSS as available. Similarly, GNSS reference stations 2440, 2445 (and possibly others not shown) receive GNSS signals from some or all of the same satellites. A network processor 2450 collects the data from the reference receivers, prepares correction data and transmits the correction data to rover 2405 via a communications link 2455. In accordance with some embodiments, network processor 2450 is configured as computer system 2320 having, for example, one or more processors 2330, one or more data storage elements 2335, program code 2340 for controlling the processor(s) 2330, and user input/output devices 2345 which may include one or more output devices 2350 such as a display or speaker or printer and one or more devices 2355 for receiving user input such as a keyboard or touch pad or mouse or microphone. In accordance with some embodiments, network processor 2450 forms a part of an integrated receiver system as illustrated in FIG. 23. In accordance with some embodiments, network processor 2450 is a computer system which is separate from the GNSS receivers. The processor(s) of network processor 2450 are adapted by the program code 2340 to carry out processing functions described herein, such as 1. candidate selection; 2. scaling of quality measure; 3. indication of convergence of weighted average solution; 4. keeping legacy observations after interruption of tracking; and/or 5. ambiguity selection.

Figure 25:
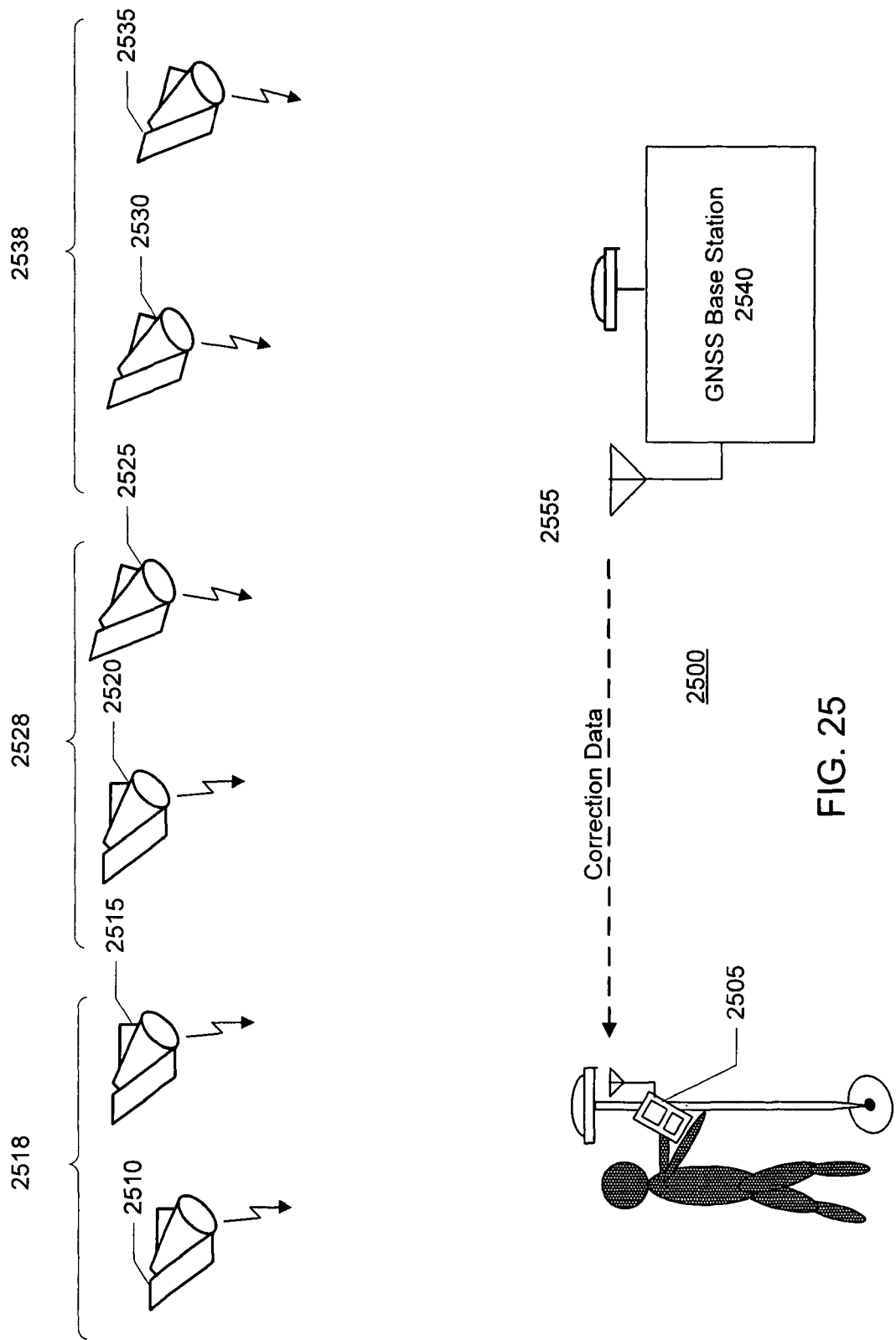
FIG. 25 schematically illustrates a real-time-kinematic positioning scenario in accordance with some embodiments of the invention.

FIG. 25 schematically illustrates a real-time-kinematic positioning scenario 2500 using a GNSS rover 2505 capable of receiving GNSS signals from GNSS satellites in view. For example, rover 2505 receives GNSS signals from satellites 2510 and 2515 of a first GNSS 2518, receives GNSS signals from satellites 2520 and 2525 of a second GNSS 2528, and/or receives GNSS signals from satellites 2530 and 2535 of a third GNSS 2538. Rover 2505 may receive GNSS signals from satellites of further GNSS as available. Similarly, GNSS base station 2540 receives GNSS signals from some or all of the same satellites. GNSS base station 2540 prepares correction data and transmits the correction data to rover 2505 via a communications antenna 2555 or other suitable communications link. In accordance with some embodiments, either or both of GNSS rover 2505 and GNSS base station 2540 is/are configured as integrated receiver system 2300 each having, for example, one or more processors 2330, one or more data storage elements 2335, program code 2340 for controlling the processor(s) 2330, and user input/output devices 2345 which may include one or more output devices 2350 such as a display or speaker or printer and one or more devices 2355 for receiving user input such as a keyboard or touch pad or mouse or microphone. In accordance with some embodiments, network processor 2450 forms a part of an integrated receiver system as illustrated in FIG. 23. Either or both of GNSS rover 2505 and GNSS base station 2540 is/are are adapted by the program code 2340 to carry out processing functions described herein, such as 1. candidate selection; 2. scaling of quality measure; 3. indication of convergence of weighted average solution; 4. keeping legacy observations after interruption of tracking; and/or 5. ambiguity selection.

Any plurality of the above described aspects of the invention including those described in sections "1. Candidate set selection", "2. Scaling of quality measure", "3. Indication of convergence of weighted average solution", "4. Keeping legacy observations after interruption of tracking" and "5. Ambiguity selection" respectively, (i.e. two, three, four or five of these aspects), may be combined to form further aspects and embodiments, with the aim of providing additional benefits notably in terms of computation speed, precision estimation and system usability.

Any of the above-described apparatuses and their embodiments may be integrated into a rover, a receiver or a network station, and/or the processing methods described can be carried out in a processor which is separate from and even remote from the receivers used to collect the observations (e.g., observation data collected by one or more receivers can be retrieved from storage for post-processing, or observations from multiple network reference stations can be transferred to a network processor for near-real-time processing to generate a correction data stream and/or virtual-reference-station messages which can be transmitted to one or more rovers). Therefore, the invention also relates to a rover, a receiver or a network station including any one of the above apparatuses.

In one embodiment, the receiver of the apparatus of any one of the above-described embodiments is separate from the filter and the processing element. Post-processing and network processing of the observations may notably be performed. That is, the constituent elements of the apparatus for processing of observations does not itself require a receiver. The receiver may be separate from and even owned/operated by a different entity than the entity which is performing the processing. For post-processing, the observations may be retrieved from a set of data which was previously collected and stored, and processed with reference-station data which was previously collected and stored; the processing is conducted for example in an office computer long after the data collection and is thus not real-time. For network processing, multiple reference-station receivers collect observations of the signals from multiple satellites, and this data is supplied to a network processor which may for example generate a correction data stream or which may for example generate a "virtual reference station" correction which is supplied to a rover so that the rover can perform differential processing. The data provided to the rover may be ambiguities determined in the network processor, which the rover may use to speed its position solution, or may be in the form of corrections which the rover applies to improve its position solution. The network is typically operated as a service to rover operators, while the network operator is typically a different entity than the rover operator. This applies to each of the above-described apparatuses and claims.

Any of the above-described methods and their embodiments may be implemented by means of a computer program. The computer program may be loaded on an apparatus, a rover, a receiver or a network station as described above. Therefore, the invention also relates to a computer program, which, when carried out on an apparatus, a rover, a receiver or a network station as described above, carries out any one of the above above-described methods and their embodiments.

The invention also relates to a computer-readable medium or a computer-program product including the above-mentioned computer program. The computer-readable medium or computer-program product may for instance be a magnetic tape, an optical memory disk, a magnetic disk, a magneto-optical disk, a CD ROM, a DVD, a CD, a flash memory unit or the like, wherein the computer program is permanently or temporarily stored. The invention also relates to a computer-readable medium (or to a computer-program product) having computer-executable instructions for carrying out any one of the methods of the invention. A computer-readable medium may comprise one of: a computer-readable physical storage medium embodying a computer program and a computer-readable transmission medium embodying a computer program.

The invention also relates to a firmware update adapted to be installed on receivers already in the field, i.e. a computer program which is delivered to the field as a computer program product. This applies to each of the above-described methods and apparatuses.

GNSS receivers may include an antenna, configured to received the signals at the frequencies broadcasted by the satellites, processor units, one or more accurate clocks (such as crystal oscillators), one or more computer processing units (CPU), one or more memory units (RAM, ROM, flash memory, or the like), and a display for displaying position information to a user.

Where the terms "receiver", "filter" and "processing element" are used herein as units of an apparatus, no restriction is made regarding how distributed the constituent parts of a unit may be. That is, the constituent parts of a unit may be distributed in different software or hardware components or devices for bringing about the intended function. Furthermore, the units may be gathered together for performing their functions by means of a combined, single unit. For instance, the receiver, the filter and the processing element may be combined to form a single unit, to perform the combined functionalities of the units.

The above-mentioned units may be implemented using hardware, software, a combination of hardware and software, pre-programmed ASICs (application-specific integrated circuit), etc. A unit may include a computer processing unit (CPU), a storage unit, input/output (I/O) units, network connection units, etc.

Although the present invention has been described on the basis of detailed examples, the detailed examples only serve to provide the skilled person with a better understanding, and are not intended to limit the scope of the invention. The scope of the invention is much rather defined by the appended claims.

Additional features, and combinations of features, of embodiments of the invention are as follows:

($1^{st}$ Aspect: Candidate Set Selection)

1. Method to estimate parameters derived from global navigational satellite system (GNSS) signals useful to determine a position, including
    obtaining observations of a GNSS signal from each of a plurality of GNSS satellites;
    feeding the observations to a filter having a state vector at least comprising a float ambiguity for each received frequency of the GNSS signals, each float ambiguity constituting a real number estimate associated with an integer number of wavelengths of the GNSS signal between a receiver of the GNSS signal and the GNSS satellite from which it is received, and the filter being for estimating a float value for each float ambiguity of the state vector;
    assigning integer values to at least a subgroup of the estimated float values to define a plurality of integer ambiguity candidate sets;
    selecting a first number of candidate sets having a quality measure better than a first threshold, wherein the first threshold is determined based on a reference quality measure of a reference candidate set; and
    obtaining a weighted average of the selected candidate sets, each candidate set weighted in the weighted average based on its quality measure.

2. Method of 1, including using the weighted average to estimate a position of the receiver of the GNSS signals.

3. Method of at least one of 1 and 2, wherein the reference candidate set is the candidate set having the best quality measure.

4. Method of at least one of 1 to 3, wherein the quality measure of the candidate sets is constituted by a residual error norm value, the residual error norm value of a candidate set being a measure for a statistical distance of the candidate set to the state vector having the float ambiguities.

5. Method of at least one of 1 to 4, wherein the first threshold is determined as at least one of a fraction of, a multiple of, and a distance to the reference quality measure.

6. Method of at least one of 1 to 5, including, if the first number of selected candidate sets is smaller than a second threshold, selecting, for forming the weighted average, a second number of further candidate sets on the basis of the quality measures of the candidate sets in decreasing order starting with the non-selected candidate set having the best quality measure, the second number being constituted by the difference between the first number of selected candidate sets and a second threshold defining a minimum number of candidate sets to be included in the weighted average.

7. Method of at least one of 1 to 6, including, if the first number of selected candidate sets is larger than a third threshold, excluding a third number of selected candidate sets from forming the weighted average in decreasing order starting with the selected candidate set having the worst quality measure, wherein the third number is constituted by the difference between the first number of selected candidate sets and a third threshold defining a maximum number of candidate sets to be included in the weighted average.

8. Method of at least one of 1 to 7, wherein selecting a first number of candidate sets includes:
    determining the best quality measure of the candidate sets;
    determining an expectation value of the candidate set having the best quality measure;
    determining an error measure as a ratio of the best quality measure to the expectation value;
    adapting the quality measures of the candidate sets as a function of the error measure; and
    performing the selection of the first number of candidate sets based on the adapted quality measures.

9. Method of at least one of 1 to 8, wherein obtaining the weighted average includes:
    determining the best quality measure of the candidate sets;
    determining an expectation value of the candidate set having the best quality measure;
    determining an error measure as a ratio of the best quality measure to the expectation value;
    adapting the quality measures of the candidate sets as a function of the error measure; and
    forming the weighted average based on the adapted quality measure.

10. Method of at least one of 8 and 9, including adapting the quality measures of the candidate sets as a function of the error measure by adjusting a variance-covariance matrix of the filter.

11. Method of at least one of 8 to 10, including adjusting a variance-covariance matrix of the filter using the error measure, if the error measure is in a predetermined range.

12. Method of at least one of 8 to 11, including adjusting the variance-covariance matrix of the float solution using the error measure, if the error measure is larger than one.

13. Method of at least one of 1 to 12, wherein defining the integer candidate sets includes:

selecting a subset of float ambiguities of the state vector to form a subgroup of the float ambiguities of the state vector used to define the plurality of integer ambiguity candidate sets; and assigning integer values to the estimated float values of the float ambiguities of the subset to define a plurality of integer ambiguity candidate sets.

14. Method of 13, wherein the selecting includes selecting, as float ambiguities of the subset, the float ambiguities of frequencies tracked continuously for the longest period of time.

15. Method of at least one of 1 to 14, including estimating by the filter a float value for each float ambiguity of the state vector and covariance values associated with the state vector;

determining a formal precision value based on covariance values of the filter, the formal precision value being a measure for an achievable precision;

determining an achieved precision value of the weighted average;

comparing the achieved precision value with the formal precision value to obtain a convergence value; and indicating a convergence of the determination of the state vector based on the convergence value.

16. Method of 15, wherein the convergence value is obtained as a ratio of the achieved precision value to the formal precision value.

17. Method of at least one of 15 and 16, including determining an instance in time when the convergence value of the position is better than a convergence threshold; and indicating a convergence of the determination of the state vector at and after the determined instance in time.

18. Method of at least one of 15 to 17, including estimating an achieved precision of a position of the receiver determined based on the weighted ambiguities; and indicating a convergence of the determination of the state vector, if the achieved precision of the position is better than an inclusion threshold.

19. Method of at least one of 15 to 18, including estimating an achieved precision of a position of the receiver determined based on the weighted ambiguities; and indicating a non-convergence of the determination of the state vector, if the achieved precision of the position is worse than an exclusion threshold.

20. Method of at least one 1 to 19, including:

obtaining observations of the at least one frequency of the GNSS signals from the plurality of GNSS satellites to obtain observations at a plurality of instances in time;

updating the float ambiguities of the state vector over time on the basis of the observations;

determining that an interruption in tracking of at least one signal of a satellite occurred; and maintaining the float ambiguity of the state vector for the at least one signal for which an interruption in tracking occurred at the value before the interruption in tracking occurred.

21. Method of 20, wherein it is determined that an interruption in tracking of at least one signal of a satellite occurred if an observation for the at least one signal is not available for at least one of the instances in time.

22. Method of at least one of 20 and 21, wherein it is determined that an interruption in tracking of at least one signal of a satellite occurred, if a cycle slip occurred.

23. Method of at least one of 20 to 22 including, if, after an interruption in tracking of a signal, tracking of the signal resumes, maintaining the float ambiguity of the state vector for the signal for which an interruption in tracking occurred at the value before the interruption in tracking occurred as a first float ambiguity and introducing into the state vector a second float ambiguity for the signal after resuming tracking.

24. Apparatus to estimate parameters derived from global navigational satellite system (GNSS) signals useful to determine a position, including a receiver of a GNSS signal from each of a plurality of GNSS satellites;

a filter having a state vector at least comprising a float ambiguity for each received frequency of the GNSS signals, each float ambiguity constituting a real number estimate associated with an integer number of wavelengths of the GNSS signal between a receiver of the GNSS signal and the GNSS satellite from which it is received, and the filter being for estimating a float value for each float ambiguity of the state vector;

a processing element adapted to assign integer values to at least a subgroup of the estimated float values to define a plurality of integer ambiguity candidate sets;

select a first number of candidate sets having a quality measure better than a first threshold, wherein the first threshold is determined based on a reference quality measure of a reference candidate set; and obtain a weighted average of the selected candidate sets, each candidate set being weighted in the weighted average based on its quality measure.

25. Apparatus of 24, wherein the processing element is adapted to use the weighted average to estimate a position of the receiver of the GNSS signals.

26. Apparatus of at least one of 24 and 25, wherein the reference candidate set is the candidate set having the best quality measure.

27. Apparatus of at least one of 24 to 26, wherein the quality measure of the candidate sets is constituted by a residual error norm value, the residual error norm value of a candidate set being a measure for a statistical distance of the candidate set to the state vector having the float ambiguities.

28. Apparatus of at least one of 24 to 27, wherein the processing element is adapted to determine the first threshold as at least one of a fraction of, a multiple of, and a distance to the reference quality measure.

29. Apparatus of at least one of 24 to 28, wherein the processing element is adapted to, if the first number of selected candidate sets is smaller than a second threshold, selecting, from the weighted average, a second number of further candidate sets on the basis of the quality measures of the candidate sets in decreasing order starting with the non-selected candidate set having the best quality measure, the second number being constituted by the difference between the first number of selected candidate sets and a second threshold defining a minimum number of candidate sets to be included in the weighted average.

30. Apparatus of at least one of 24 to 29, wherein the processing element is adapted to, if the first number of selected candidate sets is larger than a third threshold, exclude a third number of selected candidate sets from forming the weighted average in decreasing order starting with the selected candidate set having the worst quality measure, wherein the third number is constituted by the difference between the first number of selected candidate sets and a third threshold defining a maximum number of candidate sets to be included in the weighted average.

31. Apparatus of at least one of 24 to 30, wherein the processing element is adapted to, in order to select a first number of candidate sets:
  determine the best quality measure of the candidate sets;
  determine an expectation value of the candidate set having the best quality measure;
  determine an error measure as a ratio of the best quality measure to the expectation value;
  adapt the quality measures of the candidate sets as a function of the error measure; and
  perform the selection of the first number of candidate sets based on the adapted quality measures.

32. Apparatus of at least one of 24 to 31, wherein the processing element is adapted to, in order to obtain the weighted average:
  determine the best quality measure of the candidate sets;
  determine an expectation value of the candidate set having the best quality measure;
  determine an error measure as a ratio of the best quality measure to the expectation value;
  adapt the quality measures of the candidate sets as a function of the error measure; and
  form the weighted average based on the adapted quality measure.

33. Apparatus of at least one of 31 and 32, wherein the processing element is adapted to adapt the quality measures of the candidate sets as a function of the error measure by adjusting the variance-covariance matrix of the float solution.

34. Apparatus of at least one of 31 to 33, wherein the processing element is adapted to adjust the variance-covariance matrix of the float solution using the error measure, if the error measure is in a predetermined range.

35. Apparatus of at least one of 31 to 34, wherein the processing element is adapted to adjust the variance-covariance matrix of the float solution using the error measure, if the error measure is larger than one.

36. Apparatus of at least one of 24 to 35, wherein the processing element is adapted to, in order to define the integer candidate sets:
  select a subset of float ambiguities of the state vector to form a subgroup of the float ambiguities of the state vector used to define the plurality of integer ambiguity candidate sets; and
  assign integer values to the estimated float values of the float ambiguities of the subset to define a plurality of integer ambiguity candidate sets.

37. Apparatus of 36, wherein the processing element is adapted to select, as float ambiguities of the subset, the float ambiguities of frequencies tracked continuously for the longest period of time.

38. Apparatus of at least one of 24 to 37, wherein
  the filter is adapted to
    estimate a float value for each float ambiguity of the state vector and covariance values associated with the state vector; and
  the processing element is adapted to
    determine a formal precision value based on covariance values of the filter, the formal precision value being a measure for an achievable precision;
    determine an achieved precision value of the weighted average;
    compare the achieved precision value with the formal precision value to obtain a convergence value; and
    indicate a convergence of the determination of the state vector based on the convergence value.

39. Apparatus of 38, wherein the processing element is adapted to obtain the convergence value as a ratio of the achieved precision value to the formal precision value.

40. Apparatus of at least one of 38 and 39, wherein the processing element is adapted to
  determine an instance in time when the achieved precision of the position is better than a convergence threshold; and
  indicate a convergence of the determination of the state vector at and after the determined instance in time.

41. Apparatus of at least one of 38 to 40, wherein the processing element is adapted to
  estimate an achieved precision of a position of the receiver determined based on the weighted ambiguities; and
  indicate a convergence of the determination of the state vector, if the achieved precision of the position is better than an inclusion threshold.

42. Apparatus of at least one of 38 to 41, wherein the processing element is adapted to
  estimate an achieved precision of a position of the receiver determined based on the weighted ambiguities; and
  indicate a non-convergence of the determination of the state vector, if the achieved precision of the position is worse than an exclusion threshold.

43. Apparatus of at least one of 24 to 42, adapted to:
  obtain observations of the at least one frequency of the GNSS signals from the plurality of GNSS satellites to obtain observations at a plurality of instances in time;
  update the float ambiguities of the state vector over time on the basis of the observations; and
  determine that an interruption in tracking of at least one signal of a satellite occurred; and
  maintain the float ambiguity of the state vector for the at least one signal for which an interruption in tracking occurred at the value before the interruption in tracking occurred.

44. Apparatus of 43, adapted to determine that an interruption in tracking of at least one signal of a satellite occurred if an observation for the at least one signal is not available for at least one of the instances in time.

45. Apparatus of at least one of 43 and 44, adapted to determine that an interruption in tracking of at least one signal of a satellite occurred, if a cycle slip occurred.

46. Apparatus of at least one of 43 to 45, adapted to, if, after an interruption in tracking of a signal, tracking of the signal resumes, maintain the float ambiguity of the state vector for the signal for which an interruption in tracking occurred at the value before the interruption in tracking occurred as a first float ambiguity and introducing into the state vector a second float ambiguity for the signal after resuming tracking.

47. Rover including an apparatus according to any one of 24 to 46.

48. Network station including an apparatus according to any one of 24 to 46.

49. Computer program comprising instructions configured, when executed on a computer processing unit, to carry out a method according to any one of 1 to 23.

50. Computer-readable medium comprising a computer program according to 49.

($2^{nd}$ Aspect: Scaling of Quality Measure)

1. Method to estimate parameters derived from global navigational satellite system (GNSS) signals useful to determine a position,
  obtaining observations of a GNSS signal from each of a plurality of GNSS satellites;
  feeding the observations to a filter having a state vector at least comprising a float ambiguity for each received frequency of the GNSS signals, each float ambiguity constituting a real number estimate associated with an integer number of wavelengths of the GNSS signal between a receiver of the GNSS signal and the GNSS satellite from which it is received, and the filter being for estimating a float value for each float ambiguity of the state vector;

assigning integer values to at least a subgroup of the estimated float values to define a plurality of integer ambiguity candidate sets;

determining a quality measure for each of the candidate sets;

determining the best quality measure of the candidate sets;

determining an expectation value of the candidate set having the best quality measure;

determining an error measure as a ratio of the best quality measure to the expectation value;

adapting the quality measures of the candidate sets as a function of the error measure; and obtaining a weighted average of a subgroup of the candidate sets on the basis of the adapted quality measures, wherein at least one of selecting the subgroup of the candidate sets and the weighting of each candidate set in the weighted average is based on the adapted quality measure.

2. Method of 1, including adapting the quality measures of the candidate sets as a function of the error measure by adjusting the variance-covariance matrix of the float solution.

3. Method of at least one of the preceding claims, including adjusting a variance-covariance matrix of the filter using the error measure, if the error measure is in a predetermined range.

4. Method of at least one of the preceding claims, including adjusting a variance-covariance matrix of the filter using the error measure, if the error measure is larger than one.

5. Method of at least one of 1 to 4, wherein obtaining the weighted average includes:

selecting a first number of candidate sets having a quality measure better than a first threshold to form the subgroup, wherein the first threshold is determined based on a reference quality measure a reference candidate set; and obtaining the weighted average of the selected candidate sets of the subgroup, each candidate set weighted in the weighted average based on its quality measure.

6. Method of at least one of 1 to 5, including using the weighted average to estimate a position of the receiver of the GNSS signals.

7. Method of at least one of 5 and 6, wherein the reference candidate set is the candidate set having the best quality measure.

8. Method of at least one of 5 to 7, wherein the quality measure of the candidate sets is constituted by the residual error norm value, the residual error norm value of a candidate set being a measure for a statistical distance of the candidate set to the state vector having the float ambiguities.

9. Method of at least one of 5 to 8, wherein the first threshold is determined as at least one of a fraction of, a multiple of, and a distance to the reference quality measure.

10. Method of at least one of 5 to 9, including, if the first number of selected candidate sets is smaller than a second threshold, selecting, for forming the weighted average, a second number of further candidate sets on the basis of the quality measures of the candidate sets in decreasing order starting with the non-selected candidate set having the best quality measure, the second number being constituted by the difference between the first number of selected candidate sets and a second threshold defining a minimum number of candidate sets to be included in the weighted average.

11. Method of at least one of 5 to 10, including, if the first number of selected candidate sets is larger than a third threshold, excluding a third number of selected candidate sets from forming the weighted average in decreasing order starting with the selected candidate set having the worst quality measure, wherein the third number is constituted by the difference between the first number of selected candidate sets and a third threshold defining a maximum number of candidate sets to be included in the weighted average.

12. Method of at least one of 1 to 11, wherein defining the integer candidate sets includes:

selecting a subset of float ambiguities of the state vector to form the subgroup of the float ambiguities of the state vector used to define the plurality of integer ambiguity candidate sets; and assigning integer values to the estimated float values of the float ambiguities of the subset to define a plurality of integer ambiguity candidate sets.

13. Method of 12, wherein the selecting includes selecting, as float ambiguities of the subset, the float ambiguities of frequencies tracked continuously for the longest period of time.

14. Method of at least one 1 to 13, including estimating by the filter a float value for each float ambiguity of the state vector and covariance values associated with the state vector;

determining a formal precision value based on covariance values of the filter, the formal precision value being a measure for an achievable precision;

determining an achieved precision value of the weighted average;

comparing the achieved precision value with the formal precision value to obtain a convergence value; and indicating a convergence of the determination of the state vector based on the convergence value.

15. Method of 14, wherein the convergence value is obtained as a ratio of the achieved precision value to the formal precision value.

16. Method of at least one of 14 and 15, including determining an instance in time when the convergence value of the position is better than a convergence threshold; and indicating a convergence of the determination of the state vector at and after the determined instance in time.

17. Method of at least one of 14 to 16, including estimating an achieved precision of a position of the receiver determined based on the weighted ambiguities; and indicating a convergence of the determination of the state vector, if the achieved precision of the position is better than an inclusion threshold.

18. Method of at least one of 14 to 17, including estimating an achieved precision of a position of the receiver determined based on the weighted ambiguities; and indicating a non-convergence of the determination of the state vector, if the achieved precision of the position is worse an exclusion threshold.

19. Method of at least one of 1 to 18, including obtaining observations of the at least one frequency of the GNSS signals from the plurality of GNSS satellites to obtain observations at a plurality of instances in time;

updating the float ambiguities of the state vector over time on the basis of the observations;

determining that an interruption in tracking of at least one signal of a satellite occurred; and maintaining the float ambiguity of the state vector for the at least one signal for which an interruption in tracking occurred at the value before the interruption in tracking occurred.

20. Method of 19, wherein it is determined that an interruption in tracking of at least one signal of a satellite occurred if an observation for the at least one signal is not available for at least one of the instances in time.

21. Method of at least one of 19 and 20, wherein it is determined that an interruption in tracking of at least one signal of a satellite occurred, if a cycle slip occurred.

22. Method of at least one of 19 to 21 including, if after an interruption in tracking of a signal tracking of the signal resumes, maintaining the float ambiguity of the state vector for the signal for which an interruption in tracking occurred at the value before the interruption in tracking occurred as a first float ambiguity and introducing into the state vector a second float ambiguity for the signal after resuming tracking.

23. Apparatus to estimate parameters derived from global navigational satellite system (GNSS) signals useful to determine a position, a receiver adapted to obtain observations of a GNSS signal from each of a plurality of GNSS satellites;

a filter having a state vector at least comprising a float ambiguity for each received frequency of the GNSS signals, each float ambiguity constituting a real number estimate associated with an integer number of wavelengths of the GNSS signal between a receiver of the GNSS signal and the GNSS satellite from which it is received, and the filter being for estimating a float value for each float ambiguity of the state vector;

a processing element adapted to assign integer values to at least a subgroup of the estimated float values to define a plurality of integer ambiguity candidate sets;

determine a quality measure for each of the candidate sets;

determine the best quality measure of the candidate sets;

determine an expectation value of the candidate set having the best quality measure;

determine an error measure as a ratio of the best quality measure to the expectation value;

adapt the quality measures of the candidate sets as a function of the error measure; and obtain a weighted average of a subgroup of the candidate sets on the basis of the adapted quality measures, wherein at least one of selecting the subgroup of the candidate sets and the weighting of each candidate set in the weighted average is based on the adapted quality measure.

24. Apparatus of 23, wherein the processing element is adapted to adapt the quality measures of the candidate sets as a function of the error measure by adjusting the variance-covariance matrix of the float solution.

25. Apparatus of at least one of 23 and 24, wherein the processing element is adapted to adjust a variance-covariance matrix of the filter using the error measure, if the error measure is in a predetermined range.

26. Apparatus of at least one of 23 to 25, wherein the processing element is adapted to adjust a variance-covariance matrix of the filter using the error measure, if the error measure is larger than one.

27. Apparatus of at least one of 23 to 26, wherein the processing element is adapted to, in order to obtain the weighted average:

selecting a first number of candidate sets having a quality measure better than a first threshold to form the subgroup, wherein the first threshold is determined based on a reference quality measure a reference candidate set; and obtaining the weighted average of the selected candidate sets of the subgroup, each candidate set weighted in the weighted average based on its quality measure.

28. Apparatus of at least one of 23 to 27, including using the weighted average to estimate a position of the receiver of the GNSS signals.

29. Apparatus of at least one of 27 and 28, wherein the reference candidate set is the candidate set having the best quality measure.

30. Apparatus of at least one of 27 to 29, wherein the quality measure of the candidate sets is constituted by the residual error norm value, the residual error norm value of a candidate set being a measure for a statistical distance of the candidate set to the state vector having the float ambiguities.

31. Apparatus of at least one of 27 to 30, wherein the processing element is adapted to determine the first threshold as at least one of a fraction of, a multiple of, and a distance to the reference quality measure.

32. Apparatus of at least one of 27 to 31, wherein the processing element is adapted to, if the first number of selected candidate sets is smaller than a second threshold, select, for forming the weighted average, a second number of further candidate sets on the basis of the quality measures of the candidate sets in decreasing order starting with the non-selected candidate set having the best quality measure, the second number being constituted by the difference between the first number of selected candidate sets and a second threshold defining a minimum number of candidate sets to be included in the weighted average.

33. Apparatus of at least one of 27 to 32, wherein the processing element is adapted to, if the first number of selected candidate sets is larger than a third threshold, exclude a third number of selected candidate sets from forming the weighted average in decreasing order starting with the selected candidate set having the worst quality measure, wherein the third number is constituted by the difference between the first number of selected candidate sets and a third threshold defining a maximum number of candidate sets to be included in the weighted average.

34. Apparatus of at least one of 23 to 33, wherein the processing element is adapted to, in order to define the integer candidate sets:

selecting a subset of float ambiguities of the state vector to form the subgroup of the float ambiguities of the state vector used to define the plurality of integer ambiguity candidate sets; and assigning integer values to the estimated float values of the float ambiguities of the subset to define a plurality of integer ambiguity candidate sets.

35. Apparatus of 34, wherein the processing element is adapted to select, as float ambiguities of the subset, the float ambiguities of frequencies tracked continuously for the longest period of time.

36. Apparatus of at least one 23 to 35, wherein the filter is adapted to estimate a float value for each float ambiguity of the state vector and covariance values associated with the state vector; and the processing element is adapted to determine a formal precision value based on covariance values of the filter, the formal precision value being a measure for an achievable precision;

determine an achieved precision value of the weighted average;
compare the achieved precision value with the formal precision value to obtain a convergence value; and
indicate a convergence of the determination of the state vector based on the convergence value.

37. Apparatus of 36, wherein the processing element is adapted to obtain the convergence value as a ratio of the achieved precision value to the formal precision value.

38. Apparatus of at least one of 36 and 37, wherein the processing element is adapted to
determine an instance in time when the convergence value of the position is better than a convergence threshold; and
indicate a convergence of the determination of the state vector at and after the determined instance in time.

39. Apparatus of at least one of 36 to 38, wherein the processing element is adapted to
estimate an achieved precision of a position of the receiver determined based on the weighted ambiguities; and
indicate a convergence of the determination of the state vector, if the achieved precision of the position is better than an inclusion threshold.

40. Apparatus of at least one of 36 to 39, wherein the processing element is adapted to
estimate an achieved precision of a position of the receiver determined based on the weighted ambiguities; and
indicate a non-convergence of the determination of the state vector, if the achieved precision of the position is worse an exclusion threshold.

41. Apparatus of at least one of 23 to 40, adapted to
obtain observations of the at least one frequency of the GNSS signals from the plurality of GNSS satellites to obtain observations at a plurality of instances in time;
update the float ambiguities of the state vector over time on the basis of the observations;
determine that an interruption in tracking of at least one signal of a satellite occurred; and
maintain the float ambiguity of the state vector for the at least one signal for which an interruption in tracking occurred at the value before the interruption in tracking occurred.

42. Apparatus of 41, adapted to determine that an interruption in tracking of at least one signal of a satellite occurred if an observation for the at least one signal is not available for at least one of the instances in time.

43. Apparatus of at least one of 41 and 42, adapted to determine that an interruption in tracking of at least one signal of a satellite occurred, if a cycle slip occurred.

44. Apparatus of at least one of 41 to 43, adapted to, if, after an interruption in tracking of a signal, tracking of the signal resumes, maintain the float ambiguity of the state vector for the signal for which an interruption in tracking occurred at the value before the interruption in tracking occurred as a first float ambiguity and introducing into the state vector a second float ambiguity for the signal after resuming tracking.

45. Rover including an apparatus according to any one of 23 to 44.

46. Network station including an apparatus according to any one of 23 to 44.

47. Computer program comprising instructions configured, when executed on a computer processing unit, to carry out a method according to any one of 1 to 22.

48. Computer-readable medium comprising a computer program according to 47.

($3^{rd}$ Aspect: Indication of Convergence of Weighted Average Solution)

1. Method to estimate parameters derived from global navigational satellite system (GNSS) signals useful to determine a position, including
obtaining observations of a GNSS signal from each of a plurality of GNSS satellites;
feeding the observations to a filter having a state vector comprising a float ambiguity for each received frequency of the GNSS signals, each float ambiguity constituting a real number estimate of an integer number of wavelengths of the GNSS signal between a receiver of the GNSS signal and the GNSS satellite from which it is received, the filter estimating a float value for each float ambiguity of the state vector and covariance values associated with the state vector;
assigning integer values to at least a subgroup of the estimated float values to define a plurality of integer ambiguity candidate sets;
obtaining a weighted average of the candidate sets;
determining a formal precision value based on covariance values of the filter, the formal precision value being a measure for an achievable precision;
determining an achieved precision value of the weighted average;
comparing the achieved precision value with the formal precision value to obtain a convergence value; and
indicating a convergence of the determination of the state vector.

2. Method of 1, wherein the convergence value is obtained as a ratio of the achieved precision value to the formal precision value.

3. Method of at least one of 1 and 2, including
determining an instance in time when the convergence value of the position is better than a convergence threshold; and
indicating a convergence of the determination of the state vector at and after the determined instance in time.

4. Method of at least one of 1 to 3, including
estimating an achieved precision of a position of the receiver determined based on the weighted ambiguities; and
indicating a convergence of the determination of the state vector, if the achieved precision of the position is better than an inclusion threshold 5. Method of at least one of 1 to 4, including
estimating an achieved precision of a position of the receiver determined based on the weighted ambiguities; and
indicating a non-convergence of the determination of the state vector, if the achieved precision of the position is worse than an exclusion threshold.

6. Method of at least one of 1 to 5, wherein obtaining a weighted average of the candidate sets includes;
selecting a first number of candidate sets having a quality measure better than a first threshold, wherein the first threshold is determined based on a reference quality measure of a reference candidate set; and
forming the weighted average of the selected candidate sets by weighing each candidate set in the weighted average based on its quality measure.

7. Method of 6, including using the weighted average to estimate a position of the receiver of the GNSS signals.

8. Method of at least one of 6 and 7, wherein the reference candidate set is the candidate set having the best quality measure.

9. Method of at least one of 6 to 8, wherein the quality measure of the candidate sets is constituted by a residual error norm value, the residual error norm value of a candidate set being a measure for a statistical distance of the candidate set to the state vector having the float ambiguities.

10. Method of at least one of 6 to 9, wherein the first threshold is determined as at least one of a fraction of, a multiple of, and a distance to the reference quality measure.

11. Method of at least one of 6 to 10, including, if the first number of selected candidate sets is smaller than a second threshold, selecting, for forming the weighted average, a second number of further candidate sets on the basis of the quality measures of the candidate sets in decreasing order starting with the non-selected candidate set having the best quality measure, the second number being constituted by the difference between the first number of selected candidate sets and a second threshold defining a minimum number of candidate sets to be included in the weighted average.

12. Method of at least one of 6 to 11, including, if the first number of selected candidate sets is larger than a third threshold, excluding a third number of selected candidate sets from forming the weighted average in decreasing order starting with the selected candidate set having the worst quality measure, wherein the third number is constituted by the difference between the first number of selected candidate sets and a third threshold defining a maximum number of candidate sets to be included in the weighted average.

13. Method of at least one of 1 to 12, wherein obtaining the weighted average includes:
    determining the best quality measure of the candidate sets;
    determining an expectation value of the candidate set having the best quality measure;
    determining an error measure as a ratio of the best quality measure to the expectation value;
    adapting the quality measures of the candidate sets as a function of the error measure;
    performing a selection of the first number of candidate sets based on the adapted quality measures; and
    forming the weighted average on the basis of the quality measures.

14. Method of at least one of 1 to 13, wherein obtaining the weighted average includes:
    determining the best quality measure of the candidate sets;
    determining an expectation value of the candidate set having the best quality measure;
    determining an error measure as a ratio of the best quality measure to the expectation value;
    adapting the quality measures of the candidate sets as a function of the error measure; and
    forming the weighted average based on the adapted quality measures.

15. Method of at least one of 13 and 14, including adapting the quality measures of the candidate sets as a function of the error measure by adjusting the variance-covariance matrix of the float solution.

16. Method of at least one of 13 to 15, including adjusting a variance-covariance matrix of the filter using the error measure, if the error measure is in a predetermined range.

17. Method of at least one of 13 to 16, including adjusting a variance-covariance matrix of the filter using the error measure, if the error measure is larger than one.

18. Method of at least one of 1 to 17, wherein defining the integer candidate sets includes:
    selecting a subset of float ambiguities of the state vector to form the subgroup of the float ambiguities of the state vector used to define the plurality of integer ambiguity candidate sets; and
    assigning integer values to the estimated float values of the float ambiguities of the subset to define a plurality of integer ambiguity candidate sets.

19. Method of 18, wherein the selecting includes selecting, as float ambiguities of the subset, the float ambiguities of frequencies tracked continuously for the longest period of time.

20. Method of at least one of 1 to 19, including
    obtaining observations of the at least one frequency of the GNSS signals from the plurality of GNSS satellites to obtain observations at a plurality of instances in time;
    updating the float ambiguities of the state vector over time on the basis of the observations;
    determining that an interruption in tracking of at least one signal of a satellite occurred; and
    maintaining the float ambiguity of the state vector for the at least one signal for which an interruption in tracking occurred at the value before the interruption in tracking occurred.

21. Method of 20, wherein it is determined that an interruption in tracking of at least one signal of a satellite occurred if an observation for the at least one signal is not available for at least one of the instances in time.

22. Method of at least one of 20 and 21, wherein it is determined that an interruption in tracking of at least one signal of a satellite occurred, if a cycle slip occurred.

23. Method of at least one of 20 to 22 including, if, after an interruption in tracking of a signal, tracking of the signal resumes, maintaining the float ambiguity of the state vector for the signal for which an interruption in tracking occurred at the value before the interruption in tracking occurred as a first float ambiguity and introducing into the state vector a second float ambiguity for the signal after resuming tracking.

24. Apparatus to estimate parameters derived from global navigational satellite system (GNSS) signals useful to determine a position, including
    a receiver adapted to obtain observations of a GNSS signal from each of a plurality of GNSS satellites;
    a filter having a state vector comprising a float ambiguity for each received frequency of the GNSS signals, each float ambiguity constituting a real number estimate of an integer number of wavelengths of the GNSS signal between a receiver of the GNSS signal and the GNSS satellite from which it is received, the filter estimating a float value for each float ambiguity of the state vector and covariance values associated with the state vector;
    a processing element adapted to
        assign integer values to at least a subgroup of the estimated float values to define a plurality of integer ambiguity candidate sets;
        obtain a weighted average of the candidate sets;
        determine a formal precision value based on covariance values of the filter, the formal precision value being a measure for an achievable precision;
        determine an achieved precision value of the weighted average;
        compare the achieved precision value with the formal precision value to obtain a convergence value; and
        indicate a convergence of the determination of the state vector.

25. Apparatus of 24, wherein the processing element is adapted to obtain the convergence value as a ratio of the achieved precision value to the formal precision value.

26. Apparatus of at least one of 24 and 25, wherein the processing element is adapted to determine an instance in time when the convergence value of the position is better than a convergence threshold; and indicate a convergence of the determination of the state vector at and after the determined instance in time.

27. Apparatus of at least one of 24 to 26, wherein the processing element is adapted to
estimate an achieved precision of a position of the receiver determined based on the weighted ambiguities; and
indicate a convergence of the determination of the state vector, if the achieved precision of the position is better than an inclusion threshold 28. Apparatus of at least one of 24 to 27, wherein the processing element is adapted to
estimate an achieved precision of a position of the receiver determined based on the weighted ambiguities; and
indicate a non-convergence of the determination of the state vector, if the achieved precision of the position is worse than an exclusion threshold.

29. Apparatus of at least one of 24 to 28, wherein the processing element is adapted to, in order to obtain the weighted average of the candidate sets;
select a first number of candidate sets having a quality measure better than a first threshold, wherein the first threshold is determined based on a reference quality measure of a reference candidate set; and
form the weighted average of the selected candidate sets by weighing each candidate set in the weighted average based on its quality measure.

30. Apparatus of 29, wherein the processing element is adapted to use the weighted average to estimate a position of the receiver of the GNSS signals.

31. Apparatus of at least one of 29 and 30, wherein the reference candidate set is the candidate set having the best quality measure.

32. Apparatus of at least one of 29 to 31, wherein the quality measure of the candidate sets is constituted by a residual error norm value, the residual error norm value of a candidate set being a measure for a statistical distance of the candidate set to the state vector having the float ambiguities.

33. Apparatus of at least one of 29 to 32, wherein the processing element is adapted to determine the first threshold as at least one of a fraction of, a multiple of, and a distance to the reference quality measure.

34. Apparatus of at least one of 29 to 33, wherein the processing element is adapted to, if the first number of selected candidate sets is smaller than a second threshold, select, for forming the weighted average, a second number of further candidate sets on the basis of the quality measures of the candidate sets in decreasing order starting with the non-selected candidate set having the best quality measure, the second number being constituted by the difference between the first number of selected candidate sets and a second threshold defining a minimum number of candidate sets to be included in the weighted average.

35. Apparatus of at least one of 29 to 34, wherein the processing element is adapted to, if the first number of selected candidate sets is larger than a third threshold, exclude a third number of selected candidate sets from forming the weighted average in decreasing order starting with the selected candidate set having the worst quality measure, wherein the third number is constituted by the difference between the first number of selected candidate sets and a third threshold defining a maximum number of candidate sets to be included in the weighted average.

36. Apparatus of at least one of 24 to 35, wherein the processing element is adapted to, in order to obtain the weighted average:
determine the best quality measure of the candidate sets;
determine an expectation value of the candidate set having the best quality measure;
determine an error measure as a ratio of the best quality measure to the expectation value;
adapt the quality measures of the candidate sets as a function of the error measure;
perform a selection of the first number of candidate sets based on the adapted quality measures; and
form the weighted average on the basis of the quality measures.

37. Apparatus of at least one of 24 to 36, wherein the processing element is adapted to, in order to obtain the weighted average:
determine the best quality measure of the candidate sets;
determine an expectation value of the candidate set having the best quality measure;
determine an error measure as a ratio of the best quality measure to the expectation value;
adapt the quality measures of the candidate sets as a function of the error measure; and
form the weighted average based on the adapted quality measures.

38. Apparatus of at least one of 36 and 37, wherein the processing element is adapted to adapt the quality measures of the candidate sets as a function of the error measure by adjusting the variance-covariance matrix of the float solution.

39. Apparatus of at least one of 36 to 38, wherein the processing element is adapted to adjust a variance-covariance matrix of the filter using the error measure, if the error measure is in a predetermined range.

40. Apparatus of at least one of 36 to 39, wherein the processing element is adapted to adjust a variance-covariance matrix of the filter using the error measure, if the error measure is larger than one.

41. Apparatus of at least one of 24 to 40, wherein the processing element is adapted to, so as to define the integer candidate sets:
select a subset of float ambiguities of the state vector to form the subgroup of the float ambiguities of the state vector used to define the plurality of integer ambiguity candidate sets; and
assign integer values to the estimated float values of the float ambiguities of the subset to define a plurality of integer ambiguity candidate sets.

42. Apparatus of 41, wherein the processing element is adapted to select, as float ambiguities of the subset, the float ambiguities of frequencies tracked continuously for the longest period of time.

43. Apparatus of at least one of 24 to 42, adapted to
obtain observations of the at least one frequency of the GNSS signals from the plurality of GNSS satellites to obtain observations at a plurality of instances in time;
update the float ambiguities of the state vector over time on the basis of the observations;
determine that an interruption in tracking of at least one signal of a satellite occurred; and
maintain the float ambiguity of the state vector for the at least one signal for which an interruption in tracking occurred at the value before the interruption in tracking occurred.

44. Apparatus of 43, adapted to determine that an interruption in tracking of at least one signal of a satellite occurred if an observation for the at least one signal is not available for at least one of the instances in time.

45. Apparatus of at least one of 43 and 44, adapted to determine that an interruption in tracking of at least one signal of a satellite occurred, if a cycle slip occurred.

46. Apparatus of at least one of 43 to 45 adapted to, if, after an interruption in tracking of a signal, tracking of the signal resumes, maintain the float ambiguity of the state vector for the signal for which an interruption in tracking occurred at the value before the interruption in tracking occurred as a first float ambiguity and introducing into the state vector a second float ambiguity for the signal after resuming tracking.

47. Rover including an apparatus according to any one of 24 to 46.

48. Network station including an apparatus according to any one of 24 to 46.

49. Computer program comprising instructions configured, when executed on a computer processing unit, to carry out a method according to any one of 1 to 23.

50. Computer-readable medium comprising a computer program according to 49.

($4^{th}$ Aspect: Keeping Legacy Observations after Interruption of Tracking)

1. Method to estimate parameters derived from global navigational satellite system (GNSS) signals useful to determine a position, including
    obtaining observations of each of received frequencies of a GNSS signal from a plurality of GNSS satellites to obtain observations at a plurality of instances in time;
    feeding the time sequence of observations to a filter to estimate a state vector at least comprising float ambiguities, wherein each float ambiguity constitutes a real number estimate of an integer number of wavelengths for a received frequency of a GNSS signal between a receiver of the GNSS signal and the GNSS satellite from which it is received and wherein the float ambiguities of the state vector are updated over time on the basis of the observations;
    determining that an interruption in tracking of at least one signal of a satellite occurred;
    maintaining the float ambiguity of the state vector for the at least one signal for which an interruption in tracking occurred at the value before the interruption in tracking occurred;
    assigning integer values to at least a subgroup of the estimated float values to define a plurality of integer ambiguity candidate sets;
    determining a quality measure for each of the candidate sets; and
    obtaining a weighted average of the candidate sets.

2. Method of 1, wherein it is determined that an interruption in tracking of at least one signal of a satellite occurred if an observation for the at least one signal is not available for at least one of the instances in time.

3. Method of at least one of 1 and 2, wherein it is determined that an interruption in tracking of at least one signal of a satellite occurred, if a cycle slip occurred.

4. Method of at least one of 1 to 3 including, if, after an interruption in tracking of a signal, tracking of the signal resumes, maintaining the float ambiguity of the state vector for the signal for which an interruption in tracking occurred at the value before the interruption in tracking occurred as a first float ambiguity and introducing into the state vector a second float ambiguity for the signal after resuming tracking.

5. Method of at least one of 1 to 5, wherein obtaining the weighted average includes
    selecting a first number of candidate sets having a quality measure better than a first threshold, wherein the first threshold is determined based on a reference quality measure a reference candidate set; and
    obtaining the weighted average of the selected candidate sets by weighing each candidate set in the weighted average based on its quality measure.

6. Method of 5, including using the weighted average to estimate a position of the receiver of the GNSS signals.

7. Method of at least one of 5 and 6, wherein the reference candidate set is the candidate set having the best quality measure.

8. Method of at least one of 5 to 7, wherein the quality measure of the candidate sets is constituted by a residual error norm value, the residual error norm value of a candidate set being a measure for a statistical distance of the candidate set to the state vector having the float ambiguities.

9. Method of at least one of 5 to 8, wherein the first threshold is determined as at least one of a fraction of, a multiple of, and a distance to the reference quality measure.

10. Method of at least one of 5 to 9, including, if the first number of selected candidate sets is smaller than a second threshold, selecting, for forming the weighted average, a second number of further candidate sets on the basis of the quality measures of the candidate sets in decreasing order starting with the non-selected candidate set having the best quality measure, the second number being constituted by the difference between the first number of selected candidate sets and a second threshold defining a minimum number of candidate sets to be included in the weighted average.

11. Method of at least one of 5 to 10, including, if the first number of selected candidate sets is larger than a third threshold, excluding a third number of selected candidate sets from forming the weighted average in decreasing order starting with the selected candidate set having the worst quality measure, wherein the third number is constituted by the difference between the first number of selected candidate sets and a third threshold defining a maximum number of candidate sets to be included in the weighted average.

12. Method of at least one of 1 to 11, wherein obtaining the weighted average includes:
    determining the best quality measure of the candidate sets;
    determining an expectation value of the candidate set having the best quality measure;
    determining an error measure as a ratio of the best quality measure to the expectation value;
    adapting the quality measures of the candidate sets as a function of the error measure;
    performing a selection of the first number of candidate sets based on the adapted quality measures; and
    forming the weighted average on the basis of the quality measures.

13. Method of at least one of 1 to 12, wherein obtaining the weighted average includes:
    determining the best quality measure of the candidate sets;
    determining an expectation value of the candidate set having the best quality measure;
    determining an error measure as a ratio of the best quality measure to the expectation value;
    adapting the quality measures of the candidate sets as a function of the error measure; and
    forming the weighted average based on the adapted quality measures.

14. Method of at least one of 1 to 13, including adapting the quality measures of the candidate sets as a function of the error measure by adjusting a variance-covariance matrix of the float solution so as to change the distribution of the quality measures of the candidate sets relative to the float solution.

15. Method of at least one of 12 to 14, including adjusting a variance-covariance matrix of the filter using the error measure, if the error measure is in a predetermined range.

16. Method of at least one of 12 to 15, including adjusting a variance-covariance matrix of the filter using the error measure, if the error measure is larger than one.

17. Method of at least one of 1 to 16, wherein defining the integer candidate sets includes:
   selecting a subset of float ambiguities of the state vector to form the subgroup of the float ambiguities of the state vector used to define the plurality of integer ambiguity candidate sets; and
   assigning integer values to the estimated float values of the float ambiguities of the subset to define the plurality of integer ambiguity candidate sets.

18. Method of 17, wherein the selecting includes selecting, as float ambiguities of the subset, the float ambiguities of frequencies tracked continuously for the longest period of time.

19. Method of at least one 1 to 18, including
   estimating by the filter a float value for each float ambiguity of the state vector and covariance values associated with the state vector;
   determining a formal precision value based on covariance values of the filter, the formal precision value being a measure for an achievable precision;
   determining an achieved precision value of the weighted average;
   comparing the achieved precision value with the formal precision value to obtain a convergence value; and
   indicating a convergence of the determination of the state vector based on the convergence value.

20. Method of 19, wherein the convergence value is obtained as a ratio of the achieved precision value to the formal precision value.

21. Method of at least one of 19 and 20, including
   determining an instance in time when the convergence value of the position is better than a convergence threshold; and
   indicating a convergence of the determination of the state vector at and after the determined instance in time.

22. Method of at least one of 19 to 21, including
   estimating an achieved precision of a position of the receiver determined based on the weighted ambiguities; and
   indicating a convergence of the determination of the state vector, if the achieved precision of the position is better than an inclusion threshold 23. Method of at least one of 19 to 22, including
   estimating an achieved precision of a position of the receiver determined based on the weighted ambiguities; and
   indicating a non-convergence of the determination of the state vector, if the achieved precision of the position is worse than an exclusion threshold.

24. Apparatus to estimate parameters derived from global navigational satellite system (GNSS) signals useful to determine a position, including
   a receiver adapted to obtain observations of each of received frequencies of a GNSS signal from a plurality of GNSS satellites to obtain observations at a plurality of instances in time;
   a filter to estimate a state vector at least comprising float ambiguities based on the time sequence of observations, wherein each float ambiguity constitutes a real number estimate of an integer number of wavelengths for a received frequency of a GNSS signal between a receiver of the GNSS signal and the GNSS satellite from which it is received and wherein the float ambiguities of the state vector are updated over time on the basis of the observations;
   a processing element adapted to
      determine that an interruption in tracking of at least one signal of a satellite occurred;
      maintain the float ambiguity of the state vector for the at least one signal for which an interruption in tracking occurred at the value before the interruption in tracking occurred;
      assign integer values to at least a subgroup of the estimated float values to define a plurality of integer ambiguity candidate sets;
      determine a quality measure for each of the candidate sets; and
      obtain a weighted average of the candidate sets.

25. Apparatus of 24, wherein the processing element is adapted to determine that an interruption in tracking of at least one signal of a satellite occurred if an observation for the at least one signal is not available for at least one of the instances in time.

26. Apparatus of at least one of 24 and 25, wherein the processing element is adapted to determine that an interruption in tracking of at least one signal of a satellite occurred, if a cycle slip occurred.

27. Apparatus of at least one of 24 to 26 wherein the processing element is adapted to, if, after an interruption in tracking of a signal, tracking of the signal resumes, maintain the float ambiguity of the state vector for the signal for which an interruption in tracking occurred at the value before the interruption in tracking occurred as a first float ambiguity and introducing into the state vector a second float ambiguity for the signal after resuming tracking.

28. Apparatus of at least one of 24 to 27, wherein the processing element is adapted to, in order to obtain the weighted average
   select a first number of candidate sets having a quality measure better than a first threshold, wherein the first threshold is determined based on a reference quality measure a reference candidate set; and
   obtain the weighted average of the selected candidate sets by weighing each candidate set in the weighted average based on its quality measure.

29. Apparatus of 28, wherein the processing element is adapted to use the weighted average to estimate a position of the receiver of the GNSS signals.

30. Apparatus of at least one of 28 and 29, wherein the reference candidate set is the candidate set having the best quality measure.

31. Apparatus of at least one of 28 to 30, wherein the quality measure of the candidate sets is constituted by a residual error norm value, the residual error norm value of a candidate set being a measure for a statistical distance of the candidate set to the state vector having the float ambiguities.

32. Apparatus of at least one of 28 to 31, wherein the processing element is adapted to determine the first threshold as at least one of a fraction of, a multiple of, and a distance to the reference quality measure.

33. Apparatus of at least one of 28 to 32, wherein the processing element is adapted to, if the first number of selected candidate sets is smaller than a second threshold, select, for forming the weighted average, a second number of further candidate sets on the basis of the quality measures of the candidate sets in decreasing order starting with the non-selected candidate set having the best quality measure, the second number being constituted by the difference between the first number of selected candidate sets and a second threshold defining a minimum number of candidate sets to be included in the weighted average.

34. Apparatus of at least one of 28 to 33, wherein the processing element is adapted to, if the first number of selected candidate sets is larger than a third threshold, exclude a third number of selected candidate sets from forming the weighted average in decreasing order starting with the selected candidate set having the worst quality measure, wherein the third number is constituted by the difference between the first number of selected candidate sets and a third threshold defining a maximum number of candidate sets to be included in the weighted average.

35. Apparatus of at least one of 24 to 34, wherein the processing element is adapted to, in order to obtain the weighted average:
    determine the best quality measure of the candidate sets;
    determine an expectation value of the candidate set having the best quality measure;
    determine an error measure as a ratio of the best quality measure to the expectation value;
    adapt the quality measures of the candidate sets as a function of the error measure;
    perform a selection of the first number of candidate sets based on the adapted quality measures; and
    form the weighted average on the basis of the quality measures.

36. Apparatus of at least one of 24 to 35, wherein the processing element is adapted to, in order to obtain the weighted average:
    determine the best quality measure of the candidate sets;
    determine an expectation value of the candidate set having the best quality measure;
    determine an error measure as a ratio of the best quality measure to the expectation value;
    adapt the quality measures of the candidate sets as a function of the error measure; and
    form the weighted average based on the adapted quality measures.

37. Apparatus of at least one of 24 to 36, wherein the processing element is adapted to adapt the quality measures of the candidate sets as a function of the error measure by adjusting a variance-covariance matrix of the float solution so as to change the distribution of the quality measures of the candidate sets relative to the float solution.

38. Apparatus of at least one of 35 to 37, wherein the processing element is adapted to adjust a variance-covariance matrix of the filter using the error measure, if the error measure is in a predetermined range.

39. Apparatus of at least one of 35 to 38, wherein the processing element is adapted to adjust a variance-covariance matrix of the filter using the error measure, if the error measure is larger than one.

40. Apparatus of at least one of 24 to 39, wherein the processing element is adapted to, in order to define the integer candidate sets:
    select a subset of float ambiguities of the state vector to form the subgroup of the float ambiguities of the state vector used to define the plurality of integer ambiguity candidate sets; and
    assign integer values to the estimated float values of the float ambiguities of the subset to define the plurality of integer ambiguity candidate sets.

41. Apparatus of 40, wherein the processing element is adapted to select, as float ambiguities of the subset, the float ambiguities of frequencies tracked continuously for the longest period of time.

42. Apparatus of at least one 24 to 41, wherein the filter is adapted to
    estimate by the filter a float value for each float ambiguity of the state vector and covariance values associated with the state vector; and
    wherein the processing element is adapted to
        determine a formal precision value based on covariance values of the filter, the formal precision value being a measure for an achievable precision;
        determine an achieved precision value of the weighted average;
        compare the achieved precision value with the formal precision value to obtain a convergence value; and
        indicate a convergence of the determination of the state vector based on the convergence value.

43. Apparatus of 42, wherein the processing element is adapted to obtain the convergence value as a ratio of the achieved precision value to the formal precision value.

44. Apparatus of at least one of 42 and 43, wherein the processing element is adapted to
    determine an instance in time when the convergence value of the position is better than a convergence threshold; and
    indicate a convergence of the determination of the state vector at and after the determined instance in time.

45. Apparatus of at least one of 42 to 44, wherein the processing element is adapted to
    estimate an achieved precision of a position of the receiver determined based on the weighted ambiguities; and
    indicate a convergence of the determination of the state vector, if the achieved precision of the position is better than an inclusion threshold 46. Apparatus of at least one of 42 to 45, wherein the processing element is adapted to
    estimate an achieved precision of a position of the receiver determined based on the weighted ambiguities; and
    indicate a non-convergence of the determination of the state vector, if the achieved precision of the position is worse than an exclusion threshold.

47. Rover including an apparatus according to any one of 24 to 46.

48. Network station including an apparatus according to any one of 24 to 46.

49. Computer program comprising instructions configured, when executed on a computer processing unit, to carry out a method according to any one of 1 to 23.

50. Computer-readable medium comprising a computer program according to 49.

($5^{th}$ Aspect: Ambiguity Selection)

1. Method to estimate parameters derived from global navigational satellite system (GNSS) signals useful to determine a position, comprising
    obtaining observations of a GNSS signal from each of a plurality of GNSS satellites;
    feeding the observations to a filter having a state vector at least comprising a float ambiguity for each received frequency of the GNSS signals, each float ambiguity constituting a real number estimate associated with an integer number of wavelengths of the GNSS signal between a receiver of the GNSS signal and the GNSS satellite from which it is received, and the filter being for estimating a float value for each float ambiguity of the state vector;

selecting a subset of the ambiguities of the state vector;

assigning integer values to the estimated float values of the float ambiguities of the subset to define a plurality of candidate sets;

determining a quality measure for each of the candidate sets; and forming a weighted average of the candidate sets.

2. The method of 1, wherein selecting a subset of float ambiguities of the state vector comprises one of: (a) operating the filter to estimate from the observations a complete set of float ambiguity values and subsequently selecting the subset of float ambiguities from among the complete set of float ambiguity values, and (b) operating the filter to estimate from the observations a selected partial set of float ambiguity values comprising fewer than the complete set of float ambiguity values, wherein the partial set of float ambiguity values comprises the subset of float ambiguities of the state vector.

3. Method of 1 or 2, wherein the selecting comprises selecting, as float ambiguities of the subset, the float ambiguities corresponding to frequencies of satellites tracked continuously for the longest period of time.

4. Method of at least one of 1 to 3, wherein forming the weighted average comprises selecting a first number of candidate sets having a quality measure better than a first threshold, wherein the first threshold is determined based on a reference quality measure of a reference candidate set; and forming a weighted average of the selected candidate sets, each candidate set weighted in the weighted average based on its quality measure.

5. Method of at least one of 1 to 4, further comprising:

determining a problem in the floating solution by at least one of (1) comparing a quality measure of a reference candidate set with a problem threshold and (2) determining an improvement factor by comparing the quality measure of the reference candidate set with a quality measure of a superset of the float ambiguities of the reference candidate set, and resetting the estimated float value of at least one of the float ambiguities which is not included in the candidate set.

6. Method of one of 1 to 5, comprising using the weighted average to estimate a position of the receiver of the GNSS signals.

7. Method of at least one of 4 and 5, wherein the reference candidate set is the candidate set having the best quality measure.

8. Method of at least one of 4 to 7, wherein the quality measure of the candidate sets is constituted by a residual error norm value, the residual error norm value of a candidate set being a measure for a statistical distance of the candidate set to the state vector having the float ambiguities.

9. Method of at least one of 4 to 8, wherein the first threshold is determined as at least one of a fraction of, a multiple of, and a distance to the reference quality measure.

10. Method of at least one of 4 to 9, comprising, if the first number of selected candidate sets is smaller than a second threshold, selecting, for forming the weighted average, a second number of further candidate sets on the basis of the quality measures of the candidate sets in decreasing order starting with the non-selected candidate set having the best quality measure, the second number being constituted by the difference between the first number of selected candidate sets and a second threshold defining a minimum number of candidate sets to be included in the weighted average.

11. Method of at least one of 4 to 10 comprising, if the first number of selected candidate sets is larger than a third threshold, excluding a third number of selected candidate sets from forming the weighted average in decreasing order starting with the selected candidate set having the worst quality measure, wherein the third number is constituted by the difference between the first number of selected candidate sets and a third threshold defining a maximum number of candidate sets to be included in the weighted average.

12. Method of at least one of 1 to 11, wherein forming the weighted average comprises:

determining the best quality measure of the candidate sets;

determining an expectation value of the candidate set having the best quality measure;

determining an error measure as a ratio of the best quality measure to the expectation value;

adapting the quality measures of the candidate sets as a function of the error measure; and performing a selection of a first number of candidate sets based on the adapted quality measures.

13. Method of at least one of 1 to 12, wherein forming the weighted average comprises:

determining the best quality measure of the candidate sets;

determining an expectation value of the candidate set having the best quality measure;

determining an error measure as a ratio of the best quality measure to the expectation value;

adapting the quality measures of the candidate sets as a function of the error measure; and forming the weighted average based on the adapted quality measure.

14. Method of at least one of 12 and 13, comprising adapting the quality measures of the candidate sets as a function of the error measure by adjusting the variance-covariance matrix of the float solution.

15. Method of at least one of 12 to 14, comprising adjusting a variance-covariance matrix of the filter using the error measure, if the error measure is in a predetermined range.

16. Method of at least one of 12 to 14, comprising adjusting a variance-covariance matrix of the filter using the error measure, if the error measure is larger than one.

17. Method of at least one of 1 to 16, comprising estimating by the filter a float value for each float ambiguity of the state vector and covariance values associated with the state vector;

determining a formal precision value based on covariance values derived of the filter, the formal precision value being a measure for an achievable precision;

determining an achieved precision value of the weighted average;

comparing the achieved precision value with the formal precision value to obtain a convergence value; and indicating a convergence of the determination of the state vector based on the convergence value.

18. Method of 17, wherein the convergence value is obtained as a ratio of the achieved precision value to the formal precision value.

19. Method of at least one of 17 and 18, comprising determining an instance in time when the convergence value of the position is better than a convergence threshold; and indicating a convergence of the determination of the state vector at and after the determined instance in time.

20. Method of at least one of 17 to 19, comprising estimating an achieved precision of a position of the receiver determined based on the weighted ambiguities; and indicating a convergence of the determination of the state vector, if the achieved precision of the position is better than an inclusion threshold.

21. Method of at least one of 17 to 20, comprising
estimating an achieved precision of a position of the receiver determined based on the weighted ambiguities; and
indicating a non-convergence of the determination of the state vector, if the achieved precision of the position is worse than an exclusion threshold.

22. Method of at least one of 1 to 21, comprising:
obtaining observations of the at least one frequency of the GNSS signals from the plurality of GNSS satellites to obtain observations at a plurality of instances in time;
updating the float ambiguities of the state vector over time on the basis of the observations;
determining that an interruption in tracking of at least one signal of a satellite occurred; and
maintaining the float ambiguity of the state vector for the at least one signal for which an interruption in tracking occurred at the value before the interruption in tracking occurred.

23. Method of 22, wherein it is determined that an interruption in tracking of at least one signal of a satellite occurred if an observation for the at least one signal is not available for at least one of the instances in time.

24. Method of at least one of 22 and 23, wherein it is determined that an interruption in tracking of at least one signal of a satellite occurred, if a cycle slip occurred.

25. Method of at least one of 22 to 24 comprising, if, after an interruption in tracking of a signal, tracking of the signal resumes, maintaining the float ambiguity of the state vector for the signal for which an interruption in tracking occurred at the value before the interruption in tracking occurred as a first float ambiguity and introducing into the state vector a second float ambiguity for the signal after resuming tracking.

26. Apparatus to estimate parameters derived from global navigational satellite system (GNSS) signals useful to determine a position, comprising
a receiver adapted to obtain observations of a GNSS signal from each of a plurality of GNSS satellites;
a filter having a state vector at least comprising a float ambiguity for each received frequency of the GNSS signals, each float ambiguity constituting a real number estimate associated with an integer number of wavelengths of the GNSS signal between a receiver of the GNSS signal and the GNSS satellite from which it is received, and the filter being for estimating a float value for each float ambiguity of the state vector;
a processing element adapted to
select a subset of float ambiguities of the state vector;
assign integer values to the estimated float values of the float ambiguities of the subset to define a plurality of integer ambiguity candidate sets;
determine a quality measure for each of the candidate sets; and
form a weighted average of the candidate sets.

27. Apparatus of 26, wherein the processing is adapted to select a subset of float ambiguities of the state vector by one of: (a) operating the filter to estimate from the observations a complete set of float ambiguity values and subsequently selecting the subset of float ambiguities from among the complete set of float ambiguity values, and (b) operating the filter to estimate from the observations a selected partial set of float ambiguity values comprising fewer than the full set of float ambiguity values, wherein the partial set of float ambiguity values comprises the subset of float ambiguities of the state vector.

28. Apparatus of at least one of 26 and 27, wherein the processing element is adapted to select, as float ambiguities of the subset, the float ambiguities corresponding to frequencies of satellites tracked continuously for the longest period of time.

29. Apparatus of at least one of 26 to 28, wherein the processing element is adapted to, in order to form the weighted average,
select a first number of candidate sets having a quality measure better than a first threshold, wherein the first threshold is determined based on a reference quality measure a reference candidate set; and
form a weighted average of the selected candidate sets, each candidate set weighted in the weighted average based on its quality measure.

30. Apparatus of at least one of 26 to 29, wherein the processing element is further adapted to:
determine a problem in the floating solution by at least one of (1) comparing a quality measure of a reference candidate set with a problem threshold and (2) determining an improvement factor by comparing the quality measure of the reference candidate set with a quality measure of a superset of the float ambiguities of the reference candidate set, and
reset the estimated float value of at least one of the float ambiguities which is not included in the candidate set.

31. Apparatus of at least one of 26 to 29, wherein the processing element is adapted to use the weighted average to estimate a position of the receiver of the GNSS signals.

32. Apparatus of at least one of 29 and 30, wherein the reference candidate set is the candidate set having the best quality measure.

33. Apparatus of at least one of 29 to 32, wherein the quality measure of the candidate sets is constituted by a residual error norm value, the residual error norm value of a candidate set being a measure for a statistical distance of the candidate set to the state vector having the float ambiguities.

34. Apparatus of at least one of 29 to 32, wherein the processing element is adapted to determine the first threshold as at least one of a fraction of, a multiple of, and a distance to the reference quality measure.

35. Apparatus of at least one of 29 to 34, wherein the processing element is adapted to, if the first number of selected candidate sets is smaller than a second threshold, select, for forming the weighted average, a second number of further candidate sets on the basis of the quality measures of the candidate sets in decreasing order starting with the non-selected candidate set having the best quality measure, the second number being constituted by the difference between the first number of selected candidate sets and a second threshold defining a minimum number of candidate sets to be included in the weighted average.

36. Apparatus of at least one of 29 to 35, wherein the processing element is adapted to, if the first number of selected candidate sets is larger than a third threshold, exclude a third number of selected candidate sets from forming the weighted average in decreasing order starting with the selected candidate set having the worst quality measure, wherein the third number is constituted by the difference between the first number of selected candidate sets and a third threshold defining a maximum number of candidate sets to be included in the weighted average.

37. Apparatus of at least one of 26 to 36, wherein the processing element is adapted to, in order to form the weighted average,
determine the best quality measure of the candidate sets;
determine an expectation value of the candidate set having the best quality measure;

determine an error measure as a ratio of the best quality measure to the expectation value;
adapt the quality measures of the candidate sets as a function of the error measure; and
perform a selection of a first number of candidate sets based on the adapted quality measures.

38. Apparatus of at least one of 26 to 37, wherein the processing element is adapted to, in order to form the weighted average,
determine the best quality measure of the candidate sets;
determine an expectation value of the candidate set having the best quality measure;
determine an error measure as a ratio of the best quality measure to the expectation value;
adapt the quality measures of the candidate sets as a function of the error measure; and
form the weighted average based on the adapted quality measure.

39. Apparatus of at least one of 37 and 38, wherein the processing element is adapted to adapt the quality measures of the candidate sets as a function of the error measure by adjusting the variance-covariance matrix of the float solution.

40. Apparatus of at least one of 37 to 39, wherein the processing element is adapted to adjust a variance-covariance matrix of the filter using the error measure, if the error measure is in a predetermined range.

41. Apparatus of at least one of 37 to 40, wherein the processing element is adapted to adjust a variance-covariance matrix of the filter using the error measure, if the error measure is larger than one.

42. Apparatus of at least one of 26 to 41, wherein the filter is adapted to estimate a float value for each float ambiguity of the state vector and covariance values associated with the state vector; and the processing element is adapted to
determine a formal precision value based on covariance values derived of the filter, the formal precision value being a measure for an achievable precision;
determine an achieved precision value of the weighted average;
compare the achieved precision value with the formal precision value to obtain a convergence value; and
indicate a convergence of the determination of the state vector based on the convergence value.

43. Apparatus of 42, wherein the processing element is adapted to obtain the convergence value as a ratio of the achieved precision value to the formal precision value.

44. Apparatus of at least one of 42 and 43, wherein the processing element is adapted to
determine an instance in time when the convergence value of the position is better than a convergence threshold; and
indicate a convergence of the determination of the state vector at and after the determined instance in time.

45. Apparatus of at least one of 42 to 44, wherein the processing element is adapted to
estimate an achieved precision of a position of the receiver determined based on the weighted ambiguities; and
indicate a convergence of the determination of the state vector, if the achieved precision of the position is better than an inclusion threshold.

46. Apparatus of at least one of 42 to 45, wherein the processing element is adapted to
estimate an achieved precision of a position of the receiver determined based on the weighted ambiguities; and
indicate a non-convergence of the determination of the state vector, if the achieved precision of the position is worse than an exclusion threshold.

47. Apparatus of at least one of 26 to 46, wherein the filter is adapted to obtain observations of the at least one frequency of the GNSS signals from the plurality of GNSS satellites to obtain observations at a plurality of instances in time; and the processing element is adapted to
update the float ambiguities of the state vector over time on the basis of the observations;
determine that an interruption in tracking of at least one signal of a satellite occurred; and
maintain the float ambiguity of the state vector for the at least one signal for which an interruption in tracking occurred at the value before the interruption in tracking occurred.

48. Apparatus of 47, wherein the processing element is adapted to determine that an interruption in tracking of at least one signal of a satellite occurred if an observation for the at least one signal is not available for at least one of the instances in time.

49. Apparatus of at least one of 47 and 48, wherein the processing element is adapted to determine that an interruption in tracking of at least one signal of a satellite occurred, if a cycle slip occurred.

50. Apparatus of at least one of 47 to 49 wherein the processing element is adapted to, if, after an interruption in tracking of a signal, tracking of the signal resumes, maintain the float ambiguity of the state vector for the signal for which an interruption in tracking occurred at the value before the interruption in tracking occurred as a first float ambiguity and introducing into the state vector a second float ambiguity for the signal after resuming tracking.

51. Rover comprising an apparatus according to any one of 26 to 50.

52. Network station comprising an apparatus according to any one of 26 to 51.

53. Computer program comprising instructions configured, when executed on a computer processing unit, to carry out a method according to any one of 1 to 25.

54. Computer-readable medium comprising one of: a computer-readable physical storage medium embodying a computer program according to 53 and a computer-readable transmission medium embodying a computer program according to 53.

The invention claimed is:
1. Method of operating a processor having associated data storage and program code enabling the processor to estimate parameters derived from global navigational satellite system (GNSS) signals useful to determine a position, comprising
obtaining observations of each of received frequencies of a GNSS signal from a plurality of GNSS satellites to obtain observations at a plurality of instances in time;
feeding the time sequence of observations to a filter operated by the processor to estimate a state vector at least comprising float ambiguities, wherein each float ambiguity constitutes a real number estimate of an integer number of wavelengths for a received frequency of a GNSS signal between a receiver of the GNSS signal and the GNSS satellite from which it is received and wherein the float ambiguities of the state vector are updated over time on the basis of the observations;
determining that an interruption in tracking of at least one signal of a satellite occurred;
maintaining the float ambiguity of the state vector for the at least one signal for which an interruption in tracking occurred at the value before the interruption in tracking occurred;

assigning integer values to at least a subgroup of the estimated float values to define a plurality of integer ambiguity candidate sets;

determining a quality measure for each of the candidate sets; and forming a weighted average of the candidate sets.

2. Method of claim 1, wherein it is determined that an interruption in tracking of at least one signal of a satellite occurred if an observation for the at least one signal is not available for at least one of the instances in time.

3. Method of claim 1, wherein it is determined that an interruption in tracking of at least one signal of a satellite occurred, if a cycle slip occurred.

4. Method of claim 1 comprising, if, after an interruption in tracking of a signal, tracking of the signal resumes, maintaining the float ambiguity of the state vector for the signal for which an interruption in tracking occurred at the value before the interruption in tracking occurred as a first float ambiguity and introducing into the state vector a second float ambiguity for the signal after resuming tracking.

5. Method of claim 1, wherein forming the weighted average comprises selecting a first number of candidate sets having a quality measure better than a first threshold, wherein the first threshold is determined based on a reference quality measure of a reference candidate set; and forming the weighted average of the selected candidate sets by weighing each candidate set in the weighted average based on its quality measure.

6. Method of claim 5, comprising using the weighted average to estimate a position of the receiver of the GNSS signals.

7. Method of claim 5, wherein the reference candidate set is the candidate set having the best quality measure.

8. Method of claim 5, wherein the quality measure of the candidate sets is constituted by a residual error norm value, the residual error norm value of a candidate set being a measure for a statistical distance of the candidate set to the state vector having the float ambiguities.

9. Method of claim 5, wherein the first threshold is determined as at least one of a fraction of, a multiple of, and a distance to the reference quality measure.

10. Method of claim 5, comprising, if the first number of selected candidate sets is smaller than a second threshold, selecting, for forming the weighted average, a second number of further candidate sets on the basis of the quality measures of the candidate sets in decreasing order starting with the non-selected candidate set having the best quality measure, the second number being constituted by the difference between the first number of selected candidate sets and a second threshold defining a minimum number of candidate sets to be included in the weighted average.

11. Method of claim 5, comprising, if the first number of selected candidate sets is larger than a third threshold, excluding a third number of selected candidate sets from forming the weighted average in decreasing order starting with the selected candidate set having the worst quality measure, wherein the third number is constituted by the difference between the first number of selected candidate sets and a third threshold defining a maximum number of candidate sets to be included in the weighted average.

12. Method of claim 1, wherein forming the weighted average comprises:

determining the best quality measure of the candidate sets;

determining an expectation value of the candidate set having the best quality measure;

determining an error measure as a ratio of the best quality measure to the expectation value;

adapting the quality measures of the candidate sets as a function of the error measure;

performing a selection of the first number of candidate sets based on the adapted quality measures; and forming the weighted average on the basis of the quality measures.

13. Method of claim 12, comprising adjusting a variance-covariance matrix of the filter using the error measure, if the error measure is in a predetermined range.

14. Method of claim 12, comprising adjusting a variance-covariance matrix of the filter using the error measure, if the error measure is larger than one.

15. Method of claim 1, wherein forming the weighted average comprises:

determining the best quality measure of the candidate sets;

determining an expectation value of the candidate set having the best quality measure;

determining an error measure as a ratio of the best quality measure to the expectation value;

adapting the quality measures of the candidate sets as a function of the error measure; and forming the weighted average based on the adapted quality measures.

16. Method of claim 1, comprising adapting the quality measures of the candidate sets as a function of the error measure by adjusting a variance-covariance matrix of the float solution so as to change the distribution of the quality measures of the candidate sets relative to the float solution.

17. Method of claim 1, wherein defining the integer candidate sets comprises:

selecting a subset of float ambiguities of the state vector to form the subgroup of the float ambiguities of the state vector used to define the plurality of integer ambiguity candidate sets; and assigning integer values to the estimated float values of the float ambiguities of the subset to define the plurality of integer ambiguity candidate sets.

18. Method of claim 17, wherein the selecting comprises selecting, as float ambiguities of the subset, the float ambiguities of frequencies tracked continuously for the longest period of time.

19. Method of claim 1, comprising estimating by the filter a float value for each float ambiguity of the state vector and covariance values associated with the state vector;

determining a formal precision value based on covariance values of the filter, the formal precision value being a measure for an achievable precision;

determining an achieved precision value of the weighted average;

comparing the achieved precision value with the formal precision value to obtain a convergence value; and indicating a convergence of the determination of the state vector based on the convergence value.

20. Method of claim 19, wherein the convergence value is obtained as a ratio of the achieved precision value to the formal precision value.

21. Method of claim 19, comprising determining an instance in time when the convergence value of the position is better than a convergence threshold; and indicating a convergence of the determination of the state vector at and after the determined instance in time.

22. Method of claim 19, comprising estimating an achieved precision of a position of the receiver determined based on the weighted ambiguities; and indicating a convergence of the determination of the state vector, if the achieved precision of the position is better than an inclusion threshold.

23. Method of claim 19, comprising
estimating an achieved precision of a position of the receiver determined based on the weighted ambiguities; and
indicating a non-convergence of the determination of the state vector, if the achieved precision of the position is worse than an exclusion threshold.

24. Computer-readable physical storage medium embodying instructions configured, when executed on a computer processing unit, to carry out the method of claim 1.

25. Apparatus to estimate parameters derived from global navigational satellite system (GNSS) signals useful to determine a position, comprising:
a processor having associated data storage and program code enabling the processor to
obtain observations of each of received frequencies of a GNSS signal from a plurality of GNSS satellites to obtain observations at a plurality of instances in time;
operate a filter to estimate a state vector at least comprising float ambiguities based on the time sequence of observations, wherein each float ambiguity constitutes a real number estimate of an integer number of wavelengths for a received frequency of a GNSS signal between a receiver of the GNSS signal and the GNSS satellite from which it is received and wherein the float ambiguities of the state vector are updated over time on the basis of the observations;
determine that an interruption in tracking of at least one signal of a satellite occurred;
maintain the float ambiguity of the state vector for the at least one signal for which an interruption in tracking occurred at the value before the interruption in tracking occurred;
assign integer values to at least a subgroup of the estimated float values to define a plurality of integer ambiguity candidate sets;
determine a quality measure for each of the candidate sets; and
form a weighted average of the candidate sets.

26. Apparatus of claim 25, wherein the program code enables the processor to determine that an interruption in tracking of at least one signal of a satellite occurred if an observation for the at least one signal is not available for at least one of the instances in time.

27. Apparatus of claim 25, wherein the program code enables the processor to determine that an interruption in tracking of at least one signal of a satellite occurred, if a cycle slip occurred.

28. Apparatus of claim 25 wherein the program code enables the processor to, if, after an interruption in tracking of a signal, tracking of the signal resumes, maintain the float ambiguity of the state vector for the signal for which an interruption in tracking occurred at the value before the interruption in tracking occurred as a first float ambiguity and introducing into the state vector a second float ambiguity for the signal after resuming tracking.

29. Apparatus of claim 25, wherein the program code enables the processor to, in order to form the weighted average
select a first number of candidate sets having a quality measure better than a first threshold, wherein the first threshold is determined based on a reference quality measure of a reference candidate set; and
form the weighted average of the selected candidate sets by weighing each candidate set in the weighted average based on its quality measure.

30. Apparatus of claim 29, wherein the program code enables the processor to use the weighted average to estimate a position of the receiver of the GNSS signals.

31. Apparatus of claim 29, wherein the reference candidate set is the candidate set having the best quality measure.

32. Apparatus of claim 29, wherein the quality measure of the candidate sets is constituted by a residual error norm value, the residual error norm value of a candidate set being a measure for a statistical distance of the candidate set to the state vector having the float ambiguities.

33. Apparatus of claim 29, wherein the program code enables the processor to determine the first threshold as at least one of a fraction of, a multiple of, and a distance to the reference quality measure.

34. Apparatus of claim 29, wherein the program code enables the processor to, if the first number of selected candidate sets is smaller than a second threshold, select, for forming the weighted average, a second number of further candidate sets on the basis of the quality measures of the candidate sets in decreasing order starting with the non-selected candidate set having the best quality measure, the second number being constituted by the difference between the first number of selected candidate sets and a second threshold defining a minimum number of candidate sets to be included in the weighted average.

35. Apparatus of claim 29, wherein the program code enables the processor to, if the first number of selected candidate sets is larger than a third threshold, exclude a third number of selected candidate sets from forming the weighted average in decreasing order starting with the selected candidate set having the worst quality measure, wherein the third number is constituted by the difference between the first number of selected candidate sets and a third threshold defining a maximum number of candidate sets to be included in the weighted average.

36. Apparatus of claim 25, wherein the program code enables the processor to, in order to form the weighted average:
determine the best quality measure of the candidate sets;
determine an expectation value of the candidate set having the best quality measure;
determine an error measure as a ratio of the best quality measure to the expectation value;
adapt the quality measures of the candidate sets as a function of the error measure;
perform a selection of the first number of candidate sets based on the adapted quality measures; and
form the weighted average on the basis of the quality measures.

37. Apparatus of claim 36, wherein the program code enables the processor to adjust a variance-covariance matrix of the filter using the error measure, if the error measure is in a predetermined range.

38. Apparatus of claim 36, wherein the program code enables the processor to adjust a variance-covariance matrix of the filter using the error measure, if the error measure is larger than one.

39. Apparatus of claim 25, wherein the program code enables the processor to, in order to form the weighted average:
determine the best quality measure of the candidate sets;
determine an expectation value of the candidate set having the best quality measure;

determine an error measure as a ratio of the best quality measure to the expectation value;

adapt the quality measures of the candidate sets as a function of the error measure; and form the weighted average based on the adapted quality measures.

40. Apparatus of claim 25, wherein the program code enables the processor to adapt the quality measures of the candidate sets as a function of the error measure by adjusting a variance-covariance matrix of the float solution so as to change the distribution of the quality measures of the candidate sets relative to the float solution.

41. Apparatus of claim 25, wherein the program code enables the processor to, in order to define the integer candidate sets:

select a subset of float ambiguities of the state vector to form the subgroup of the float ambiguities of the state vector used to define the plurality of integer ambiguity candidate sets; and assign integer values to the estimated float values of the float ambiguities of the subset to define the plurality of integer ambiguity candidate sets.

42. Apparatus of claim 41, wherein the program code enables the processor to select, as float ambiguities of the subset, the float ambiguities of frequencies tracked continuously for the longest period of time.

43. Apparatus of claim 25, wherein the filter is operated by the processor to estimate a float value for each float ambiguity of the state vector and covariance values associated with the state vector; and wherein the program code enables the processor to determine a formal precision value based on covariance values of the filter, the formal precision value being a measure for an achievable precision;

determine an achieved precision value of the weighted average;

compare the achieved precision value with the formal precision value to obtain a convergence value; and indicate a convergence of the determination of the state vector based on the convergence value.

44. Apparatus of claim 43, wherein the program code enables the processor to obtain the convergence value as a ratio of the achieved precision value to the formal precision value.

45. Apparatus of claim 43, wherein the program code enables the processor to determine an instance in time when the convergence value of the position is better than a convergence threshold; and indicate a convergence of the determination of the state vector at and after the determined instance in time.

46. Apparatus of claim 43, wherein the program code enables the processor to estimate an achieved precision of a position of the receiver determined based on the weighted ambiguities; and indicate a convergence of the determination of the state vector, if the achieved precision of the position is better than an inclusion threshold.

47. Apparatus of claim 43, wherein the program code enables the processor to estimate an achieved precision of a position of the receiver determined based on the weighted ambiguities; and indicate a non-convergence of the determination of the state vector, if the achieved precision of the position is worse than an exclusion threshold.

48. Rover comprising an apparatus according to claim 25.

49. Network station comprising an apparatus according to claim 25.

* * * * *